(12) United States Patent
Alexandratos et al.

(10) Patent No.: US 6,488,859 B2
(45) Date of Patent: Dec. 3, 2002

(54) BIFUNCTIONAL PHENYL MONOPHOSPHONIC/SULFONIC ACID ION EXCHANGE RESIN AND PROCESS FOR USING THE SAME

(75) Inventors: Spiro Alexandratos, Knoxville, TN (US); Christopher A. Shelley, Knoxville, TN (US); E. Philip Horwitz, Naperville, IL (US); Renato Chiarizia, Elmhurst, IL (US); Michael J. Gula, Chicago, IL (US); Sui Xue, Darien, IL (US); James T. Harvey, Naperville, IL (US)

(73) Assignees: Arch Development Corp, Chicago, IL (US); The University of Tennessee Research Corp, Knoxville, TN (US)

( * ) Notice: Subject to any disclaimer, the term of this patent is extended or adjusted under 35 U.S.C. 154(b) by 0 days.

(21) Appl. No.: 09/850,474

(22) Filed: May 7, 2001

(65) Prior Publication Data

US 2001/0052496 A1 Dec. 20, 2001

Related U.S. Application Data

(63) Continuation of application No. 09/221,446, filed on Dec. 28, 1998, now Pat. No. 6,232,353, which is a continuation-in-part of application No. 09/109,633, filed on Jul. 2, 1998, now abandoned.

(51) Int. Cl.$^7$ ................................................. C02F 1/42
(52) U.S. Cl. ...................... 210/660; 210/661; 210/670; 210/681
(58) Field of Search ........................... 210/660, 661, 210/670, 681

(56) References Cited

U.S. PATENT DOCUMENTS

| | | | |
|---|---|---|---|
| 2,764,563 A | 9/1956 | McMaster | 260/2.2 |
| 3,298,969 A | 1/1967 | D'Alelio | 260/2.1 |
| 4,664,700 A | 5/1987 | Alexandratos | 75/101 BE |
| 5,116,882 A | 5/1992 | Grey et al. | 521/147 |
| 5,281,631 A | 1/1994 | Horwitz | 210/682 |
| 5,449,462 A | 9/1995 | Horwitz et al. | 210/682 |
| 5,582,737 A | 12/1996 | Gula et al. | 210/673 |
| 5,948,264 A | 9/1999 | Dreisinger et al. | 210/673 |
| 6,232,353 B1 | 5/2001 | Alexandratos et al. | 521/26 |

OTHER PUBLICATIONS

Su, et al., "Application of a macroporous resin containing imidazoline groups to preconcentration and separation of gold, platinum and palladium prior to ICP–AES determination," *Talanta*, 42:1127–1133 (1995).

Lan, et al., "Synthesis, properties and applications of silica–immobilized 8–quinolinol," *Analyt. Chim. Acta*, 287:101–109 (1994).

(List continued on next page.)

*Primary Examiner*—Chester T. Barry
(74) *Attorney, Agent, or Firm*—Welsh & Katz, Ltd.

(57) ABSTRACT

A cross-linked water-insoluble ion exchange resin comprised of polymerized monomers having a phenyl ring is disclosed. A contemplated resin contains (i) polymerized phenyl ring-containing monomers having a phosphonic acid ligand linked to the phenyl ring, (ii) about 2 to about 5 millimoles per gram (mmol/g) of phosphorus as phosphonic acid ligands, and (iii) a sufficient amount of a sulfonic acid ligand such that the ratio of mmol/g of phosphonic acid to mmol/g sulfonic acid is up to 3:1. A process for removing polyvalent metal cations from aqueous solution, and a process for removing iron(III) cations from acidic copper(II) cation-containing solutions that utilize the contemplated resin or other resins are disclosed.

38 Claims, 23 Drawing Sheets

OTHER PUBLICATIONS

Lezzi, et al., "Chelating Resins Supporting Dithiocarbamate and Methylthiourea Groups in Adsorption of Heavy Metal Ions," *J. App. Polym. Sci.*, 54:889–897 (1994).

Kamble, et al., "Synthesis and Characterization of Oxime Resin of Poly(4–vinyl–2'–thiocarboxybenzophenone) and Its Metal Polychelates," *J. App. Polym. Sci.*, 56:1519–1521 (1995).

Tomita, et al., "Synthesis and Radical Polymerization of Styrene Derivative Bearing Kojic Acid Moieties," *J. Polym. Sci., Part A: Polym. Chem.*, 34:271–276 (1996).

Tomoi, et al., "Mechanisms of Polymer–Supported Catalysts. 1. Reaction of 1–Bromooctane with Aqueous Sodium Cyanide Catalyzed by Polystyrene–Bound Benzyl tri–n–butylphosphonium Ion," *J. Am. Chem. Soc.*, 103:3821–3828 (1981).

Van Berkel, et al., "Metal Uptake by Didentate and Tridentate Pyrazole–Containing Ligands Immobilized onto Poly(Glycidyl Methacrylate–Co–Ethylene Glycol) Dimethacrylate," *Eur. Polym. J.*, 28(7):747–754 (1992).

Kowamura, et al., "Adsorption of Metal Ions on Polyaminated Highly Porous Chitosan Chelating Resin," *Ind. Eng. Chem. Res.*, 32:386–391 (1993).

Buchanan, et al., "Poly(vinylbenzo macrocyclic polyethers). Synthesis and cation binding properties of 12–crown–4 derivatives," *Can. J. Chem.*, 69:702–705 (1991).

Alexandratos, et al., "Enhanced Ionic Recognition by Polymer–Supported Reagents: Synthesis and Characterization of Ion–Exchange/Precipitation Resins," *Macromolecules*, 21:2905–2910 (1988).

Chiarizia, et al., "Uptake of Metal Ions by a New Chelating Ion–Exchange Resin. Part 4: Kinetics," *Solv. Extr. Ion Exch.*, 12(1):211–237 (1994).

Trochimczuk et al, "Synthesis of Bifunctional Ion–Exchange Resins through the Arbusov Reaction: Effect on Selectivity and Kinetics," *J. Appl. Polym. Sci.*, 52:1273–1277 (1994).

Alexandratos, et al., "Synthesis and Ion–Complexing Properties of a Novel Polymer–Supported Reagent with Diphosphonate Ligands," *Macromolecules*, 29:1021–1026 (1996).

Horwitz, et al., "Uptake of Metal Ions By a New Chelating Ion–Exchange Resin. Part 1: Acid Dependencies of Actinide Ions," *Solv. Extr. Ion Exch.*, 11(5):943 (1993).

Chiarizia, et al., "Uptake of Metal Ions by a New Chelating Ion–Exchange Resin. Part 2: Acid Dependencies of Transition and Post–Transition Metal Ions," *Solv. Extr. Ion Exch.*, 11(5):967 (1993).

Vriesema et al., "Synthesis of Aza Macrocycles by Nucleophilic Ring Closure with Cesium," *J. Org. Chem.*, 49:110–113 (1984).

Bogoczek, et al., "Synthesis of Phosphorous–Containing Wofatit Cation Exchangers and Their Affinity Toward Selected Cations," *J. Appl. Polym. Sci.*, 26:4161–4173 (1981).

Cassidy, "Electron–Transfer Polymers (Oxidation–Reduction Polymers)," *J. Polym. Sci.—Part D*, 1–58 (1972).

Alexandratos, et al., "Dual Mechanism Bifunctional Polymers: Polystyrenes–Based Ion–Exchange/Redox Resins," *Macromolecules*, 19:280–287 (1986).

Alexandratos, et al., "Bifunctionality as a Means of Enhancing Complexation Kinetics in Selective Ion Exchange Resins," *Ind. Eng. Chem. Res.*, 34:251–254 (1995).

"Brine Purification" Duolite product pamphlet.

Levin, et al., "Radical Copolymerization of Monovinyl Derivatives of Phosphorus," *Vysokomol. Soedin., Ser.*, 17:845–854 (1975) and *Chem. Abstr.* database entry regarding the same.

Alexandratos, et al., "A Mechanism for Enhancing Ionic Accessibility Into Selective Ion Exchange Resins", *Solv. Extr. Ion Exch.*, 16(4):951–966 (1998).

Marcel Dekker Catalog: Solvent Extraction Ion Exchange, Publication date information, published at http://www.dekker.com/e/p..pl/0736–0299 (information downloaded Mar. 13, 2000).

FIG.2A
FIG.2B
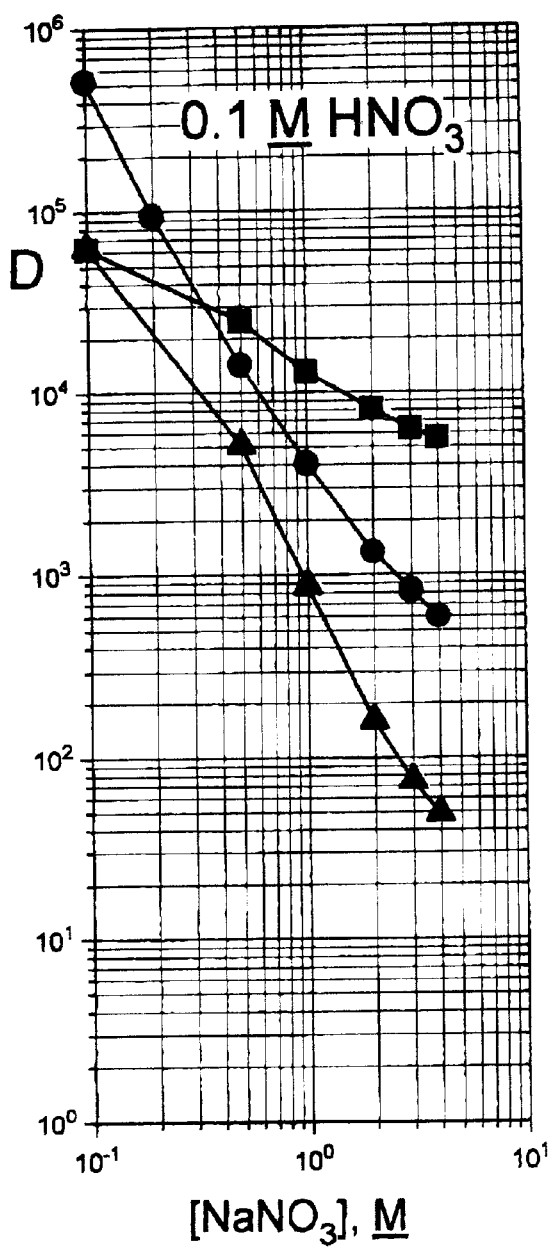
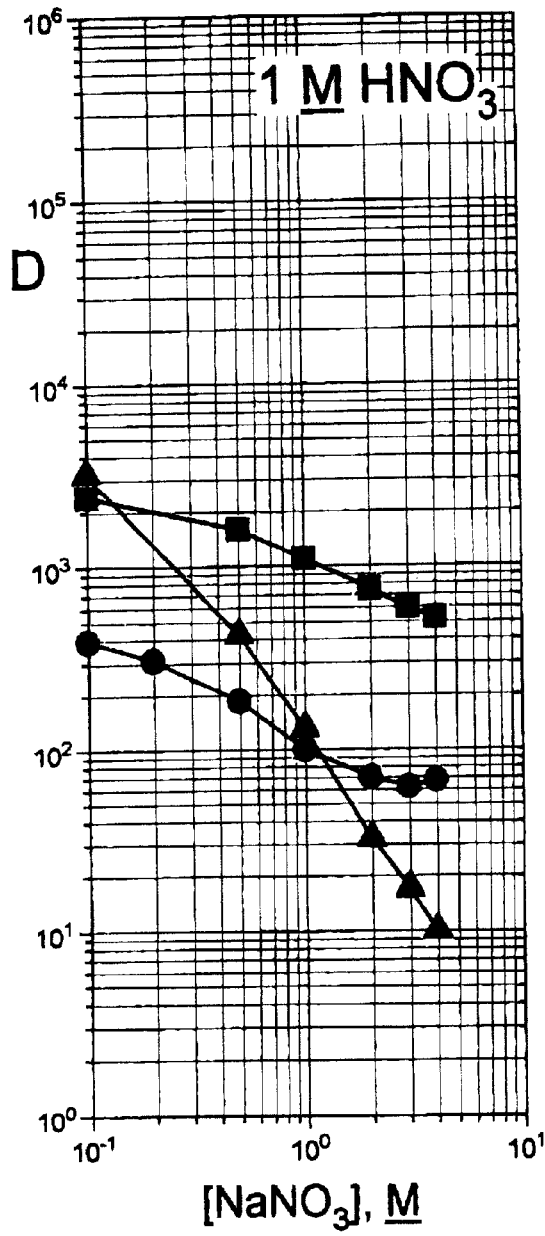

FIG. 3A
PRIOR ART
FIG. 3B
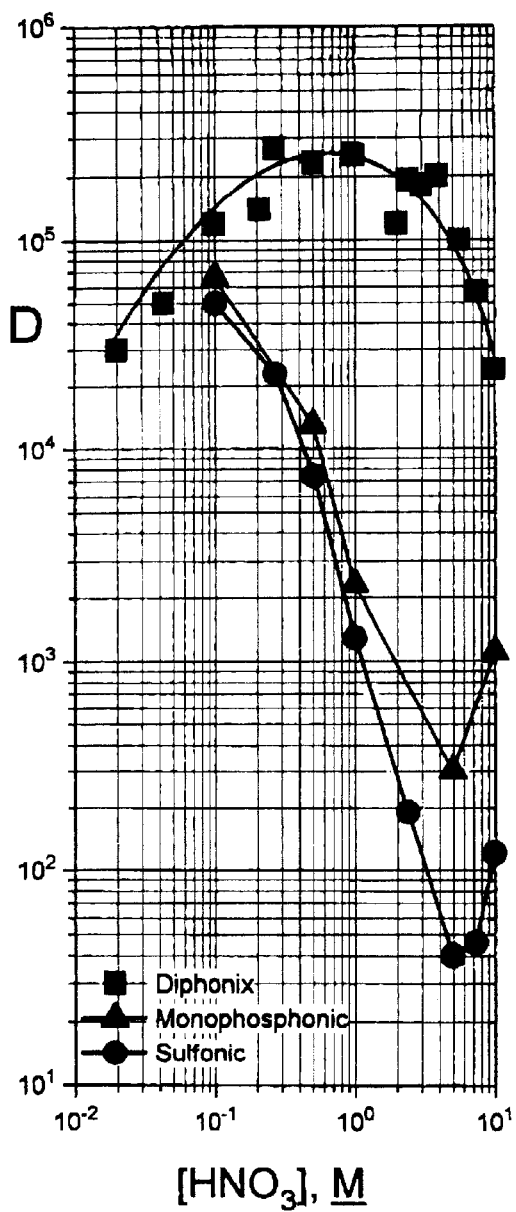
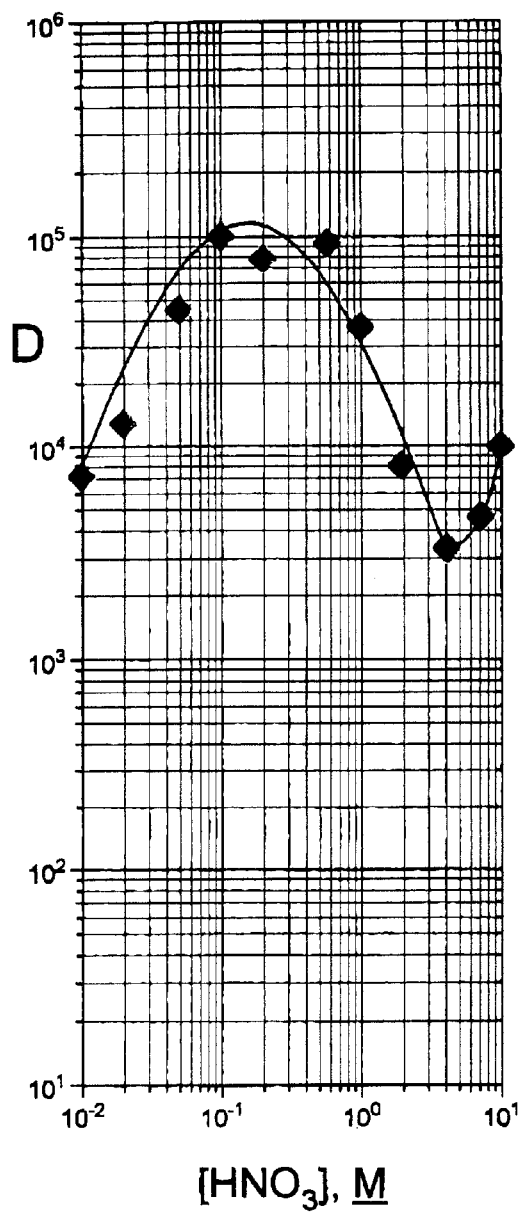

BIFUNCTIONAL PHENYL MONOPHOSPHONIC/SULFONIC ACID ION EXCHANGE RESIN AND PROCESS FOR USING THE SAME

CROSS-REFERENCE TO RELATED APPLICATION

This is a continuation of application Ser. No. 09/221,446, filed Dec. 28, 1998, now U.S. Pat. No. 6,232,353 which is a continuation-in-part of application Ser. No. 09/109,633, filed Jul. 2, 1998, now abandoned whose disclosures are incorporated herein by reference.

GOVERNMENT LICENSE RIGHTS

The U.S. Government has rights in this invention pursuant to Contract No. W-31-109-ENG-38 awarded by the U.S. Department of Energy.

TECHNICAL FIELD

The present invention relates generally to the recovery of metal ions from aqueous media. More particularly, the present invention relates in one embodiment to an ion exchange resin, in another embodiment to a process for removing iron(III) cations from an aqueous medium containing sulfuric acid and other polyvalent metal cations using that ion exchange resin, and in a still further embodiment to a generalized process for removing polyvalent metal ions from aqueous acid solution.

BACKGROUND OF THE INVENTION

Removal of radionuclides and other heavy metal ions from aqueous solutions has been the subject of extensive research. One of the areas in which this research is primarily focused is removing heavy metal ions from aqueous solutions through selective complexation.

Selective complexation is typically performed using ligands polymerized on polymer supports. Chang et al. *Talanta* 42:1127 (1995) describe using immobilized imidazolines for trace metal recovery. Tomita et al. *J. Poly. Sci., Poly. Chem. Ed.* 34:271 (1996) discuss using immobilized kojic acid for trace metal recovery. Lan et al. *Anal Chim. Acta* 287:101 (1994) teach using immobilized quinolinol for trace metal recovery. Buchanan et al. *Can. J. Chem.* 69:702 (1991) describe using immobilized crown ethers for trace metal recovery. Kawamura et al. *Ind. Eng. Chem. Res.* 32:386 (1993) disclose using immobilized polyethylenimines for trace metal recovery. Van Berkel et al. *Europ. Poly. J.* 28:747 (1992) discuss using immobilized pyrazoles for trace metal recovery. Kamble et al. *J. Appl. Poly. Sci.* 56:1519 (1995) teach using immobilized oximes for trace metal recovery. Lezzi et al. *J. Appl. Poly. Sci.* 54:889 (1994) discuss using immobilized dithiocarbamates for trace metal recovery.

Ion exchange resins with phosphorous-containing ligands are an important group of metal ion chelating agents. The selectivity of these types of ligands can be varied by changing the structure of the phosphorous ligand. The ability of these ligands to strongly coordinate different metal ions leads to significant levels of ionic complexation under highly acidic conditions.

Horwitz et al. *Solv. Extr. Ion Exch.* 11:943 (1993) have shown that immobilized diphosphonic acid groups have very high affinities for a series of metal ions because of the coordinating ability of the phosphoryl oxygen and a ligand structure that permits chelation of the metal ions. High loadings at equilibrium are attained under contact times on the order of days unless the phenyl rings within the polymer are sulfonated, which reduces the equilibration time to on the order of ten minutes. Chiarizia et al. *Solv. Extr. Ion Exch.* 12:211 (1994).

The introduction of bifunctionality into ion exchange resins has been discussed as a coupling of an access mechanism (permitting all ions into the matrix rapidly) with a recognition mechanism (a second ligand selectively complexes a targeted metal ion). Alexandratos et al. *Macromolecules* 21:2905 (1988). Studies with diphosphonate-immobilized polymer have shown that both ligands on the resin complex far greater levels of metal ions than either one could alone. Alexandratos et al. *Macromolecules* 29:1021 (1996)

The access mechanism introduced by the sulfonic acid ligand is due to the ligand's hydrophilicity that permits rapid entry of metal ions into the matrix. It has been found that monofunctional phosphonic acid microporous resin cross-linked with 2 percent divinylbenzene (hereinafter "DVB") lost most of its ability to complex Eu(III) from 1 N $HNO_3$ compared to the performance of this material in 0.04 N acid. Trochimczuk et al. *J. Appl. Poly. Sci.* 52:1273 (1994). These results were attributed to a collapse of the microporous structure in high ionic strength solutions that restricts access.

Trochimczuk et al., above, describe that linking sulfonic acid groups and phosphonic acid groups to different phenyl rings increases the amount of Eu(III) complexed from high ionic strength solutions. The results suggested an increased access of the metal ions into the polymer matrix coupled with increased complexation by the phosphonate ligands. However, the advantage of increased complexation was offset by the decreased resin capacity from the lower level of substitution necessitated by the copolymerization with styrene. In addition, when a cross-linked phosphonate polymer that was not copolymerized with styrene was sulfonated, a relatively small metal binding capacity was again observed in 1 N nitric acid.

Copper metal is obtained from copper ores by several well-known processes. One of the most frequently used processes is referred to as a solvent extraction-electrowinning (SX-EW) process in which copper(II) ions are first leached from the ore using sulfuric acid followed by extraction with a kerosene-based copper-specific solvent mixture. The copper ions are then stripped from the solvent mixture using a copper sulfate-sulfuric acid electrolyte solution ($CuSO_4$—$H_2SO_4$ electrolyte solution). The copper recovery process is then completed by electrowinning of copper from the copper-enriched strip solution.

Small amounts of iron(II) and iron(III) cations are commonly transferred with the copper cations to the electrowinning solution. Iron transfer occurs by chemical co-extraction (binding to the oxime molecule) and by entrainment of iron-containing aqueous solution in the copper-loaded organic solution. As copper is depleted from the $CuSO_4$—$H_2SO_4$ electrolyte solution during copper electrowinning (EW), the concentration of iron in solution increases. This build up of iron in solution results in a loss of current efficiency in the electrowinning process due to a continuous oxidation/reduction of $Fe^{2+}/Fe^{3+}$. That loss of current efficiency can amount to about 2–3 percent per gram of iron in solution. The conventional treatment technique for iron control has been to periodically bleed or purge a portion of the iron-rich, copper-depleted electrolyte and replace it with a sulfuric acid electrolyte solution.

In a copper electrowinning process, lead-based alloys are used as oxygen-evolving anodes. Soluble cobalt(II) (50 200 ppm) ions are added to the aqueous sulfuric acid copper-containing electrolyte to control corrosion of the lead anode, and to prevent "spalling" and possible lead contamination of the copper cathode. During bleed of the spent (copper-depleted) electrolyte to control iron concentration, cobalt is lost from the system. Cobalt must be continually added to the electrowinning electrolyte to make up cobalt lost through the bleed stream. Cobalt replacement to control lead anode corrosion is a major operating expense in copper SX-EW plants. Removal of the iron from the electrowinning electrolyte solution while retaining the cobalt is desired.

Sulfonic acid functional group cation exchange resins are widely used in the water treatment industry and other industrial processes for the removal of cations, such as iron, from aqueous process streams. Such resins also bind and accumulate other cations, such as calcium, magnesium, and sodium, that are undesirable in an iron removal process, necessitating frequent regeneration of the resin.

Gula et al., U.S. Pat. No. 5,582,737, the disclosures of which are incorporated herein by reference, describe a process that separates and removes iron(III) from aqueous sulfuric acid solution containing additional metal ions such as copper and cobalt ions as are found in depleted copper electrowinning electrolyte solutions. That process utilizes gem-diphosphonic acid ion exchange particles that are preferably also sulfonated to remove the iron(III) ions, while permitting (1) copper, cobalt and other mono- and divalent metal ions to be recycled into the copper electroplating recovery process, thereby saving on the costs of cobalt that would otherwise be discarded, and (2) regeneration of the ion exchange particles for further use and recycle to the separation and removal steps.

The process for regenerating the gem-diphosphonic acid ion exchange particles used in the above process disclosed by Gula et al. involves use of sulfurous acid ($H_2SO_3$) to reduce the bound iron(III) ions to iron(II) ions that are free in solution. The sulfurous acid is usually generated prior to the iron(III) reduction step by sparging an aqueous solution with $SO_2$ gas, which dissolves to form $H_2SO_3$. The use of $SO_2$ gas in the Gula et al. regeneration process raises issues relating to the availability of $SO_2$, the costs of the sulfur dioxide storage and delivery systems, and pressurization of the system needed to maintain $SO_2$ dissolution.

Gula et al. disclose that in their regeneration process, the addition of at least a catalytic amount of copper ions was found to increase the efficiency of $SO_2$-caused regeneration. The catalytic amount of copper ions could be added to the copper electrowinning bleed solution itself, or could be provided, for example as a copper sulfate solution prepared expressly for this purpose. Alternatively, a solution of sulfuric acid ($H_2SO_4$) containing copper(II) ions could be passed over copper metal and then sparged with $SO_2$ gas to form the sulfurous acid solution containing a catalytic amount of copper(I).

Another process for regenerating geminal diphosphonate iron(III)-bound ion exchange particles is disclosed in allowed Dreisinger et al. U.S. patent application Ser. No. 09/019,677 filed on Feb. 6, 1998. In that process, the iron(III)-bound ion exchange particles are contacted with an aqueous $SO_2$-free reducing solution containing 0.1 to about 6 molar sulfuric acid and an amount of copper(I) ions sufficient to reduce the solid phase-bound iron(III) ions to iron(II).

The gem-diphosphonic acid ion exchange particles used by Gula et al. and Dreisinger et al. have a high capacity, but are relatively expensive and difficult to prepare. The monophosphonic acid ion exchange particles of Trochimczuk et al. are more readily prepared and less expensive than are those of Gula et al., but have reduced capacity for polyvalent cations. It would be beneficial if a monophosphonate ion exchange resin could be prepared that exhibited a high polyvalent metal cation capacity in 1–4 N nitric acid or 1–2 N sulfuric acid similar to that exhibited by the more expensive and difficultly prepared diphosphonate ion exchange resins. It would also be beneficial if such a monophosphonic acid ion exchange resin could be used in a process for iron(III) removal from sulfuric acid-containing aqueous media such as those utilized by Gula et al. and Dreisinger et al. The disclosure that follows illustrates one such material and its use in removing heavy metal ions from aqueous acid solutions and particularly, in a process for iron(III) removal from sulfuric acid-containing aqueous media that also contain other polyvalent metal ions.

SUMMARY OF THE INVENTION

In one embodiment, the present invention relates to an ion exchange resin that is useful, inter alia, for removing polyvalent heavy metal cations from an aqueous solution. A contemplated ion exchange resin is a cross-linked water-insoluble polymer comprised of polymerized monomers having a phenyl ring. At least 50 mole percent of the polymerized monomers are phenyl ring-containing monomers that have a phosphonic acid ligand linked thereto. At least 35 mole percent of the polymerized monomers are phenyl ring-containing monomers having both a linked phosphonic acid ligand and a linked sulfonic acid ligand, with the remaining monomers being free of sulfonation. A contemplated monophosphonic/sulfonic acid resin of this embodiment typically contains about 2 to about 5 millimoles of phosphorus per gram (mmol/g) of polymer and has a ratio of millimoles of phosphorus (phosphonate) to millimoles of sulfur (sulfonate) of up to 3:1, and preferably 3:1 to about 1:2.

In a second embodiment, the present invention relates to an improved process for the separation and removal of iron(III) ($Fe^{3+}$) cations (ions) from aqueous metal cation-containing acid solutions, such as a sulfuric acid solution. In accordance with this embodiment, a contemplated process comprises the following steps:

(a) An aqueous metal ion-containing sulfuric acid solution that contains iron(III) ions as well as ions having a valence of less than +3 of at least one additional metal having a valence of +2 is contacted with solid ion exchange medium that is preferably in the form of particles. The ion exchange medium binds to the iron(III) ions in preference to the additional metal ions present to form a solid/liquid phase admixture. A contemplated ion exchange resin is a cross-linked water-insoluble polymer comprised of polymerized monomers that contain monophosphorus acid functional group ligands and also contain sulfonic acid functional groups. A monophosphorus acid functional group contains a single phosphorus atom that can be present in the form of a phosphonic acid as in the above embodiment, a phosphinic acid group or a phosphoric acid ester. A cross-linked sulfonated phosphorus acid functional group-containing polymer is referred to herein as a monophosphorus/sulfonic acid resin or ion exchange resin. The polymerized monomers preferably include a phenyl ring to which the monophosphorus acid functional group is bonded. A monophosphorus/sulfonic acid resin contemplated in this embodiment contains about 2 to about 5 millimoles of phosphorus per gram (mmol/g) of polymer and has a ratio of mmol/g of phosphorus (phosphonate or phosphonic or acid, phosphinate or phosphinic acid, or phosphate or phosphoric acid) to mmol/g of sulfur (sulfonate or sulfonic acid) of about 4:1 to about 1:2. A monophosphorus/sulfonic acid ion exchange resin of the first embodiment is a particularly preferred polymer for use in this embodiment.

(b) The contact is maintained between the sulfuric acid solution containing iron(III) ions and a sufficient amount of solid ion exchange particles for a time period sufficient to form solid phase-bound iron(III) ions and an aqueous liquid phase containing sulfuric acid and the additional metal ions, as well as a lower concentration of iron(III) ions.

(c) The solid and liquid phases are separated.

(d) The separated solid phase-bound iron(III) ions are contacted with an aqueous stripping solution, thereby forming a second solid/liquid phase admixture.

(e) The second solid/liquid phase admixture is maintained at a temperature of about room temperature to about 95° C. for a time period sufficient to form an aqueous liquid phase containing iron(II) cations and a solid phase of regenerated ion exchange particles.

(f) The iron-containing liquid phase is separated from the regenerated solid phase ion exchange particles.

In one aspect of this embodiment of the invention, the aqueous stripping solution contains 0.1 to about 6 molar aqueous sulfuric acid and an amount of reductant sufficient to reduce the solid phase-bound iron(III) ions to iron(II) ions. In one particular aspect of this embodiment, the stripping solution is free of added $SO_2$ or $H_2SO_3$ and the reductant is a copper(I) ion-containing aqueous reducing solution prepared by dissolving copper(O) in a 0.1 to about 6 molar aqueous sulfuric acid solution. Alternatively, a copper(I) salt is dissolved directly in a 0.1 to about 6 molar aqueous sulfuric acid solution.

In another particular aspect of this embodiment of the invention, the 0.1 to about 6 molar aqueous sulfuric acid solution used to make the copper(I) ion-containing aqueous reducing solution is free of added $SO_2$ or $H_2SO_3$ and is a spent electrolyte solution from a solvent extraction copper electrowinning process.

In yet another particular aspect of this embodiment of the invention, the 0.1 to about 6 molar aqueous sulfuric acid solution used to make the copper(I) aqueous reducing solution is free of added $SO_2$ or $H_2SO_3$ and is recycled from an ion exchange medium regeneration process, and already contains some iron(II) ions.

In a still further particular aspect of embodiment of the invention, the separated solid phase-bound iron(III) ions are contacted with an aqueous reducing solution containing 0.5 to about 6 molar sulfuric acid, at least a catalytic amount of copper ions and an amount of sulfurous acid dissolved $SO_2$ sufficient to reduce the solid phase-bound iron(III) ions to iron(II) ions to form a second solid/liquid phase admixture.

In another aspect of this embodiment of the invention, the stripping solution is about 4 to about 10 M hydrochloric acid.

A more general process for removing polyvalent metal cations having a valence of +3 or more from an aqueous acid solution; i.e., a solution having a pH value less than about 7 constitutes another embodiment of the invention.

That process comprises the steps of (a) forming a solid/liquid phase composition by contacting an aqueous solution containing polyvalent metal cations having a valence of +3 or more with a solid ion exchange medium. That ion exchange medium is a water-insoluble resin that is comprised of: (i) polymerized phenyl ring-containing monomers of which at least 50 mole percent have a phosphonic acid ligand linked to the phenyl ring via (through or by means of) a methylene group (—$CH_2$—); (ii) those phosphonic acid ligands providing the resin with about 2 to about 5 millimoles per gram (mmol/g) of phosphorus, and (iii) a sufficient amount, preferably at least 35 mole percent, of sulfonic acid ligands linked to the phenyl rings such that the ratio of mmol/g of phosphonic acid to mmol/g sulfonic acid in the resin is up to 3:1.

(b) That contact is maintained for a time period sufficient for the ion exchange medium to bind the polyvalent metal cations and form solid phase-bound metal cations and a liquid phase from which polyvalent metal ions have been removed; i.e., a liquid phase having a lower concentration of polyvalent metal ions than that used in contacting step (a).

(c) The solid and liquid phases are then separated.

It is preferred that at least 50 mole percent of the polymerized phenyl ring-containing monomers have both a phosphonic acid ligand and the sulfonic acid ligand linked thereto. It is also preferred that the ratio of sulfonic acid capacity to phosphonic acid capacity of the ion exchange resin be about 1:6 to about 1:1. The valence of the polyvalent metal cation removed with this process is preferably +3, and the process is preferably carried out as a pH value of 1 or below.

The present invention has several benefits and advantages. One benefit is that the resin matrix of the present invention remains hydrated in high ionic strength solutions.

Another advantage of the ion exchange resin of the present invention is that the resin matrix permits metal ions to be rapidly complexed.

Yet another benefit is that a contemplated ion exchange resin is less expensively and more readily prepared than is the sulfonated gem-diphosphonic acid resin used in Gula et al. U.S. Pat. No. 5,582,737.

A still further advantage of the present invention is that the iron(III) capacity of a contemplated ion exchange resin is unexpectedly high compared to a gem-diphosphonic acid resin used by Gula et al.

A still further benefit of the present invention is that a contemplated ion exchange resin is readily prepared.

Still further benefits and advantages of the present invention will be apparent to a person of ordinary skill from the description that follows.

BRIEF DESCRIPTION OF THE DRAWINGS

In the drawings forming a part of this disclosure:

FIG. 1A (prior art) DIPHONIX® (filled squares), a monophosphonic acid resin (filled triangles), a sulfonic acid resin (BIO-RAD® AG MP-50; filled circles) and a contemplated monophosphonic/sulfonic acid resin (FIG. 1B, filled diamonds).

FIGS. 2A and 2B are radiotracer diagrams illustrating the distribution coefficient for Am(III) as a function of sodium nitrate concentration in 0.1 M (FIG. 1A) and 1.0 M (FIG. 1B) nitric acid for different ion exchange resins: DIPHONIX® (filled squares, prior art), a sulfonic acid resin (BIO-RAD® AG MP-50; filled triangles, prior art), and a contemplated monophosphonic/sulfonic acid resin (filled circles).

FIGS. 3A and 3B are radiotracer diagrams illustrating the distribution coefficient for Fe(III) as a function of solution acidity in nitric acid solutions for different ion exchange resins: FIG. 3A (prior art) DIPHONIX® (filled squares), a monophosphonic acid resin (filled triangles), a sulfonic acid resin (BIO-RAD® AG MP-50; filled circles) and a contemplated monophosphonic/sulfonic acid resin (FIG. 3B, filled diamonds).

DETAILED DESCRIPTION OF THE INVENTION

Figure 1A:
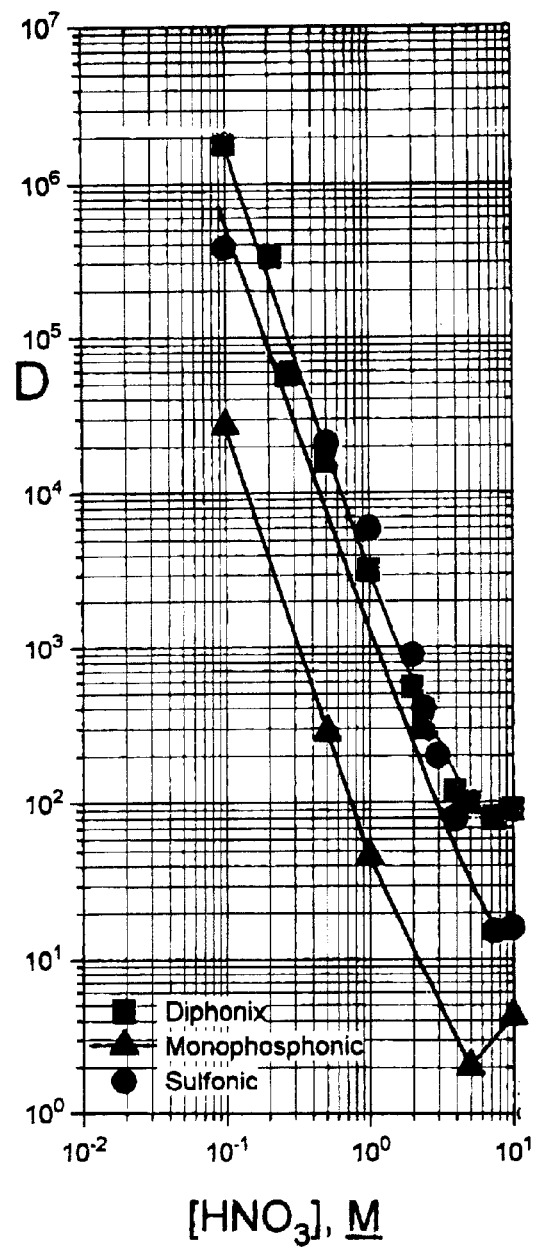
FIGS. 1A and 1B are radiotracer diagrams illustrating the distribution coefficient for Am(III) as a function of solution acidity in nitric acid solutions for different ion exchange resins.

The present invention contemplates an ion exchange resin as well as a process that uses that and similar resins to recover iron(III) cations from aqueous sulfuric acid-containing media that also contain other metal ions, and particularly other polyvalent metal cations such as copper (II) and cobalt(II).

An ion exchange resin contemplated by the present invention is particularly suited for complexing polyvalent heavy metal ions such as the trivalent Eu(III), Am(III), and Fe(III) cations and removing those cations from strongly acidic aqueous solutions. Additional polyvalent metal cations such as the divalent Zn(II), Mn(II), Co(II), Fe(II), Ca(II), Mg(II) and the like ions can also be separated from an aqueous solution utilizing a contemplated ion exchange resin, although such separations typically take place at higher pH values than those useful for separating the trivalent cations mentioned above. Monovalent cations are typically not well separated using a contemplated ion exchange resin. Embodiments of a contemplated heavy metal cation removal process are described herein in terms of electrolyte solutions present in copper SX-EW processes whose metal ions include iron(III), iron(II), copper(II), cobalt(II), and sometimes manganese(II).

I. The Ion Exchange Resin

A contemplated resin is referred to herein as an ion exchange resin. Without wishing to be bound by theory, it is believed, however, that a contemplated resin selectively separates polyvalent metal ions by both ion exchange and coordination mechanisms, with the coordination mechanism operating mostly in solutions having a pH value less than 1, such as those containing 1–6 M nitric acid or 0.1 to about 8 M sulfuric acid. Nevertheless, because a contemplated resin can act by an ion exchange mechanism, and for ease of understanding, a contemplated resin will usually be referred to herein as an ion exchange resin.

One embodiment of the present invention contemplates an ion exchange resin that is a polymeric material in which at least 50 mole percent of the polymerized monomers contain a phenyl ring having a phosphonic acid ligand linked thereto. In addition, 35 mole percent of those phenyl ring-containing repeating groups (polymerized monomers) also have a sulfonic acid ligand linked to the ring so that those polymerized monomers contain bifunctionally substituted phenyl rings that have both a monophosphonate ligand and a sulfonate ligand. Such a contemplated ion exchange resin is therefore often referred to herein as a monophosphonic/sulfonic acid resin.

A monophosphonic/sulfonic acid resin contemplated in this embodiment contains about 2 to about 5 millimoles of phosphorus per gram (mmol/g) of polymer and has a ratio of millimoles of phosphorus (phosphonate) to millimoles of sulfur (sulfonate) of up to 3:1, and preferably 3:1 to about 1:2. More preferably, a monophosphonic/sulfonic acid resin contemplated in this embodiment contains phosphorus at about 3 to about 4 mmol/g of polymer, and has a ratio of mmol/g of phosphorus (phosphonate) to mmol/g of sulfur (sulfonate) of 3:1 to about 1:1.

More particularly, at least 50 mole percent of the polymerized phenyl ring-containing monomers that comprise a contemplated ion exchange resin contain phenyl groups that have a phosphonate group linked thereto. At least a portion of the polymerized phenyl group-containing monomers that contain a linked phosphonate ligand also have a sulfonate group linked thereto so that at least 35 mole percent of the repeating groups (polymerized monomers) of the polymer contain a phenyl ring having both phosphonate and sulfonate groups. Preferences as to the amounts of phosphonate and sulfonate ligands present in a contemplated ion exchange resin of this embodiment are discussed hereinafter.

The terms "phosphonate" ligand or group and "sulfonate" ligand or group are used interchangeably with "phosphonic acid" ligand or group and "sulfonic acid" ligand or group, respectively. Whether a phosphonate or phosphonic acid group or a sulfonate or sulfonic acid group is present is a function of pH value, as is well known. In addition, although both the phosphonate and sulfonate groups are ligands and can bind to protons as well as metal cations, it is believed that the phosphorus-containing groups in the resins discussed here and hereinafter in regard to the process are primarily responsible for binding to metal cations having a valence of +3 or greater, whereas the sulfonate ligands primarily bind to water molecules and serve to keep the resin from collapsing in the presence of high concentrations of acid or metal ions.

The phosphonate and sulfonate groups are pendent from a phenyl ring of a polymerized monomer. Thus, the phosphonate and sulfonate groups "hang" or are pendent from the polymer backbone via the intermediacy of the phenyl ring.

The chemical formula of one such functionalized polymeric repeating group having both the phosphonate ligand and the sulfonate ligand linked thereto is depicted in general formula A, below, with both substituent groups depicted in their acid forms and the polymeric repeating unit designated within the parentheses.

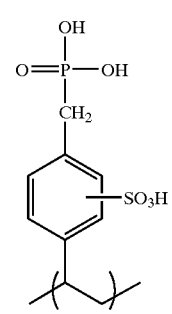

A

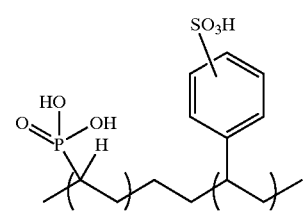

B

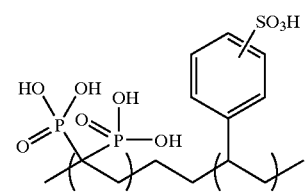

C

-continued

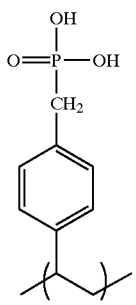

D

An ion exchange resin contemplated by this embodiment exhibits superior heavy metal ion complexation characteristics when compared to prior art ion exchange resins such as a monophosphonic/sulfonic acid resin whose repeating group chemical formula is generally shown in B, above. A polymer of formula B, where the phosphonate group is directly linked to the polymeric carbon backbone, is synthesized by copolymerization of diethyl vinylphosphonate and styrene, followed by sulfonation that cleaves the phosphonate ester linkages.

A contemplated monophosphonic/sulfonic acid resin discussed above or that used in a process of the present invention also exhibits complexation rates that are somewhat slower, but comparable to complexation rates exhibited by diphosphonic/sulfonic acid resin containing repeating groups illustrated in formula C, above, and prepared as described in U.S. Pat. No. 5,449,462 using vinylidene diphosphonic acid, styrene and other monomers, followed by sulfonation.

In particular, the sulfonic acid ligand in the present ion exchange resin is thought to provide an access mechanism for the metal ions in aqueous solution to enter into the polymer matrix by hydrating the matrix and preventing matrix collapse in high ionic strength solutions, as well as permitting rapid ionic complexation by the selective phosphonic acid ligands of the present ion exchange resin. However, it was unexpected that decreasing the ratio of phosphonate to sulfonate from the value of greater than 3 (e.g., 3.2) shown in the work of Trochimczuk et al., *J. Appl. Poly. Sci.* 52:1273 (1994) to a value of about 0.5 to 3 (about 1:2 to 3:1) of the present embodiment would result in an increase in the amount of Eu(III) bound from a nitric acid solution from about 22 percent to the greater than 90 percent shown hereinafter in Tables 3 and 5.

The phosphonate ligand (group) and the sulfonate ligand (group) are both linked to a polymerized monomer that contains a phenyl ring. That the phosphonate and sulfonate ligands are both present on the same phenyl ring is inferred from the respective amounts of phosphonate and sulfonate ligands present in a contemplated ion exchange resin, and absence of polymerized monomers present in the resin that can be either phosphonylated or sulfonated, and spectroscopically as discussed hereinafter.

The phenyl ring for attachment of the ligands is preferably provided by styrene, ethyl styrene, methyl styrene, chloromethyl styrene or combinations thereof. That phenyl ring is typically phosphonylated subsequent to polymerization. The phosphonate group is preferably bonded (linked) to the phenyl ring via a methylene ($-CH_2-$) group that can be added to the polymer in reactive form, for example as a halomethyl group, in a post polymerization step as is discussed elsewhere herein or added prior to polymerization as a chloromethyl styrene monomer. The phosphonate ligand is thus preferably present in the ion exchange resin as part of a phosphonomethylphenyl substituent as is shown in general formula A, hereinbefore.

A monophosphonic/sulfonic acid ion exchange resin of this embodiment contains about 2 to about 5 mmol/g of phosphorus, and more preferably about 3 to about 4 mmol/g of phosphorus due to the phosphonate ligand. A contemplated ion exchange resin prepared from only cross-linked chloromethylated polystyrene, each of whose phenyl rings contains both a phosphonic acid and a sulfonic acid ligand, would theoretically contain about 3.6 mmol/g of each ligand type, presuming the cross-linker to provide no mass and to be free of both phosphorus- and sulfur-containing ligands. As will be seen from the Examples hereinafter, actually determined values for both ligands are somewhat less than the theoretical values, which is believed to be due to some potentially phosphonatable and sulfonatable sites being blocked from reaction, possibly being buried at inaccessible locations within the polymer particles.

In addition, it should be understood that the number of millimoles of phosphorus or sulfur per gram of resin is a function of the molecular weight of a polymeric repeating unit that contains either or both of those atoms. Thus, smaller amounts of sulfonation with a constant amount of phosphonylation provides larger values for the millimoles of phosphorus per gram of resin because the molecular weight of the polymeric repeating unit is less with less sulfonation.

At least about 35 mole percent of the polymerized monomers and consequently the polymerized phenyl group-containing monomers having the phosphonate ligand linked thereto are sulfonated. Preferably, at least about 50 mole percent and more preferably more than about 90 mole percent of the polymerized phenyl group-containing monomers having a phosphonate ligand linked thereto are also sulfonated and are therefore bifunctional. Most preferably, all of the polymerized phenyl group-containing monomers having the phosphonate ligand linked thereto are also sulfonated.

The amount of ligand present in an ion exchange resin is most readily ascertained as a ratio of millimoles of phosphorus or phosphonate ligand relative to the millimoles of sulfur or sulfonate ligand present. For a monophosphonic/sulfonic acid resin of this embodiment, that ratio is up to 3 (3:1), and is 3 to about 0.5 (3:1 to about 1:2), more preferably 3:1 to about 1:1, and is most preferably about 1:1 (indicating equal amounts of both ligands).

One technique for characterizing the degree of sulfonation of a contemplated ion exchange resin is by determining the ratio of phosphonic acidity to the sulfonic acidity. This ratio of acidities is typically about 8:1 to about 1:1 for an ion exchange resin used in a process discussed hereinafter. The ratio of acidities is 6:1 to about 1:1 for an ion exchange resin of this embodiment, more preferably 3:1 to about 2:1, and most preferably about 2:1 (equal numbers of phosphonate and sulfonate groups) for a contemplated ion exchange resin, where the polymerized monomer is styrene that contains both a phosphonic acid ligand and a sulfonic acid ligand linked thereto. These ratios can be determined by determining the total acidity exhibited by the resin after each of the phosphonylation and sulfonation steps, followed by subtraction of the first value from the total to obtain the difference value (sulfonate ligand), and determining the ratio of that first value to the difference value.

A contemplated ion exchange resin also includes a cross-linking material that helps provide water-insolubility to a contemplated exchange resin. Cross-linking of the polymer structure is also believed to stiffen the matrix of the resin and thereby prevent the matrix from collapsing when exposed to acidic environments.

The concentration of the cross-linking material is sufficient to provide water-insolubility up to about 25 percent by weight. Cross-linking is preferably carried out with about 1 to about 25 weight percent divinylbenzene.

Suitable cross-linking materials for use in the present invention include divinylbenzene (DVB), trimethylolpropane triacrylate, trimethylolpropane trimethacrylate, 1,6-hexanediol dimethacrylate, 1,10-decanediol dimethacrylate and the like as are well known in the art. Divinylbenzene is a particularly preferred cross-linking agent, and frequently contains ethyl styrene as an impurity. A person of ordinary skill in the art will appreciate that one can use other cross-linking materials without extending beyond the scope of the present invention.

The polymeric material can also include additional monomers that copolymerize to form co-polymers with styrene and the cross-linking materials set forth above. The additional monomers are nonsulfonatable; i.e., sulfonation of the polymer does not provide sulfonate groups to the polymerized additional monomers. The additional monomers similarly do not react with the phosphonating reagent. The polymerized monomers of the resulting ion exchange resins are therefore free of sulfonate groups, whereas a polymerized phosphonate-containing phenyl ring does contain a sulfonate group. Where DVB is used as the cross-linking agent, a minimal amount of sulfonate is typically present on the reacted cross-linker or on the polymerized ethyl styrene impurity, particularly where a preferred amount of cross-linker is used, and those materials are considered cross-linkers and not monomers.

The concentration of the additional polymerized monomer in the polymeric material is up to about 50 mole percent. It is preferred to utilize less than about 30 mole percent, and more preferably less than about 10 mole percent, additional monomers. Most preferably, the ion exchange resin contains only (i) polymerized phosphonate-containing phenyl rings, each of which also contains a sulfonate group, to the limits imposed by the phosphonylation and sulfonation reactions as discussed before, and (ii) cross-linker.

Examples of suitable additional monomers are acrylic or methacrylic $C_1$–$C_8$ alkyl esters, acrylonitrile, and methacrylonitrile, as are well known. Upon sulfonation and subsequent work-up of the ion exchange resin, the above polymerized monomers are typically present as the corresponding acrylic acid or salt, again depending upon the pH value of the last aqueous medium the resin was in.

The amounts of various polymerized monomers and their amounts of substitution with phosphorus- or sulfur-containing ligands can be determined by use of spectroscopic techniques. Exemplary of such techniques are Fourier-transform infrared (FT-IR) spectroscopy and $^{13}C$ NMR spectroscopy in its various data gathering modes are particularly useful for determining the presence and amount of phenyl ring-containing monomers and the substitution or substitutions on the phenyl rings, as well as distinguishing carbon atoms in the polymer backbone from those present on pendant phenyl rings.

A contemplated ion exchange resin is preferably used in the form of generally spherical microporous beads. Microporous beads having an average particle size of about 0.15 to about 0.42 millimeters in diameter (about 100 to about 40 mesh sieve size) are preferred for use with the present invention and can be readily obtained using well-known polymerization techniques.

Some illustrative resin beads pass through a 10 mesh sieve and are retained on a 50 mesh sieve, whereas other illustrative resin beads pass through a 60 mesh sieve and are retained on a 100 mesh sieve. Such passage and retention by sieves is signified by the designation 10/50, 60/100 or another set of numbers separated by a virgule (/). Smaller and larger beads can also be prepared as desired.

Macroporous beads can be prepared by well-known techniques that utilize a non-reactive organic solvent during the polymerization as discussed in Trochimczuk et al. *J. Appl. Poly. Sci.* 52:1273 (1994). In addition, a person of ordinary skill in the art will appreciate that one can utilize the concepts of the present invention in conjunction with polymers having forms other than microporous or macroporous beads. For example, one can use a resin of the present invention in the form of filaments, hollow fibers, and woven materials.

A preferred process for preparing a contemplated ion exchange resin using a $C_1$–$C_4$ alkyl phosphite is illustrated generally in Synthesis Scheme 1 shown below.

Synthesis Scheme 1

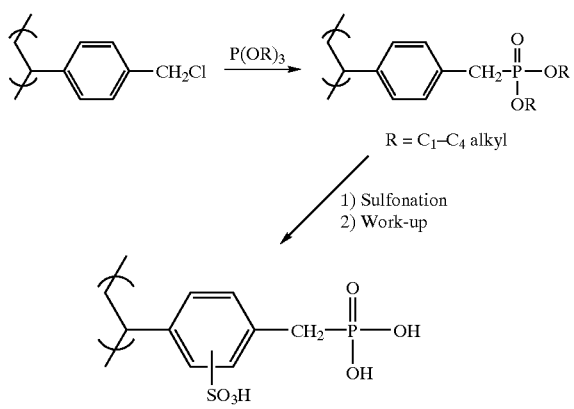

As is seen, a preferred reaction sequence begins with the preparation of chloromethylated cross-linked polystyrene such as the beads whose synthesis is well-known from the preparation of commercially available quaternary ammonium ion-containing ion exchange resins. Generally spherical beads are a preferred form of a contemplated resin and such beads are utilized illustratively herein.

In one procedure, cross-linked polystyrene beads are first prepared that are subsequently chloromethylated by reaction with chloromethyl methyl ether in the presence of aluminum chloride or similar Friedel-Crafts catalyst. The resulting chloromethylated beads are thereafter phosphonylated and sulfonated as discussed hereinafter.

Another process co-polymerizes vinyl benzyl chloride (chloromethyl styrene) and a cross-linker in a manner similar to that used to prepare poly(styrene-co-chloromethylstyrene) resin beads containing 2 percent DVB cross-linker that are described by Tomoi et al. *J. Am. Chem. Soc.* 103:3821 (1981).

Once the chloromethyl polystyrene beads are prepared, the phosphonic acid functionalization step is preferably accomplished by reacting the cross-linked resin with a stoichiometric excess of a phosphite. A $C_1$–$C_4$ trialkyl phosphite such as trimethyl, triethyl, tri-isopropyl or tri-n-butyl phosphite is preferred. Other useful phosphites include triphenyl, tri-isodecyl, tris(2,4-di-tert-butylphenyl) and tris (nonylphenyl) phosphites. The functionalization reaction includes a reflux period of about 15 and 20 hours and preferably approximately 17 hours to produce the corresponding monophosphonate ester resin.

It is often convenient to assay the produced polymer for its phosphonate or phosphorus (P) content. To that end, a portion of the monophosphonate ester resin is then filtered and washed, in series, with acetone, acetone-water, and water. Next, the monophosphonate ester resin is hydrolyzed with a strong acid such as 6 N HCl using about 100 milliliters to about 25 grams of resin, with a reflux period of about 17 hours. In usual practice, the phosphonate esters of the remaining polymer are cleaved to phosphonic acid groups during work-up of the sulfonation step that is discussed below. The phosphonic acid form of the polymer as is illustrated in general formula D, above, can also be used in the sulfonation reaction.

A sulfonic acid (sulfonate) ligand is then added to the monophosphonic acid group-containing resin. Both the sulfonic acid ligand and the phosphonic acid ligand are linked to the same phenyl ring in a contemplated ion exchange resin. Inasmuch as a contemplated polymer need have about 35 percent or more of available sites sulfonated, many aromatic rings in a contemplated resin can contain a phosphonate group and be free of a sulfonate group. However, few, if any, aromatic rings are sulfonated and are also free of phosphonate groups, except for those rings originating from a divinylbenzene or similar cross-linker, as noted before.

As an initial step, the monophosphonic acid-substituted resin is preferably dried by azeotropic distillation, using a convenient solvent such as hexane, benzene or dichloromethane. The monophosphonic acid-substituted resin is then mixed with ethylene dichloride (hereinafter "EDC"). Next, the mixture of resin and EDC is cooled to a temperature of less than about 10° C., and preferably less than about 5° C.

A solution of EDC and chlorosulfonic acid is thereafter admixed with the resin and EDC mixture, and is permitted to react to effect sulfonation. Preferably, the solution contains about 50 and 80 milliliters, and preferably approximately 66 milliliters, of EDC. The solution also contains about 10 and 20 milliliters, and preferably approximately 16.5 milliliters, of chlorosulfonic acid per 25 grams of phosphonylated resin.

The sulfonation reaction is conducted at a temperature of about 20° C. to about 30° C., and preferably at approximately 25° C. over a time period of at least 20 hours, and preferably approximately 48 hours. Once the reaction is completed, the difunctionalized resin is preferably washed with dioxane and water solutions.

It has been found that the monophosphonic acid-substituted resin cross-linked at the 25 percent DVB level is unable to react with chlorosulfonic acid under the conditions noted above. Instead, that material is reacted with 90% $H_2SO_4$ at an elevated temperature of at least 100° C. and preferably about 110° C. for a time period of about 3 hours. After the sulfonic acid functionalization reaction is complete, the resin is preferably washed with aqueous solutions of $H_2SO_4$, and is then typically extracted in a Soxhlet extractor with water, and eluted with water, 1 N NaOH, water, 1N HCl, and water, or otherwise conditioned in an acidic aqueous solution for use in removing polyvalent metal ions.

A person of ordinary skill in the art will appreciate that one can use other techniques to fabricate a monophosphonic/ sulfonic acid resin described herein without departing from the scope of the present invention. For example, one can prepare cross-linked polystyrene beads of a desired average diameter following well-known procedures as by adjusting the stirring rate during polymerization.

A preferred contemplated monophosphonic/sulfonic acid of the present embodiment exhibits an acid capacity that is approximately three times the phosphorous content of the resin. This ratio indicates that there is nearly complete hydrolysis of the phosphonate diester ligands. The ratio of acid capacity to phosphorous capacity also indicates that there is substantially complete sulfonation of the resin.

The percent solids of the sulfonated monophosphonic acid resin decreases with respect to the non-sulfonated monophosphonic acid resin. This change results from the sulfonic acid ligand's hydrophilicity that causes water to be sorbed into the matrix as the matrix hydrates.

The monophosphonic/sulfonic acid resin exhibits significantly faster complexation rates than monophosphonic acid resins such as a resin whose general chemical formula is shown in D hereinbefore, and also faster rates than a monophosphonic/sulfonic acid resin where the phosphonate ligand is directly linked to the polymeric backbone as in general formula B shown before.

A contemplated monophosphonic/sulfonic acid resin also exhibits complexation rates that enable the monophosphonic/sulfonic acid resin to be used as a substitute for a diphosphonic/sulfonic acid resin such as that shown in general formula C before. A contemplated monophosphonic/sulfonic acid ion exchange resin is also more easily and inexpensively prepared than is a diphosphonic/sulfonic acid resin shown in general formula C because of the general availability, ease of polymerization and subsequent reaction of its components.

II. The Process

A process for the separation and removal of iron(III) ($Fe^{3+}$) cations (ions) from aqueous metal cation-containing acid solutions, such as a sulfuric acid solution, is particularly contemplated. Such a process comprises the following steps:

(a) An aqueous metal ion-containing sulfuric acid medium that contains iron(III) ions as well as ions having a valence of less than +3 of at least one additional metal is contacted with solid ion exchange medium that is preferably in the form of particles. The ion exchange medium binds to the iron(III) ions in preference to the additional metal ions present to form a solid/liquid phase admixture.

An ion exchange resin useful in a contemplated process is a cross-linked water-insoluble polymer comprised of polymerized monomers that contain monophosphorus acid functional groups and also contain sulfonic acid functional groups. A monophosphorus acid functional group contains a single phosphorus atom that can be present in the form of a phosphonic acid as in the first embodiment, a phosphinic acid group, or a mixture of both phosphonic and phosphinic acids, or a phosphoric acid ester (phosphate ester). The single phosphorus atom can be linked to the polymer backbone as where a polymerized vinyl phosphonate is used, or can be linked to a pendent phenyl ring of a polymerized styryl monomer. In addition, a phosphorus atom bonded to a phenyl ring can be bonded directly to the ring or can be bonded indirectly to a ring carbon atom via a methylene group as a methylenephosphonate or methylenephosphonate or an oxygen atom as a monophosphonate ester.

A cross-linked sulfonated phosphorus acid functional group-containing polymer is referred to herein as a monophosphorus/sulfonic acid resin or monophosphorus/ sulfonic acid ion exchange resin. The polymerized monomers preferably include a phenyl ring to which the monophosphorus acid functional group is bonded. A monophosphorus/sulfonic acid resin contemplated for use in this embodiment contains about 2 to about 5 millimoles of phosphorus per gram (mmol/g) of polymer and has a ratio of millimoles of phosphorus (phosphonate or phosphonic or acid, phosphinate or phosphinic acid, or phosphate or phosphoric acid) to millimoles of sulfur (sulfonate or sulfonic acid) of about 4:1 to about 1:2. A monophosphonic/sulfonic acid ion exchange resin of the first embodiment is a particularly preferred monophosphorus/sulfonic acid ion exchange resin for use in this embodiment.

Thus, a monophosphonic/sulfonic acid ion exchange resin described in the before-discussed embodiment can be used in this process, and such use is preferred. In addition, an ion exchange resin having a phosphonic acid ligand to sulfonic acid ligand ratio of greater than 3 such as the material having a ratio of about 3.2 (4.0/1.24) such as that described in Trochimczuk et al., *J. Appl. Poly. Sci.* 52:1273 (1994) can also be used in a contemplated process. The usefulness of a Trochimczuk et al. resin in this process was unexpected because of the relatively poor complexation of Eu(III) ions from strong acid solution that was reported in that paper. However, Fe(III) has been found to have a greater affinity for the ligands present in a monophosphonic/ sulfonic acid ion exchange resin described herein and in the Trochimczuk et al. paper than do Eu(III) ions. Additional illustrative resins useful in this process are discussed hereinafter.

(b) That contact is maintained between the sulfuric acid solution containing iron(III) ions and a sufficient amount of solid ion exchange particles for a time period sufficient to form solid phase-bound iron(III) ions and an aqueous liquid phase containing sulfuric acid and the additional metal ions.

(c) The solid and liquid phases are separated.

(d) The separated solid phase-bound iron(III) ions are contacted with an aqueous stripping solution, thereby forming a second solid/liquid phase admixture.

(e) The second solid/liquid phase admixture is maintained at a temperature of about room temperature to about 95° C. for a time period sufficient to form an aqueous liquid phase containing iron(II) cations and a solid phase of regenerated ion exchange particles.

(f) The iron cation-containing liquid phase is separated from the regenerated solid phase ion exchange particles.

The preferences noted before for an ion exchange resin contemplated in the first embodiment are also preferred for use of such a resin in a contemplated iron(III) removal process. It is therefore preferred that the cross-linked ion exchange resin contain only polymerized monomers that have phosphonate-containing phenyl rings (except for a minor amount of polymerized cross-linker), contain about 2 to about 5 millimoles of phosphorus per gram of polymer and have a ratio of millimoles of phosphorus (phosphonate) to millimoles of sulfur (sulfonate) of 3:1 to about 1:2.

Another useful ion exchange resin contains a phosphonic acid group linked directly to the phenyl ring of a polymerized monomer such as styrene; i.e., there is no intermediate methylene group between the phenyl ring and the phosphonic acid ligand. Here, a phosphinic acid ligand is first prepared, then oxidized to a phosphonic acid ligand and the phosphonic acid-containing resin is thereafter sulfonated. One exemplary phosphinic acid ligand-containing intermediate resin is described in U.S. Pat. No. 4,664,700, whose disclosures are incorporated herein by reference. An abbreviated synthetic procedure based on the disclosures of that patent for the preparation of a useful monophosphorus/sulfonic acid ion exchange resin from a resin containing cross-linked and polymerized styryl groups is shown below in Synthesis Scheme 2, wherein [Ox] is an oxidant such as hydrogen peroxide.

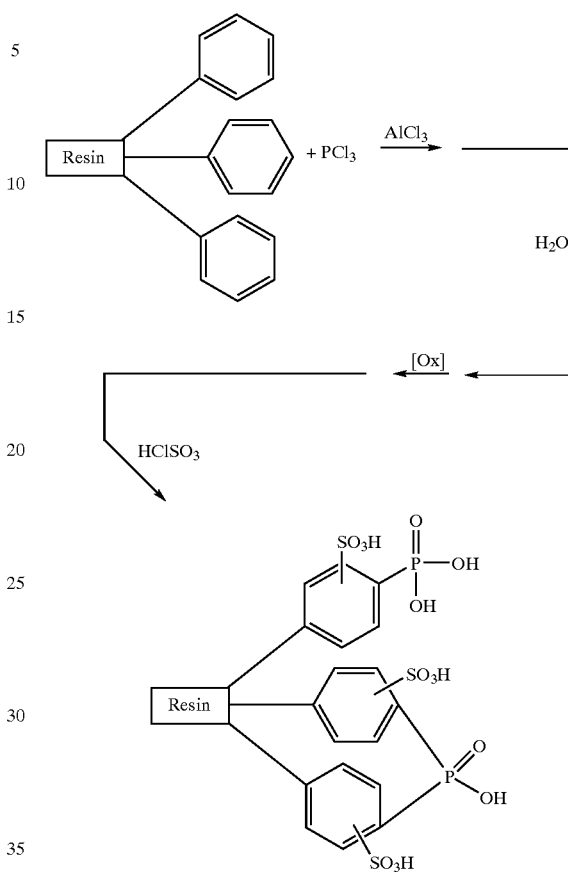

Synthesis Scheme 2

Using DVB-cross-linked polystyrene beads as an exemplary material for an ion exchange resin, a composition containing phosphorous trichloride ($PCl_3$), neat or in a suitable solvent that does not react with $PCl_3$ such as heptane, and the cross-linked polystyrene is admixed for at least about 30 minutes and preferably approximately 1 hour. The amount of phosphorous trichloride in the admixture is selected based on the desired degree of functionalization, which is preferably maximal.

Next, $AlCl_3$ catalyst is added to the $PCl_3$-containing admixture, and the resulting reaction mixture is heated at a temperature up to about 90° C., and preferably to about 60° C. to about 80° C., and more preferably at about 70° C. to about 75° C., over a time period of at least 1 hour, and more typically for a time period of about 4 to about 6 hours. During that time period, a reaction product is formed that contains a plurality of polymerized styryl residues having linked —$PCl_2$ or —PCl groups.

The styryl-linked —$PCl_2$ or —PCl groups are then hydrolyzed by admixing a solution of water that is saturated with sodium chloride with the above-formed reaction product. This reaction is preferably carried out at a temperature of less than 10° C., and preferably about zero degrees C. This hydrolysis reaction forms a plurality of polymerized styryl-linked primary phosphinic acid groups (—$PO_2H_2$), secondary phosphinic acid groups (=$PO_2H$) or polymerized styryl-linked phosphine oxide groups (=PO).

The phosphorus-functionalized cross-linked polymer is washed by sequentially contacting the solid with water, 1 N HCl, and water. Each of those contactings is typically maintained for at least about 30 minutes, and preferably about 1 hour.

The resulting primary phosphinic acid/secondary phosphine oxide (=PHO) or secondary phosphinic acid (=PO$_2$H) polymer is thereafter oxidized to form a cross-linked polymer that contains primary phosphonic acid (—PO$_3$H$_3$) and secondary phosphinic acid groups (=PO$_2$H). Inasmuch as pentavalent phosphorus is readily oxidizable, almost any oxidizing agent can be used for this step. Hydrogen peroxide (20%) reacted for several hours at about 100° C. is a preferred oxidant here. The formation of the phosphonate/phosphinate precursor polymers is discussed in Alexandratos et al., *Macromolecules* 19:280–287 (1986).

The phosphorus-containing cross-linked polystyrene is usually assayed for its phosphorus content either before or after the oxidation step. In addition to total phosphorus, the amounts of primary and secondary phosphorus-containing groups is also determined. Inasmuch as oxidation from pentavalent to heptavalent phosphorus can be achieved by the sulfonating reagent, e.g., chlorosulfonic acid, it is preferred to assay for phosphorus prior to sulfonation and to omit a separate oxidation step.

Thus, the phosphinic acid/phosphine oxide polymer is preferably sulfonated without an intervening oxidation step. This sulfonation is carried out as described elsewhere herein, such as in Example 1 hereinafter.

Still further monophosphonic/sulfonic acid ion exchange resins can be prepared through the use of vinyl phosphonic acid and/or vinyl sulfonic acid or their C$_1$–C$_6$ alkyl esters as monomers. Most simply, those two monomers can be co-polymerized along with a cross-linker to form a useful ion exchange resin. In addition, either or both can be co-polymerized with another monomer such as styrene to form an intermediate resin that is reacted further to form a desired ion exchange resin. For example, diethyl vinyl phosphonic acid can be co-polymerized along with styrene and DVB to form a water-insoluble resin that is thereafter sulfonated and hydrolyzed to form an ion exchange resin such as that shown in general formula B. A discussion of the synthesis of a membrane form of an ion exchange resin corresponding to that shown in general formula B can be found in Yamagami et al., *Ann. Rep. Rad. Cen. Osaka Prefecture*, 15:86 (1974).

Another illustrative resin that can be used in a contemplated process is a cross-linked, sulfonated poly(styrene phosphate). This resin is also readily prepared starting with commercially available 4-acetoxy styrene that is co-polymerized and cross-linked as discussed before. The ester groups of resulting cross-linked poly(acetoxy styrene) resin are thereafter hydrolyzed to provide the corresponding cross-linked phenol resin; i.e. poly(hydroxystyrene). The hydroxyls of the cross-linked poly(hydroxystyrene) are then phosphorylated a C$_1$–C$_4$ alkyl chlorophosphate such as diethyl chlorophosphate, the alkyl esters hydrolyzed and the phosphate (phosphoric acid)-containing resin is sulfonated as discussed elsewhere herein. An exemplary synthesis for a sulfonated poly(styrene phosphate) ion exchange resin useful as a monophosphorus/sulfonic acid resin is illustrated below in Synthetic Scheme 3.

Synthesis Scheme 3

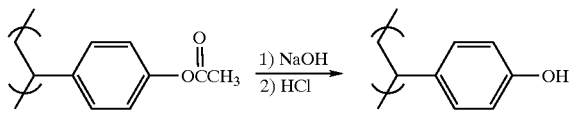

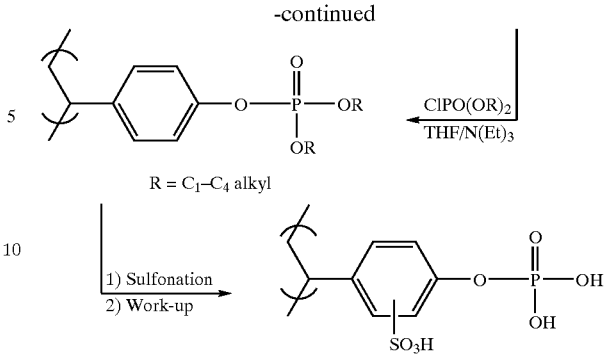

A contemplated aqueous sulfuric acid metal ion-containing medium is typically a spent or copper-depleted copper electrowinning solution. The usually used solution can have suspended particles present in colloidal or larger size and is therefore usually referred to herein as an aqueous medium. A contemplated aqueous medium can have a sulfuric acid concentration that is from about 0.1 molar to about 8 molar, but more typically has a sulfuric acid concentration of about 0.1 molar to about 6 molar and preferably has a sulfuric acid concentration of about 1 to about 3 molar.

The polyvalent metal cations present in such a solution can include iron(II), iron(III), copper(II), cobalt(II), and can sometimes include manganese(II) ions. Monovalent metal cations such as those of sodium and potassium can also be present, but their presence is not relevant to a contemplated process and such cations will not be discussed further herein. Of those polyvalent cations, iron ions are typically present at about 1 to about 10 grams/liter (g/L) as iron(III) or a mixture of iron(II) and iron(III) ions. When present as a mixture, as is obtained from a depleted EW solution, iron(II) is typically present at about 15 to about 25 percent of the total iron present. Copper(II) ions are present at about 30 to about 50 g/L, and cobalt ions are typically present at about 0.05 to about 0.2 g/L. Manganese(II) ions can be present at less than about 0.005 to about 0.12 g/L.

The contemplated ion exchange resin in the form of beads is typically utilized in a chromatographic column, and such a column is typically used for carrying out the contacting and maintenance steps of a contemplated process. However, such beads or other form of a contemplated ion exchange resin can also be utilized in a beaker or flask or other container.

Contact between the solution and the ion exchange resin is maintained for a time period sufficient for the medium to bind iron(III) ions. Because of the tight binding (affinity) observed between iron(III) ions and the ion exchange medium, binding to a given medium type is rapid.

However, when used in large quantities or even for accurate laboratory studies of binding coefficients, one to two or even more hours can be used to load the ion exchange medium with iron(III) ions. Thus, the maintenance time utilized can depend upon the user's purposes as well as the individual batch of ion exchange medium. Useful times for contacting can be readily determined by carrying out iron binding studies similar to those illustrated in U.S. Pat. Nos. 5,582,737, 5,449,462 and 5,281,631 with varying maintenance times for loading the medium with a constant amount of iron(III) ions and a given set of stripping conditions.

In typical practice, the amount of ion exchange medium and concentration of iron(III) to be removed are paired so there is an excess of exchange capacity over the equivalents of iron(III) ions to be removed. Such a pairing minimizes the likelihood that some iron(III) ions will not be separated and removed. Of course, if some iron(III) is desired or can be tolerated, the iron(III) ions can be present in excess over the exchange capacity of the ion exchange medium.

After the solid phase-bound iron(III) ions and aqueous sulfuric acid-containing liquid phase have been formed during the maintenance step, the solid and liquid phases are separated. In a batch process, the solid and liquid phases can be physically separated by simple decantation or centrifugation followed by decantation or other removal of the liquid phase. It is preferred to rinse the separated solid phase with about 1 to about 3 molar aqueous sulfuric acid, with the washings added to the separated liquid phase.

In a preferred process where the ion exchange medium is in the form of particles that are contained in one or more columns, the solid and liquid phase separation is effected by elution. The eluting solution is the above about 1 to about 3 molar sulfuric acid.

The separated liquid phase contains the metal ions of valence less than +3 that did not bind to the particles. In a copper electrowinning situation, copper(II), cobalt(II) and iron(II) ions are present as may be manganese(II) ions. This separated liquid phase can then be returned directly to the copper electrowinning apparatus for further electroplating or to the solvent extraction plant.

It can be desirable to remove iron(II) ions as well as iron(III) ions from the process stream. As noted elsewhere, in a copper EW process, iron(II) ions can constitute about 15–25 percent of the total iron ions present. A simple oxidation with a mild oxidant such as hydrogen peroxide can be used to convert iron(II) ions to iron(III) ions in the aqueous sulfuric acid metal ion-containing solution prior to the above contacting step so that additional iron ions can be separated and removed from the solution in the iron(III) form.

The separated solid phase contains bound iron(III) ions that are removed (stripped) so that the ion exchange resin can be regenerated and reused. A stripping solution is therefore contacted with the solid phase-bound iron(III) ions to regenerate the ion exchange resin.

In one embodiment, stripping of the bound iron(III) cations can be achieved by contacting the solid phase-bound iron(III) ions with a stripping solution that contains about 4 to about 10 M, and preferably about 6 M, hydrochloric acid to form a second solid/liquid phase admixture. The second solid/liquid phase admixture is maintained at a temperature of about room temperature to about 95° C., and preferably at room temperature (e.g., about 22° C.) up to about 30° C., for a time period sufficient to form an aqueous liquid phase containing iron(III) cations and a solid phase of regenerated ion exchange particles. The iron(III)-containing liquid phase is separated from the regenerated solid phase ion exchange particles.

The ion exchange resin can also be regenerated by contacting the solid phase-bound iron(III) ions with a reducing agent to form iron(II) ions that are free in solution because the resin binds iron(II) poorly. Although several reductants can be used, it is preferred to use a reductant whose reaction products do not add additional substances to the overall composition.

The Gula et al., U.S. Pat. No. 5,582,737 teaches that sulfur dioxide or sulfurous acid are themselves inefficient in carrying out a required reduction. However, when copper ions in at least a catalytic amount were added to an aqueous sulfur dioxide (sulfurous acid) solution, the efficiency of the sulfurous acid reductant ion exchange particle regeneration [iron(III) stripping] increased to a useful level. Such a reduction is used in one aspect of a contemplated process.

In this aspect, the copper ions can be copper(I) or copper (II) ions, although it is believed that the active reductant is the copper(I) ion. In one preferred embodiment of this aspect, the copper ions are provided by use of the above-separated liquid phase, or a diluted solution thereof, or from a copper sulfate solution prepared expressly for the purpose of providing these copper ions.

In another embodiment of this aspect, a solution of sulfuric acid containing copper(II) ions is first passed over copper metal and the resulting solution containing dissolved copper is used for the reduction upon addition of sulfurous acid.

The sulfuric acid concentration of this reducing solution is typically about 0.5 to about 6 molar, with a concentration of about 1 to about 3 molar being preferred.

As noted above, the amount of copper ions present can be from a catalytic amount upward to an amount present in the spent electrolyte used in separating and removing iron(II) ions; i.e., about 35 grams per liter (g/L). More preferably copper ions are present in an amount of about 0.5 to about 7 g/L, and most preferably in an amount of about 1 to about 5 g/L.

Without wishing to be bound by theory, the following forward equations are thought to describe the mechanism of iron reduction and stripping from a contemplated ion exchange particles, where (Bound) indicates a species bound to the particles and (aq.) indicates a species in the aqueous phase.

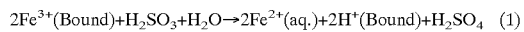
$$2Fe^{3+}(Bound)+H_2SO_3+H_2O \rightarrow 2Fe^{2+}(aq.)+2H^+(Bound)+H_2SO_4 \quad (1)$$

This main reaction (1) can be expanded into the following three equations, where copper ions are in the aqueous phase at all times.

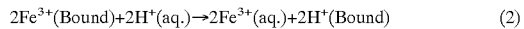
$$2Fe^{3+}(Bound)+2H^+(aq.) \rightarrow 2Fe^{3+}(aq.)+2H^+(Bound) \quad (2)$$

$$2Cu^{2+}+H_2SO_3+H_2O \rightarrow 2Cu^++H_2SO_4+2H^+ \quad (3)$$

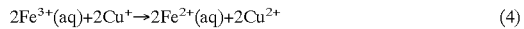
$$2Fe^{3+}(aq)+2Cu^+ \rightarrow 2Fe^{2+}(aq)+2Cu^{2+} \quad (4)$$

In accordance with equation (2) above, it is believed that it is the iron(III) that is free in solution and in equilibrium with bound iron(III) that actually undergoes reduction. That equilibrium is further believed to lie far to the left, due to the tight iron(III) ion binding observed, so relatively little of the iron(III) is actually in the aqueous phase at any time. Thus, the reduction observed is a slow process.

The temperature at which regeneration (stripping) is carried out also can play a role in process efficiency. It has been found that a temperature of about 85° C. is maximal for stripping using sulfurous acid due to pressure considerations and the fact that copper sulfide is inexplicably formed on fittings at 85° C. It is preferred that the ion exchange regeneration step using added sulfur dioxide or sulfurous acid be carried out at a temperature of about 65° C., and more preferably at a temperature of about 65° C. to about 75° C., temperatures at which copper sulfide was not observed to be formed.

The amount of sulfurous acid present is that amount that is sufficient to reduce the bound iron(III) ions to iron(II) ions so that at least 50 percent of the ion exchange particles are regenerated. In preferred practice, that amount is about 0.3 to about 1.0 molar, and is more preferably about 0.6 to about 0.8 molar as $SO_2$. The limit of solubility of sulfurous acid in a contemplated sulfuric acid solution is about 1.1 molar, so an amount from stoichiometric up to saturation can be utilized.

It is noted that sulfurous acid can be provided by a solution of preformed sulfurous acid, or $SO_2$ gas can be added to the sulfuric acid solution to provide the sulfurous acid. In addition, alkali metal and ammonium bisulfites and sulfites form sulfurous acid when admixed with sulfuric acid so the sulfurous acid utilized can be formed in situ by addition of sodium sulfite, ammonium bisulfite or the like to the sulfuric acid solution. Previously prepared sulfurous acid or added $SO_2$ gas are preferred for providing the sulfurous acid.

In this aspect, the second solid/liquid phase admixture formed is maintained at a temperature such as about 65° C. to about 85° C. and for a time period sufficient to form regenerated solid phase ion exchange particles and a liquid phase containing aqueous sulfuric acid and iron(II) ions to form.

Contrary to most ion exchange loading and stripping situations, the stripping (regeneration) step is slower here than is the loading step. This is presumably because only a very low concentration of reducible iron(III) ions are present in an unbound state in the aqueous phase of any time due to the high affinity of these ion exchange particles for iron(III), as was noted before.

The time required to regenerate the ion exchange particles is a function of a number of variables as has already been discussed. In addition, that time is a function of the amount of regeneration desired. In a commercial setting that desired regeneration is typically about 50 percent. Maximal stripping (regeneration) typically takes about 60 to 90 minutes for a laboratory set up as is described hereinafter. In a pilot or full-scale commercial setting, regeneration times are typically about 90 to about 240 minutes.

The regenerated solid phase ion exchange particles are then separated from the iron(II)-containing liquid phase. This separation of phases can be carried out as discussed before, however, in preferred practice where the solid phase ion exchange particles are contained within one or more columns, that phase separation is carried out by elution.

A reductive ion exchange resin regeneration process such as that discussed immediately above can be improved by using a reducing solution that contains only copper(I) as the reductant and omits added sulfurous acid; i.e., an added $SO_2$-free reducing solution. The copper(I) reducing agent reacts with the iron(III) to form copper(II) and iron(II) ions.

In one preferred embodiment of this aspect, the copper(I) ions are provided by contacting copper(O) metal with the above-separated liquid phase that contains copper(II) ions, or a diluted solution thereof, or by dissolving a copper(I) salt directly into a solution prepared expressly for the purpose of providing these copper ions.

There are several potential sources of the copper(O) metal. Chopped scrap copper wire is readily available from wire manufacturers and is highly reactive. Copper cathode that does not meet commercial purity specifications (off-specification copper cathode) can be recycled to this reactor. Copper "nodules", small nodules or protrusions that have broken away from the final cathode, are recovered in many electrowinning plants. Copper metal in fine particulate form can be precipitated from leach solutions of the leach circuit by adding metallic iron powder or wire. Commercially available copper shot can also be used, for example, a bed of 2–4 mm copper shot. The copper(O) metal dissolves in the acidic solution to form copper(I) ions and provide a reducing copper(I) solution.

The sulfuric acid concentration of this reducing copper(I) solution is typically about 0.1 to about 6 molar, with a concentration of about 1 to about 3 molar being preferred. Some ion exchange particles have been destroyed by use of an 8.0 M sulfuric acid stripping solution.

The amount of copper ions present can range from the amount of copper(O) that dissolves into the sulfuric acid solution upward to the limit of solubility of copper(I) in the sulfuric acid solution. The concentration of copper(I) ions present in solution is preferably sufficient to reduce the bound iron(III) on a single contacting with the iron(III)-bound ion exchange medium. The reduction reaction is stoichiometric, so all that is needed is the number of moles of copper(I) ions that is equal to the number of moles of iron(III) ions that are bound on the ion exchange medium, where complete removal of the bound iron(III) is desired.

Without wishing to be bound by theory, the following forward equation (5) is thought to describe the mechanism of iron reduction and stripping from contemplated ion exchange particles, where (Bound) indicates a species bound to the particles and (aq) indicates a species in the aqueous phase.

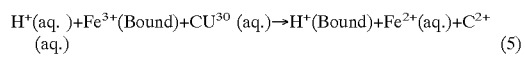

$$H^+(aq.)+Fe^{3+}(Bound)+CU^{30}(aq.) \rightarrow H^+(Bound)+Fe^{2+}(aq.)+C^{2+}(aq.) \quad (5)$$

Thus, it is currently believed that the bound iron(III) is directly reduced by the Cu(I) ions. Initial evidence suggests diffusion-limited kinetics for this reduction, rather than chemical control. In contrast, in Gula et al., U.S. Pat. No. 5,582,737, the available evidence indicated that the $SO_2$ reductant acted upon free, unbound, aqueous iron(III).

The temperature at which regeneration (stripping) is carried out also plays a role in process efficiency. Here, it has been found that a temperature of about 95° C. is maximal for stripping, inasmuch as the sulfur dioxide pressure does not provide an adverse consideration in the present invention. It is preferred that the ion exchange regeneration step be carried out at a temperature of at least about 65° C., and more preferably at a temperature of about 65° C. to about 90° C.

The amount of copper(I) ions present is that amount that is sufficient to reduce the bound iron(III) ions to iron(II) ions so that some portion of the ion exchange particles are regenerated. The liquid phase solution containing copper(II) ions and iron(II) ions after reduction of some of the bound iron(III) can be reused by forming in situ or adding more copper(I) ions. The newly-added copper(I) ions reduce more of the bound iron(III), and the solution can be used again until all of the iron(III) is removed from the ion exchange particles.

In preferred practice, the amount of copper(I) ions in the aqueous reducing solution is at least about 300 ppm (about 0.005 M) to about 3 g/L (about 0.05 M) copper (I), and is more preferably at least about 1.5 g/L (about 0.025 M) copper (I). The limit of solubility of copper(I) ions in a contemplated sulfuric acid solution is about 3 g/L (0.05 M), so an amount up to saturation can be utilized.

In this embodiment of this aspect of a contemplated process, the second solid/liquid phase admixture formed is maintained at a temperature such as about 65° C. to about 85° C. and for a time period sufficient to form regenerated solid phase ion exchange resin and a liquid phase containing copper(II) ions and iron(II) ions to form.

As noted with the sulfurous acid reductive stripping, and contrary to most ion exchange loading and stripping situations, the stripping (regeneration) step may be slower here than is the loading step. This is presumably because only a very low concentration of copper(I) ions is present in the aqueous phase at any time due to the relatively low solubility of copper(I) ions in a sulfuric acid medium below the boiling point.

The time required to regenerate the ion exchange particles is a function of a number of variables as has already been discussed. In addition, that time is a function of the amount of regeneration desired. In a commercial setting, that desired regeneration is typically about 50 percent. Maximal stripping (regeneration) typically takes about 60 to 240 minutes for a laboratory set up as is described hereinafter.

Although total removal of the iron from the ion exchange resin can be achieved in consecutive stripping steps, use of a very large number of stripping steps is not always economically desirable. A practical goal is to restore about 80 percent of the functional capacity of the resin, and it is advantageous to do that in the minimum number of strip sessions. Multiple stripping steps; i.e. the passing through of many bed volumes of copper(I)-containing stripping solution, is often necessary to achieve a practical amount of regeneration. The contact times and copper(I) amounts are dependent upon the amount of iron removal needed per application.

The regenerated solid phase ion exchange medium is then separated from the iron(II)-containing liquid phase. This separation of phases can be carried out as discussed before. However, in preferred practice where the solid phase ion exchange medium is in particulate form contained within one or more columns, that phase separation is carried out by decantation or other mode of solid/liquid phase separation such as replacement of one liquid by another.

The following Examples are offered to further illustrate, but not limit the present invention. The first eight Examples illustrate the synthesis and characterization of a useful monophosphonic/sulfonic acid ion exchange resin, whereas the remaining Examples illustrate the comparative use of such a material as a monophosphorus/sulfonic acid resin in a contemplated process.

EXAMPLE 1

Resin Preparation and Characterization

The performance of contemplated bifunctional monophosphonic/sulfonic acid ion exchange resins of the present invention was analyzed with respect to monofunctional resins. Microporous beads of poly(chloromethylstyrene) were polymerized at cross-link levels of 2, 12, or 25 percent DVB. The resulting beads had a particle size diameter of about 0.25 and 0.42 millimeters, or about 40 to 60 mesh.

The process for preparing the 2 percent DVB cross-linked resin includes mixing gelatin (about 1.35 grams), poly(diallyldimethylammonium chloride) (about 12.3 grams), boric acid (about 5.1 grams), and water (about 450 grams) in a flask. The mixture was adjusted to a pH of approximately 10.0 with 25 percent aqueous sodium hydroxide.

A solution of styrene (about 214 grams), chloromethylstyrene (about 75 grams), technical grade 55 percent divinylbenzene (about 10.9 grams), and azobisisobutyronitrile (about 1.5 grams) was then added to the flask. The material in the flask was heated to a temperature of about 70° C., continuously stirred, and maintained under a nitrogen purge for approximately 17 hours during which time cross-linking occurred. Cross-linking caused generally spherical shaped droplets to form. Polymerized spheres were then removed from the mixture. The 12 percent and 25 percent cross-linked DVB resins were prepared using a similar process.

Phosphonic acid functionalization was performed by reacting the cross-linked poly(chloromethylstyrene) resin (25 g) with an excess of triethyl phosphite (100 mL). The reaction included a reflux period of approximately 17 hours. The reacted resin was then filtered and washed with 100 mL each of methanol/water (causing an exothermic reaction), water, and 6 N HCl, with stirring for 15 minutes for each wash.

In one procedure, the resin ester groups were hydrolyzed by reaction with 6 N HCl at reflux for 17 hours, followed by several washes with water.

The monophosphonic acid resins cross-linked with 2 percent and 12 percent divinylbenzene (DVB) were fully functionalized with sulfonic acid moieties. As an initial step, the monophosphonic acid resins were dried using azeotropic distillation with heptane.

Next, approximately 25 grams of the monophosphonic acid resins were placed in a 500 milliliter round-bottom flask equipped with an overhead stirrer and addition funnel. Approximately 200 milliliters of ethylene dichloride (EDC) were added to the flask and the resulting mixture was stirred for approximately 1 hour.

The mixture was then cooled to a temperature of approximately 5° C. by partially submersing the round-bottom flask in an ice bath. A solution containing approximately 66 milliliters of EDC and approximately 16.5 milliliters of chlorosulfonic acid was slowly added to the mixture in the flask over approximately 2 hours. After all of the solution was added, the round-bottom flask was removed from the ice bath.

To permit functionalization to complete, the mixture was stirred and maintained at a temperature of approximately 25° C. for approximately 48 hours. Next, the difunctionalized resin was washed with dioxane and water solutions. Successive washings were performed with gradually decreasing ratios of dioxane to water of 9:1, 3:1, 1:1, and 0:1. For each washing, approximately 100 milliliters of the dioxane and water solution were mixed with the difunctionalized resin for approximately 20 minutes.

It is noted that an above-described sulfonation reaction not only adds a sulfonate group to a phosphorous-containing phenyl ring of the polymer, but also results in hydrolyzing the phosphonate ester linkages to form phosphonic acid or phosphonate groups, depending on the pH value of the last wash solution.

Use of chlorosulfonic acid was not sufficient to produce bifunctionalization of the monophosphonic acid resin cross-linked with 25 percent DVB. As such, the 25 percent DVB resin was bifunctionalized using 90% $H_2SO_4$.

As an initial step, the monophosphonic acid resin was rinsed successively with 100 mL portions of 10%, 30%, 60% and 90% sulfuric acid. Each washing was stirred for approximately 15 minutes. The monophosphonic acid resin was then mixed with approximately 250 milliliters of 90% $H_2SO_4$, heated to a temperature of approximately 110° C., and permitted to react for approximately 3 hours to bifunctionalize the resins.

Next, the bifunctional resins were cooled to approximately room temperature and then washed successively with aqueous solutions of 60%, 30% and 10% sulfuric acid, and then water. Each washing was carried out for about 15 minutes. The resins were thereafter conditioned for use in the chromatographic separations discussed hereinafter.

The resins were analyzed before and after sulfonation for the percent solids ($g_{dry}/g_{wet} \times 100$), i acid capacity, and phosphorous capacity. The results of the bifunctional phosphonic/sulfonic acid ion exchange resin are reported in Table 1, below. The results of the monofunctional phosphonic acid ion exchange resin are reported in Table 2.

TABLE 1

Characterization of Bifunctional
Phosphonic/Sulfonic Acid Ion Exchange Resins

| Percent DVB | Percent Solids ($g_{dry}/g_{wet}$) × 100 | Acid Capacity (mmol/g) | P Capacity (mmol/g) |
|---|---|---|---|
| 2 | 33.7 | 10.89 | 3.52 |
| 12 | 53.4 | 9.03 | 3.10 |
| 25 | 71.2 | 6.88 | 1.95 |

TABLE 2

Characterization of Monofunctional
Phosphonic Acid Ion Exchange Resins

| Percent DVB | Percent Solids ($g_{dry}/g_{wet}$) × 100 | Acid Capacity (mmol/g) | P Capacity (mmol/g) |
|---|---|---|---|
| 2 | 51.2 | 9.88 | 4.94 |
| 12 | 76.0 | 7.69 | 4.10 |
| 25 | 83.0 | 4.84 | 2.55 |

The phosphorous capacity of the monofunctional phosphonic acid ion exchange resin (P) was within about 0.2 mmol/g of the theoretical value. This phosphorous capacity indicates that the ion exchange resins are completely functionalized during the reaction with triethyl phosphite. The acid capacity of the monophosphonic acid resin is approximately twice the phosphorous capacity of this resin indicating that there is almost complete hydrolysis of the phosphonate diester ligands.

Converting the ion exchange resins cross-linked with 2 percent and 12 percent DVB into bifunctional phosphonic/sulfonic acid resins through the reaction with chlorosulfonic acid appears to achieve substantially complete sulfonation because the acid capacity of the bifunctional resin increases from twice to about three times the phosphorous capacity of the resin. It is believed that the 48-hour reaction time plays an important role in achieving substantially complete sulfonation reaction.

The percent solids of the functionalized resins decrease after sulfonation for each of the DVB concentrations due to the hydrophilicity of the sulfonate ligand that sorbs water into the matrix of the resin as the matrix hydrates.

EXAMPLE 2

Metal Ion Distribution Coefficient (D) Studies

The bifunctional and monofunctional ion exchange resins prepared in Example 1 were used in this example for metal ion binding studies. Metal ion binding studies were carried out by contacting approximately 0.3 grams (dry weight) of functionalized resin with a solution containing approximately 10 milliliters $10^{-4}$ N Eu $(NO_3)_3$ and either 0.01 N $HNO_3$, 0.10 N $HNO_3$, 0.50 N $HNO_3$, or 1.00 N $HNO_3$.

The functionalized ion exchange resin was weighed out after excess water was removed by drying in a Buchner funnel at 720 millimeters mercury for approximately 5 minutes. The dry weight was calculated for the distribution coefficient calculations using the percent solids. The functionalized ion exchange resins were equilibrated with a background solution prior to contact with the europium-containing solution.

The mixtures were shaken for approximately 24 hours on a Burrell wrist-action shaker prior to analysis on an atomic absorption spectrometer (Perkin-Elmer Model 3100) using atomic emission at 459.4 nanometers. Results are reported in terms of percent complexed from solution and the distribution coefficient, D (milliequivalents $M^{n+}$ on the resin per gram of resin/milliequivalents $M^{n+}$ in solution per milliliter of solution).

Acid dependency studies correlating log D with the pH value of the solution are important for an understanding of the complexation mechanism. However, atomic absorption spectroscopy is insufficiently accurate at high levels (>99%) of sorption for calculation of the distribution coefficients.

The results of the complexation study of the bifunctional phosphonic/sulfonic acid ion exchange resin are reported in Table 3. The results of the complexation study of the monofunctional phosphonic acid ion exchange resin are reported in Table 4. The distribution coefficient is set forth in parentheses following the percent complexation in each of the tables for those solutions having a complexation level of less than 99 percent.

TABLE 3

Complexation of Eu(III) from $10^{-4}$ N Eu$(NO_3)_3$/$HNO_3$
Solutions Using Phosphonic/Sulfonic Acid Resins

| Percent DVB | 0.01 N $HNO_3$ | 0.10 N $HNO_3$ | 0.50 N $HNO_3$ | 1.00 N $HNO_3$ |
|---|---|---|---|---|
| 2 | >99% | >99% | 98.5% (2350) | 95.3 (734) |
| 12 | >99% | >99% | >99% | >99% |
| 25 | >99% | >99% | >99% | >99% |

TABLE 4

Complexation of Eu(III) from $10^{-4}$ N Eu$(NO_3)_3$/$HNO_3$
Solutions Using Phosphonic Acid Resins

| Percent DVB | 0.01 N $HNO_3$ | 0.10 N $HNO_3$ | 0.50 N $HNO_3$ | 1.00 N $HNO_3$ |
|---|---|---|---|---|
| 2 | >99% | >99% | 56.7% (64.8) | 17.2 (10.3) |
| 12 | >99% | >99% | 28.3% (13.1) | 7% (3.3) |
| 25 | 91.6% (277) | 25.8% (8.80) | 4% (1.1) | 6% (1.7) |

It is to be noted that the complex percentage for the 2 percent DVB cross-linked bifunctional ion exchange resin in 1 N nitric acid was 95.3 percent (Table 3). That value is substantially greater than the 22.5 percent obtained under similar conditions for the sulfonated and phosphonylated styrene-containing polymer reported in Trochimczuk et al. *J. Appl. Poly. Sci.* 52:1273 (1994).

The monophosphonic acid resins cross-linked with 2 percent and 12 percent DVB complexed substantially all of the Eu(III) present in 0.01 N $HNO_3$. The complexation performance of the monophosphonic acid resin remained virtually unchanged in the 0.10 N $HNO_3$.

The degree of complexation decreased significantly as the acidity of the background solution was increased to 0.50 N and 1.00 N $HNO_3$. It is believed that the reason for this decrease is either chemical (the mechanism for complexation changes from ion exchange to coordination at the phosphoryl oxygen as the solution pH value falls below the $pK_a$ of the phosphorous ligand) or physical (the phosphonic acid ligands are insufficiently hydrophilic to remain hydrated in solutions where the pH is too low thus preventing metal ion access due to collapse of the matrix).

The monophosphonic acid resin cross-linked with 25 percent DVB exhibited a high level of complexation in the 0.01 N $HNO_3$. However, the complexation level dropped significantly when the acid level was increased to 0.10 N $HNO_3$. The decrease continued to produce negligible complexation levels at the two highest $HNO_3$ concentrations. It is believed that this complexation profile of the monophosphonic acid resin results from the higher rigidity caused by cross-linking in the polymer matrix at the 25 percent DVB level.

The 25 percent DVB matrix is very sensitive to the solution pH value and ionic strength due to its inherent hydrophobicity, having the highest percent solids of the resins studied, resulting from fewer aromatic ring sites that can be substituted with phosphonic acid ligands. Therefore, it is not possible to maintain an open microporous structure by increasing the cross-link level of such a gel resin.

EXAMPLE 3

Metal Ion Distribution Coefficient (D) Studies At Elevated Salt Levels

To further characterize the functionalized resins of the present invention, the effect of a large excess of sodium ion concentration was studied. The bifunctional and monofunctional ion exchange resins prepared in Example 1 were used in metal ion studies in which the sodium ion concentration was present in a large excess through the use of 0.40 N $NaNO_3$.

In this example, the metal-containing solution contained approximately 10 milliliters $10^{-4}$ N $Eu(NO_3)_3$, 0.40 N $NaNO_3$, and either 0.01 N $HNO_3$, 0.10 N $HNO_3$, 0.50 N $HNO_3$, or 1.00 N $HNO_3$. These complexation analyses were substantially the same as the analyses corresponding to the complexation data set forth in Tables 3 and 4.

The results of the complexation study of the bifunctional phosphonic/sulfonic acid ion exchange resin are reported in Table 5. The results of the complexation study of the monofunctional phosphonic acid ion exchange resin are reported in Table 6. The distribution coefficient is set forth in parentheses following the percent complexation in each of the tables for those solutions having a complexation level of less than 99 percent.

TABLE 5

Complexation of Eu(III) from $10^{-4}$ N $Eu(NO_3)_3$/0.40 N $NaNO_3$/$HNO_3$ Solutions Using Phosphonic/Sulfonic Acid Resins

| Percent DVB | 0.01 N $HNO_3$ | 0.10 N $HNO_3$ | 0.50 N $HNO_3$ | 1.00 N $HNO_3$ |
|---|---|---|---|---|
| 2 | >99% | >99% | >99% | 92.7 (451) |
| 12 | >99% | >99% | >99% | >99% |
| 25 | >99% | >99% | >99% | 98.6% (1400) |

TABLE 6

Complexation of Eu(III) from $10^{-4}$ N $Eu(NO_3)_3$/0.40 N $NaNO_3$/$HNO_3$ Solutions Using Phosphonic Acid Resins

| Percent DVB | 0.01 N $HNO_3$ | 0.10 N $HNO_3$ | 0.50 N $HNO_3$ | 1.00 N $HNO_3$ |
|---|---|---|---|---|
| 2 | >99% | 97.6% (2010) | 50.4% (50.2) | 15.7% (9.2) |
| 12 | >99% | 94.2% (670) | 26.0% (14.4) | 6% (2.6) |
| 25 | 81.1% (107) | 9% (2.5) | 8% (2.3) | 9% (2.6) |

The complexation results of the monophosphonic/sulfonic acid (bifunctional) ion exchange resin in solutions containing 0.40 N $NaNO_3$ (Table 5) are substantially the same as the complexation results for the solution that did not contain $NaNO_3$ (Table 3). This indicates the inherent selectivity of the phosphonic acid ligand, which, unlike the sulfonic acid ligand, complexes with polyvalent transition metal and other heavy metal ions in the presence of a large excess of alkali metal ions. When comparing the results of solutions with approximately the same ionic strength (e.g., 0.10 N $HNO_3$, 0.40 N $NaNO_3$ and 0.50 N $HNO_3$), the extent of complexation is dependent on the hydrogen ion concentration rather that the presence of sodium ions.

The bifunctional ion exchange resins prepared by sulfonating the phosphonic acid resins complexed the Eu(III) almost quantitatively in all solutions as illustrated in Tables 3 and 5. It is believed that the sulfonic acid ligand hydrates the resin due to its hydrophobicity (as indicated by the decrease in percent solids) and that this hydration prevented even the flexible 2 percent DVB matrix from collapsing. These properties are very important in permitting metal ion accessibility.

Collapse is especially prone to happen when coordination, rather than exchange, is the mechanism of complexation and this is obviated with a hydrophilic ligand. Although it is reasonable to expect that Eu(III) complexation in the bifunctional ion exchange resin is due to ion exchange by the sulfonic acid ligand, Table 5 illustrates that this is not the case because the amount of Eu(III) complexed is unchanged in the presence of a large excess (12,000:1) of $Na^+$ ions. The sulfonic acid ligand thereby provides access of all ions into the matrix while the phosphonic acid ligand complexes the Eu(III) through a coordination mechanism.

EXAMPLE 4

Metal Ion Distribution Coefficient (D) Studies Using Radiotracer Analyses

Because the atomic absorption spectroscopy used for acid dependency study is insufficiently accurate at high levels (>99%) of sorption for calculation of the distribution coefficients, radiotracer analyses were carried out. In the radiotracer analyses, the acid dependency of the following materials with respect to Am(III) was compared: (1) 2 percent DVB bifunctional monophosphonic/sulfonic acid resin (general formula A), (2) monophosphonic/sulfonic acid resin where the phosphonate ligand is directly linked to the polymeric backbone (general formula B), (3) diphosphonic/sulfonic acid resin (DIPHONIX®; general formula C), and (4) a sulfonic acid resin (BIO-RAD® AG-MP 50).

The radiotracer studies were carried out at the Argonne National Laboratory. In this radiotracer study, $^{241}$Am (Argonne National Laboratories) was used. The sorption of the above radioisotope at tracer level concentration from solutions of different composition was measured at room temperature (23±1° C.).

A known volume of approximately 1 milliliter of the aqueous solution containing the tracer was equilibrated in a test tube with a weighted amount of the resin (typically about 5 to about 20 milligrams). Efficient mixing of the solid and liquid phases was obtained using magnetic microbars (1.5×8 millimeters) rotated at about 200 revolutions per minute. A mixing time of approximately 2 hours was used. This mixing duration was sufficient for the mixture to attain equilibrium.

The mixture was centrifuged and an aliquot of solution was withdrawn from the test tube and filtered using a syringe equipped with a polyvinylidene difluoride membrane filter having a pore size of approximately 0.2 micrometers. Counting of the aliquots of the filtered aqueous phase was performed with a Packard Cobra Autogamma. Dry weight distribution ratios, D, were calculated as in equation (6), below:

$$D = (A_o - A_f)/A_f(V/w) \qquad (6)$$

where $A_o$ and $A_f$ are the aqueous phase activity (cpm) before and after equilibrium, respectively, V is the volume of the aqueous phase (milliliters), and w is the weight of the dry resin (grams). The weight of the dry resin was calculated by correcting the weighed amount of Buchner-dry resin used in the experiments with the experimentally determined percent solid values. Duplicate studies showed that the reproducibility of the distribution coefficient measurements was generally within 10 percent, although the uncertainty interval was substantially higher for the highest D values ($D > 10^3$).

Figure 1B:
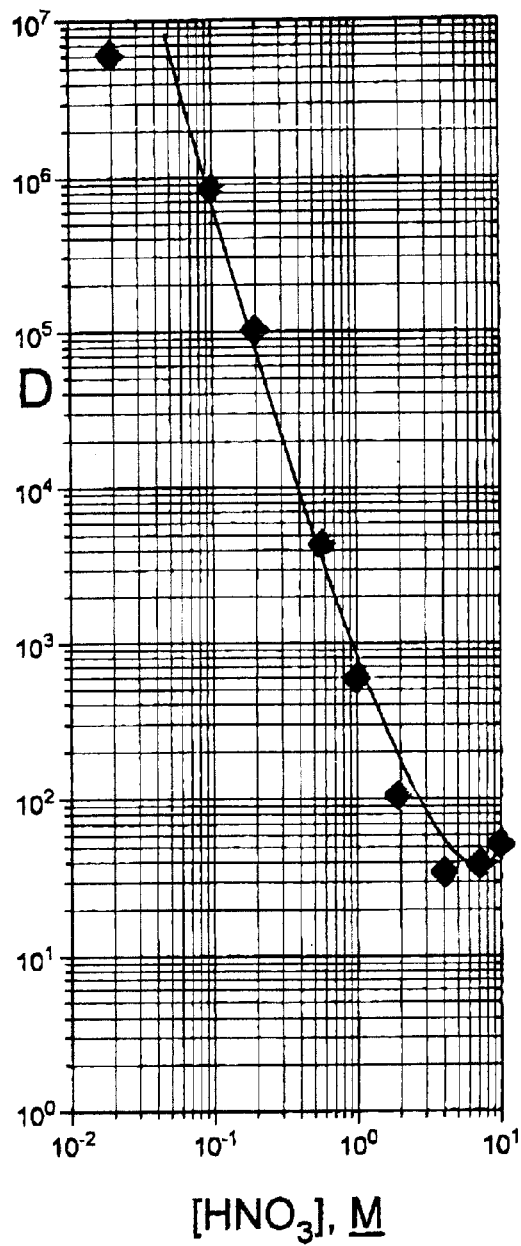

The log of the distribution coefficient was plotted with respect to the acid concentration for each of the ion exchange resins in FIGS. 1A and 1B.

The bifunctional phosphonic/sulfonic acid resin (general formula A) exhibits essentially the same Am(III) dependency as diphosphonic/sulfonic acid resin (general formula C) and a sulfonic acid resin. The slope of the linear portion of the curve shows that ion exchange is the dominant mechanism for complexation. The metal ion uptake by the bifunctional monophosphonic/sulfonic acid resin (general formula A) is significantly higher that of sulfonated monophosphonate resin (general formula B).

In high acid strength solutions (4–10 N $HNO_3$), the monophosphonic/sulfonic acid resin (general formula A) exhibits distribution coefficients that are higher than the sulfonic acid resin but lower than diphosphonic/sulfonic acid resin (general formula C). These data indicate that monophosphonic/sulfonic acid resin (general formula A) can coordinate americium salts through the phosphoryl oxygen but less effectively than diphosphonic/sulfonic acid resin (general formula C). This is most likely due to intra-ligand cooperation within the diphosphoryl group in chelating the $Am(NO_3)_3$.

EXAMPLE 5

Metal Ion Distribution Coefficient (D) Studies Using Radiotracer Analyses

The procedure set forth in Example 4 was repeated for the acid dependency analysis in this example except that $NaNO_3$ was added to the $Am(NO_3)_3$ solution to evaluate the performance of the ion exchange resins in the presence of a large excess of sodium ions. The effect of $NaNO_3$ added to the $Am(NO_3)_3$ solutions in 0.10 N and 1.00 N $HNO_3$ is given in FIGS. 2A and 2B for the monophosphonic/sulfonic acid resin (general formula A), the sulfonated monophosphonate resin (general formula B), and diphosphonic/sulfonic acid resin (general formula C).

The effect of different $NaNO_3$ concentrations on the Am(III) distribution coefficients is given in FIG. 2 for solutions in 0.10 N and 1.00 N $HNO_3$. The data for monophosphonic/sulfonic acid resin (general formula A) are compared with diphosphonic/sulfonic acid resin (general formula C) and the sulfonic acid resin. The behavior of monophosphonic/sulfonic acid resin (general formula A) changed going from 0.10 N to 1.00 N $HNO_3$. At the lower acidity, the effect of $NaNO_3$ on Am(III) uptake by monophosphonic/sulfonic acid resin (general formula A) paralleled its effect on the sulfonic acid resin.

In 1.00 N $HNO_3$, on the other hand, the $NaNO_3$ effect on monophosphonic/sulfonic acid resin (general formula A) paralleled that found with diphosphonic/sulfonic acid resin (general formula C). These results indicated that monophosphonic/sulfonic acid resin (general formula A) displayed a dominant ion exchange mechanism in less acidic solutions and a strong coordinative mechanism in more acidic solutions.

EXAMPLE 6

Metal Ion Distribution Coefficient (D) Studies Using Radiotracer Analyses

The procedure for the radiotracer study set forth in Example 4 was repeated in this example using Fe(III) instead of Am(III). The distribution coefficient data with Fe(III) are given in FIG. 3B, and are compared to published data (FIG. 3A) reported earlier in Chiarizia et al. *Solv. Extr. Ion Exch.* 11:967 (1993). In this radiotracer study, $^{59}Fe$ (Isotope Product Laboratories, Burbank, Calif.) was used.

The monophosphonic/sulfonic acid resin (general formula A) exhibited an iron acid dependency that is surprisingly close to that found with diphosphonic/sulfonic acid resin (general formula C), indicating that coordination by the phosphoryl group is dependent on both the solution pH value and the polyvalent metal ion being complexed. The ability of a contemplated monophosphonic/sulfonic acid ion exchange resin to coordinate Fe(III) is also significantly higher than sulfonated monophosphonate resin (general formula B), as was found with americium. The results are consistent with the concept that the phosphoryl oxygens can cooperate in coordinating the ferric nitrate (inter-ligand cooperation) and that this cannot occur when the ligands are directly bonded to the polymeric backbone due to steric hindrance.

EXAMPLE 7

Metal Ion Distribution Coefficient (D) Studies Using Radiotracer Analyses

Figure 4A:
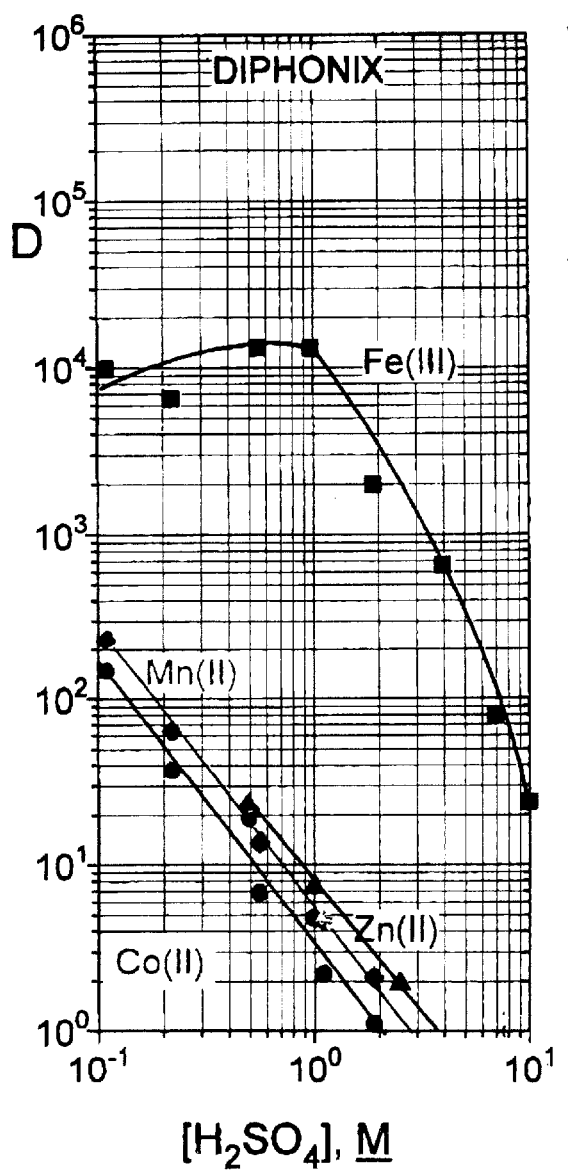
FIGS. 4A and 4B are radiotracer diagrams illustrating the distribution coefficient for various polyvalent heavy metal cations as a function of solution acidity in sulfuric acid solution for DIPHONIX® ion exchange resin in FIG. 4A and a contemplated monophosphonic/sulfonic acid resin in FIG. 4B, wherein Fe(III)=filled squares, Zn(II)=filled triangles, Co(II)=filled circles and Mn(II)=filled diamonds.
Figure 4B:
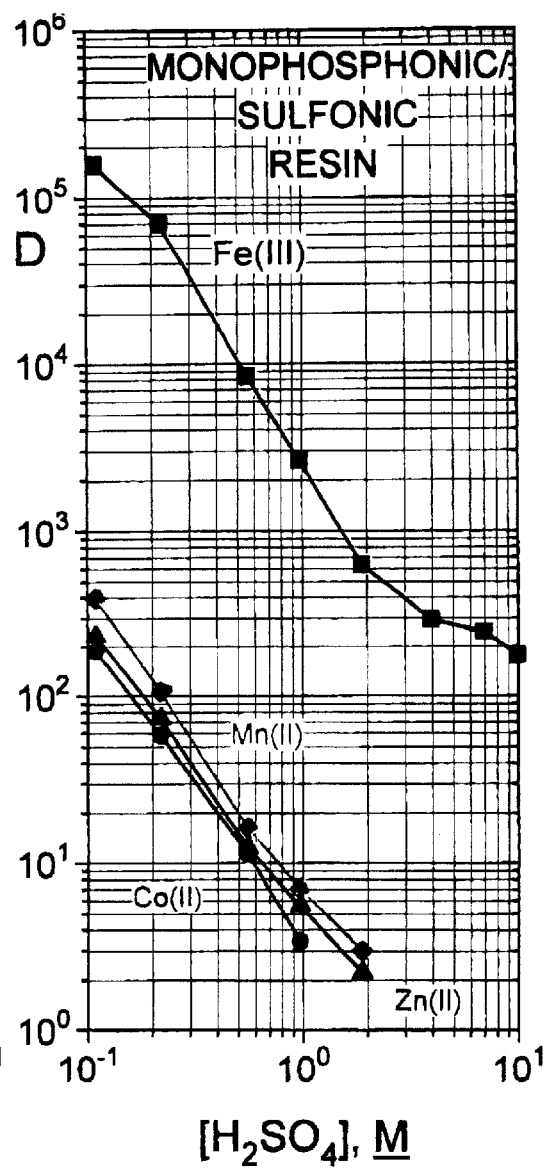

The procedure for the radiotracer experiment set forth in Example 6 was repeated in this example using $H_2SO_4$ instead of $HNO_3$ to compare the complexation levels of Fe(III) with Co(II), Mn(II), and Zn(II) using monophosphonic/sulfonic acid resin (general formula A) and diphosphonic/sulfonic acid resin (general formula C). The results of the complexation studies are reported in FIGS. 4A and 4B.

In the sulfuric acid system, the distribution coefficient of the monophosphonic/sulfonic acid resin (general formula A)

for Fe(III) was greater than the corresponding values for diphosphonic/sulfonic acid resin (general formula C) at less than 0.4 M $H_2SO_4$ and greater than 5.0 M $H_2SO_4$. At sulfuric acid concentrations of about 0.4 to about 5.0 M, the distribution coefficient of monophosphonic/sulfonic acid resin (general formula A) for Fe(III) was slightly less than diphosphonic/sulfonic acid resin (general formula C).

However, for both monophosphonic/sulfonic acid resin (general formula A) and diphosphonic/sulfonic acid resin (general formula C) the distribution coefficient for Fe(III) is considerably higher than the distribution coefficient for Co(II), Mn(II), and Zn(II). These values indicate that both monophosphonic/sulfonic acid resin (general formula A) and diphosphonic/sulfonic acid resin (general formula C) are useful for selective complexation of Fe(III) from $H_2SO_4$ solutions.

EXAMPLE 8

Metal Ion Distribution Coefficient (D) Studies Using Radiotracer Analyses

Figures 5A, 5B, 5C:
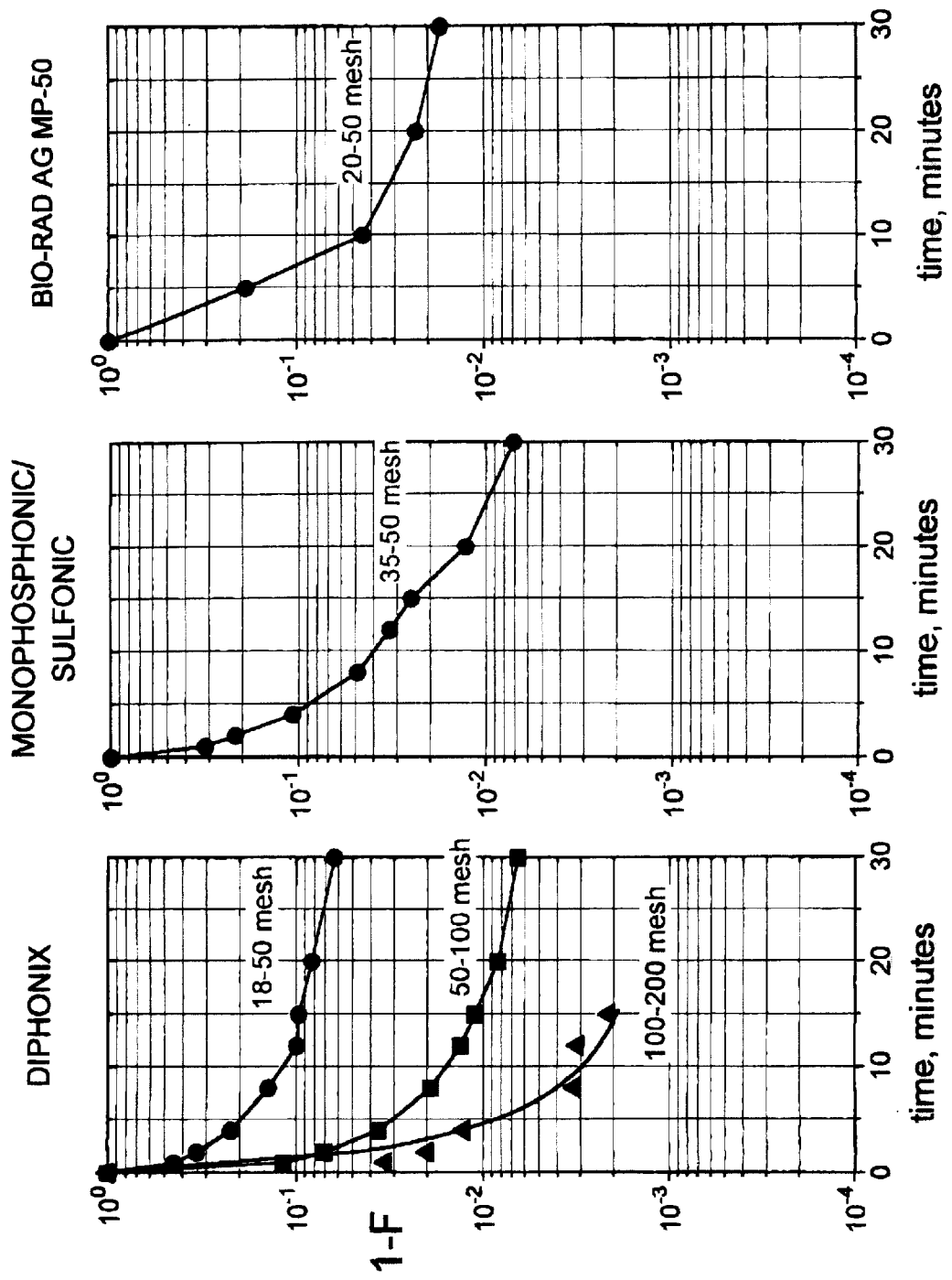
FIGS. 5A, 5B and 5C are radiotracer diagrams illustrating the complexation rates for Am(III) by each of three ion exchange resins :DIPHONIX® in FIG. 5A, a contemplated monophosphonic/sulfonic acid resin in FIG. 5B and BIO-RAD® AG MP-50 in FIG. 5C

The procedure for the radiotracer experiment set forth in Example 4 was repeated in this example to compare the complexation rates exhibited by monophosphonic/sulfonic acid resin (general formula A), diphosphonic/sulfonic acid resin (DIPHONIX® general formula C, 6.25 meq/g acid and 1.31 meq/g P), and sulfonic acid resin (BIO-PAD® AG MP-50). In this study, the diphosphonic/sulfonic acid resin (general formula C) was used at three particle sizes: 18–50 mesh, 50–100 mesh, and 100–200 mesh. The results of this study are set forth in FIG. 5.

The complexation rates exhibited by the contemplated monophosphonic/sulfonic acid ion exchange resin (general formula A) are superior to the complexation rates exhibited by the similarly-sized 18–50 mesh diphosphonic/sulfonic acid resin (general formula C) and the sulfonic acid resin. However, the complexation rates for the monophosphonic/sulfonic acid resin were less than that exhibited by the generally smaller 50–100 mesh and 100–200 mesh diphosphonic/sulfonic acid resin (general formula C).

EXAMPLE 9

Iron Uptake From Acid Solutions

DIPHONIX® resins [#072697 (20/40) and SB-120396 (20/60)] available from Eichrom Industries, Inc., of Darien, Ill. contained 1.24 and 1.38 milliequivalents per gram (meq/g) of phosphorus (P), respectively, and both had acid contents of approximately 6 mmol/g. The monophosphonic acid resin (JW-44–143A) was prepared by Eichrom Industries, Inc. as discussed in Example 1 using a cross-linked chloromethlylated polystyrene copolymer (lot #9661) that contained 5–6 meq/g of chloromethyl groups. Two monophosphonic/sulfonic acid resins were prepared by Eichrom Industries Inc. using different lots of chloromethlylated polystyrene copolymer (each with 5–6 meq/g chloromethyl groups; lots #8616 and #9661 from Sybron Chemicals Inc.). Monophosphonic/sulfonic acid resin JW-44–143B (10/50) contained 3.51 meq/g P with 8.37 mmol/g acid, whereas monophosphonic/sulfonic acid resin JW-44–148B (10/50) contained 3.52 meq/g P with 8.29 mmol/g acid.

Assay Procedure

A 125 mL plastic bottle was used as reaction vessel for the loading assays. About one gram of resin air dried on a Buchner funnel (Buchner dried) was preconditioned with 25 mL of 3 N $HNO_3/H_2SO_4$ solution for 15 minutes. Then, 25 mL of iron containing solution (1000 ppm Fe as $Fe_2(SO_4)_3 \cdot 5H_2O$ and 3 N $HNO_3/H_2SO_4$) was added into the bottle for the loading assays. A Burrell™ wrist-action shaker (model 75) was used for mixing. One hundred $\mu$L of sample were taken from the bottle at 2, 5 10, 15, 20, 30, 60, 90, and 120 minutes and diluted with 3 mL of 0.1 N $HNO_3/H_2SO_4$ solution. The samples were analyzed by atomic absorption spectroscopy (AA).

Results

Figure 6:
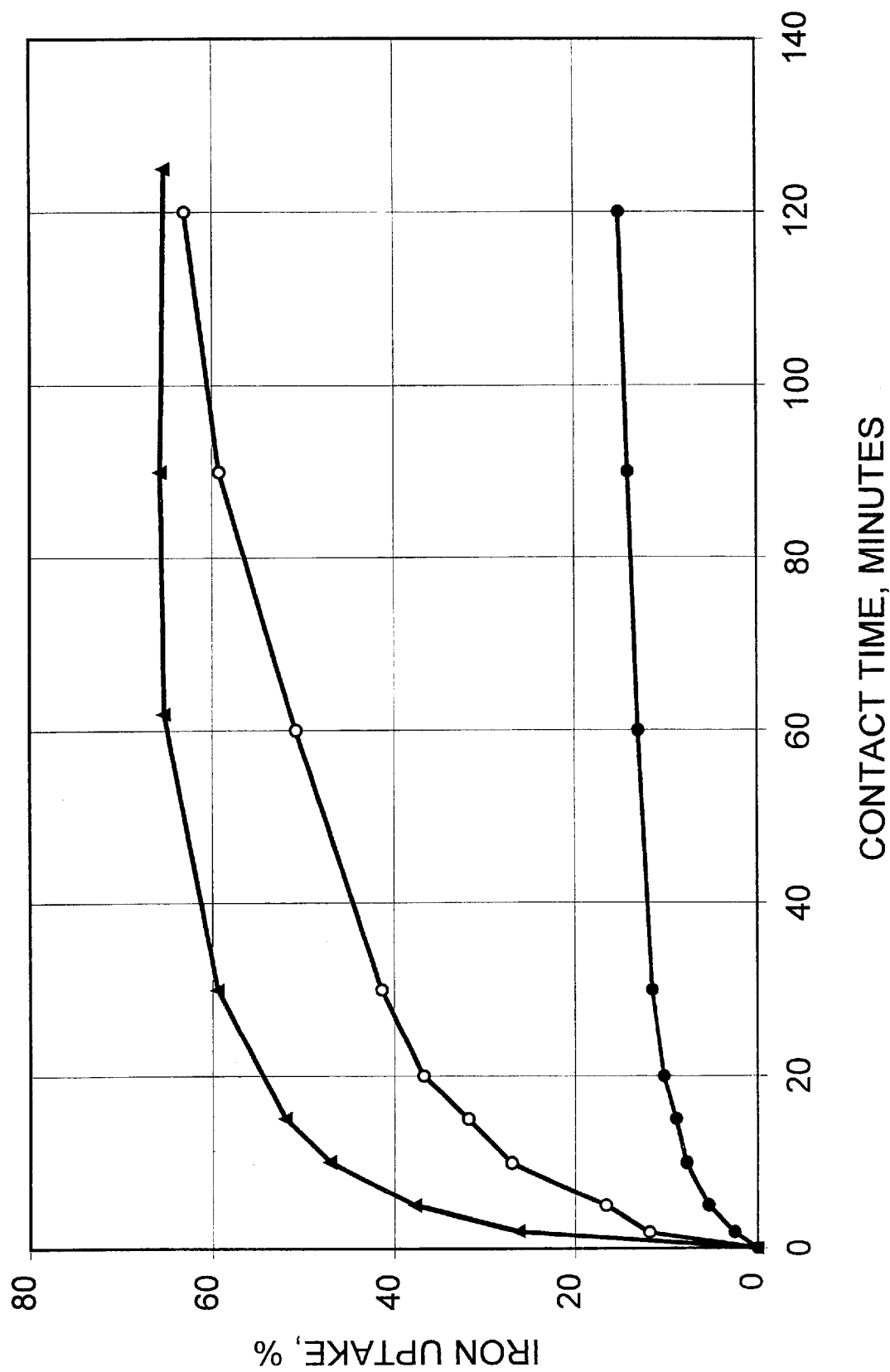
FIG. 6 is a graph showing the percentage of iron(III) cations taken up over time from a 1 g/L iron(III) in a 3 N $HNO_3$ solution by each of three ion exchange resins: DIPHONIX® (SB-120396; closed triangles), a contemplated monophosphonic/sulfonic acid resin (JW-44–143B; open circles) and a precursor monophosphonic acid resin (JW-44–143A; closed circles).
Figure 7:
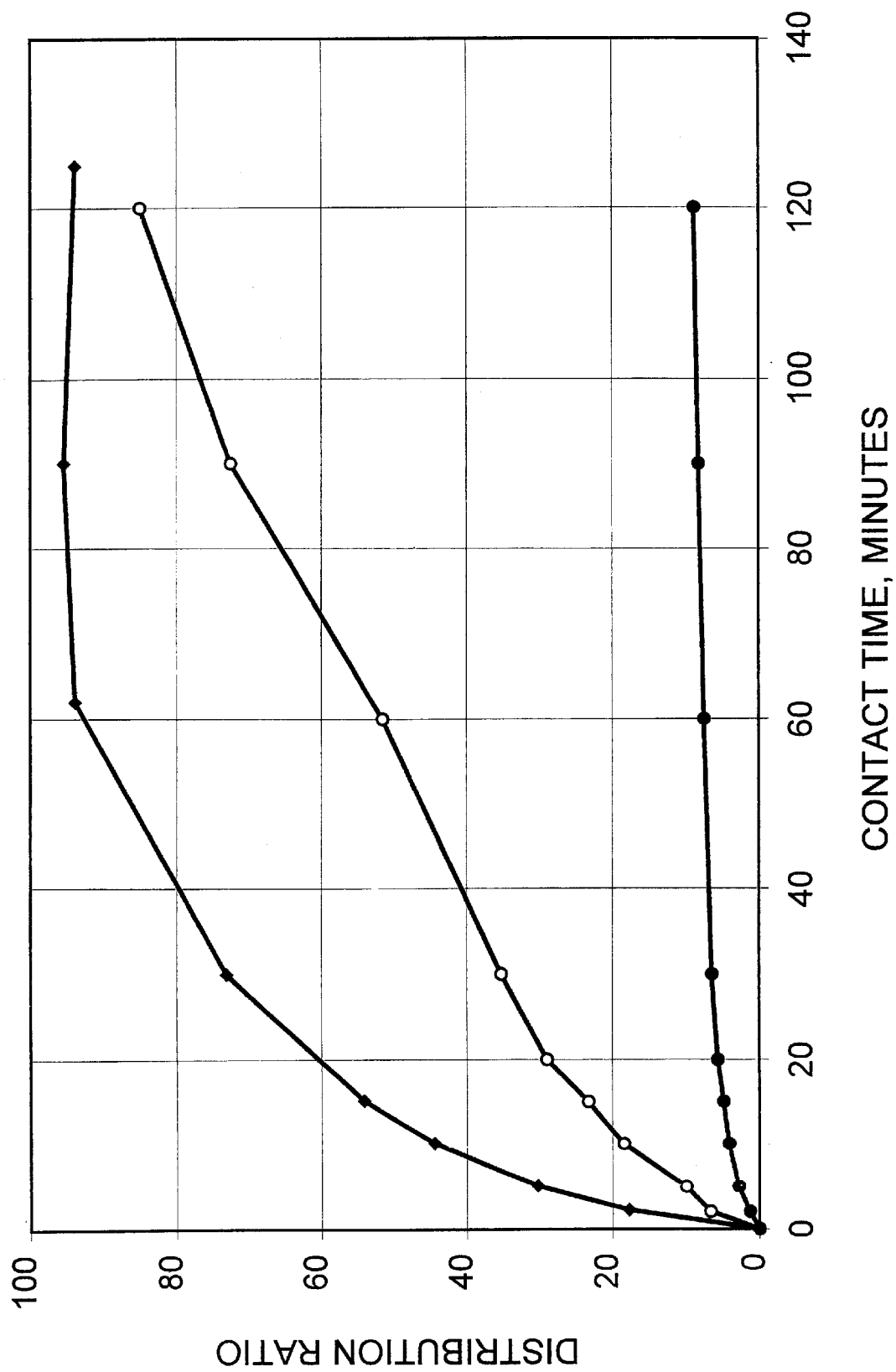
FIG. 7 is a graph of the distribution ratio over time from a 1 g/L iron(III) in a 3 N $HNO_3$ solution by each of three ion exchange resins: DIPHONIX® (SB-120396; closed diamonds), a contemplated monophosphonic/sulfonic acid resin (JW-44–143B; open circles) and a precursor monophosphonic acid resin (JW-44–143A; closed circles).
Figure 8:
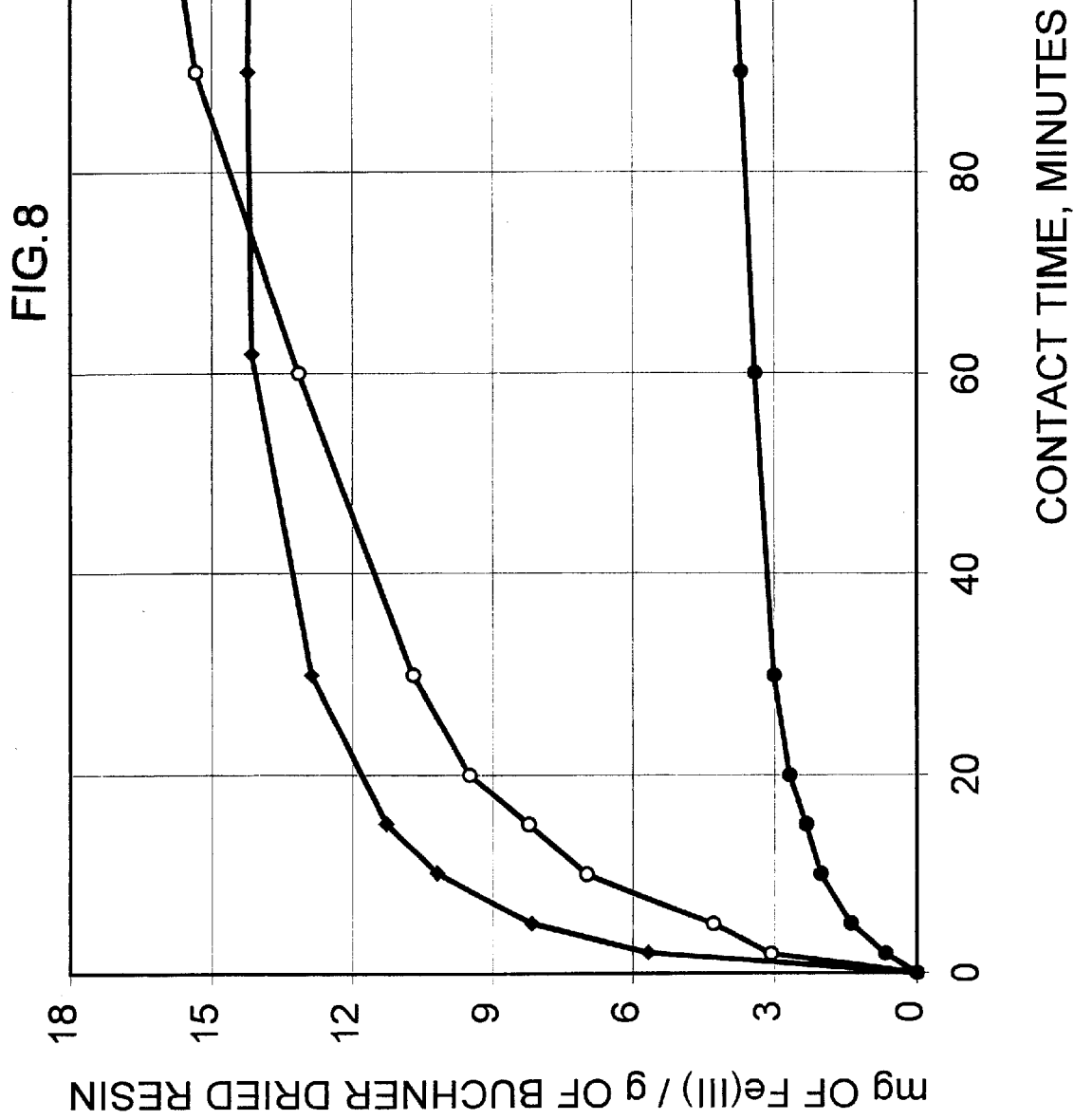
FIG. 8 a graph of the uptake of iron(III) in mg/g of funnel-dried resin over time from a 1 g/L iron(III) in a 3N $HNO_3$ solution by each of three ion exchange resins: DIPHONIX® (SB-120396; closed diamonds), a contemplated monophosphonic/sulfonic acid resin (JW-44–143B; open circles) and a precursor monophosphonic acid resin (JW-44–143A; closed circles).

A. Uptake of iron from nitric acid solution:

FIGS. 6, 7 and 8 compare the uptake rate of Fe(III) for monophosphonic acid resin (general formula D; JW-44–143A), monophosphonic/sulfonic acid resin (general formula A; JW-44–143B), and DIPHONIX® resin (sulfonated diphosphonic acid resin, general formula C; SB-120396) from 3 N $HNO_3$ and 1000 ppm Fe(III) solution. FIG. 6 shows that (1) 59%, 41%, and 11% of iron in the solution were taken by DIPHONIX® resin, monophosphonic/sulfonic acid resin, and monophosphonic acid resin, respectively, after 30 minutes of contact. (2) DIPHONIX® resin tended to reach equilibrium after 60 minutes contact with the iron containing solution, whereas the monophosphonic/sulfonic acid resin had not reached equilibrium after 120 minutes contact.

From FIG. 7, it can be seen that the distribution ratios are 73, 35, and 6.5 mL/g for DIPHONIX® resin, monophosphonic/sulfonic acid resin, and monophosphonic acid resin, respectively, after 30 minutes contact.

FIG. 8 shows that every gram of Buchner dried resin can load about 14, 16, and 4 mg of iron for DIPHONIX® resin, monophosphonic/sulfonic acid resin, and monophosphonic acid resin, respectively, after 120 minutes contact with the loading solution.

The results shown in FIGS. 6, 7 and 8 indicate that the sulfonated resins (monophosphonic/sulfonic acid resin and DIPHONIX® resin) have a faster Fe(III) uptake rate and higher Fe(III) loading capacity than monophosphonic acid resin in 3 N nitric acid solution.

Figure 9:
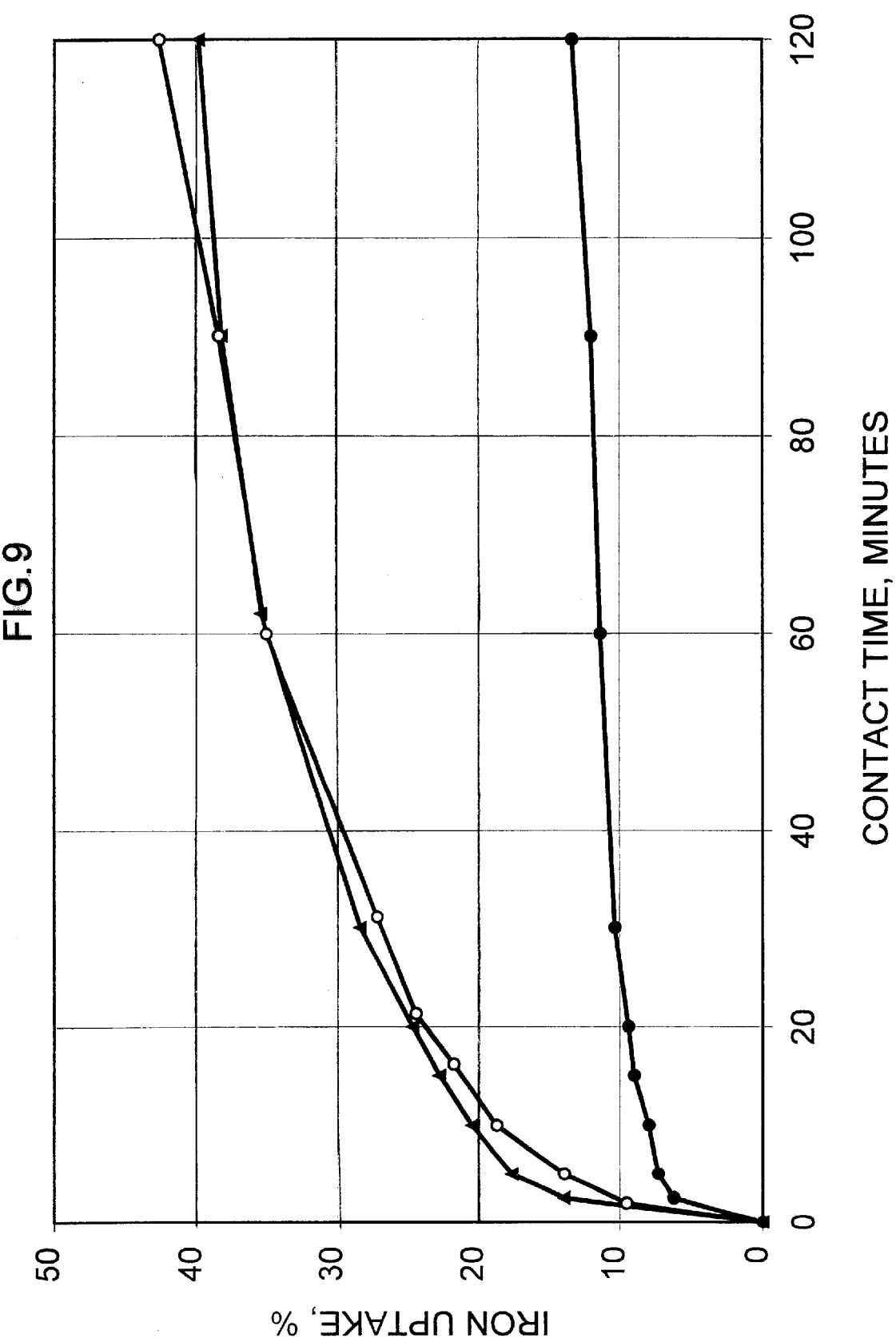
FIG. 9 is a graph showing the percentage of iron(III) cations taken up over time from a 1 g/L iron(III) in a 3N $H_2SO_4$ solution by each of three ion exchange resins: DIPHONIX® (#072697; closed triangles), a contemplated monophosphonic/sulfonic acid resin (JW-44–143B; open circles) and a precursor monophosphonic acid resin (JW-44–143A; closed circles).
Figure 10:
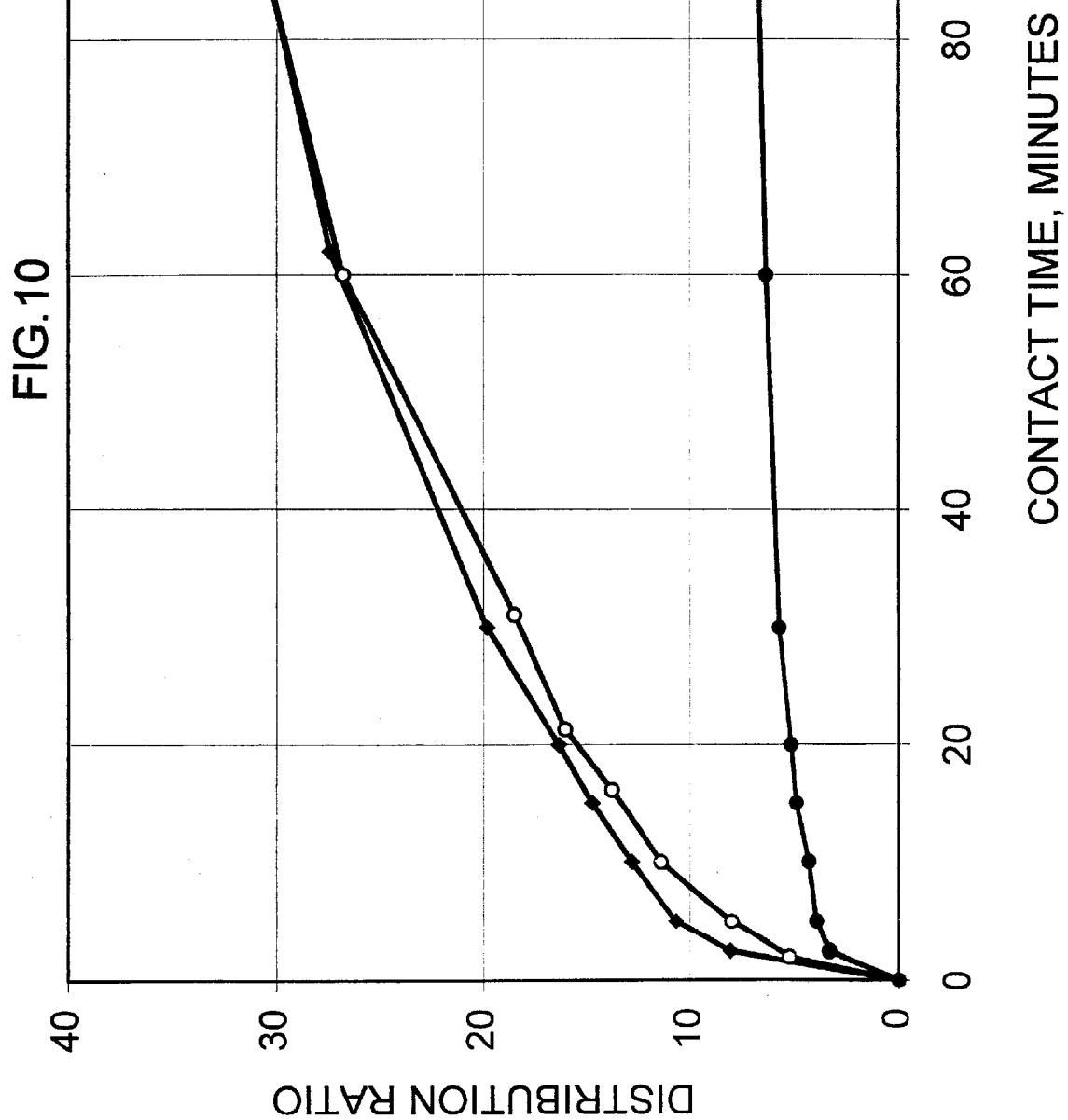
FIG. 10 is a graph of the distribution ratio at various contact times from a 1 g/L iron(III) in a 3 N $H_2SO_4$ solution by each of three ion exchange resins: DIPHONIX® (#072697; closed diamonds), a contemplated monophosphonic/sulfonic acid resin (JW-44–143B; open circles) and a precursor monophosphonic acid resin (JW-44–143A; closed circles).
Figure 11:
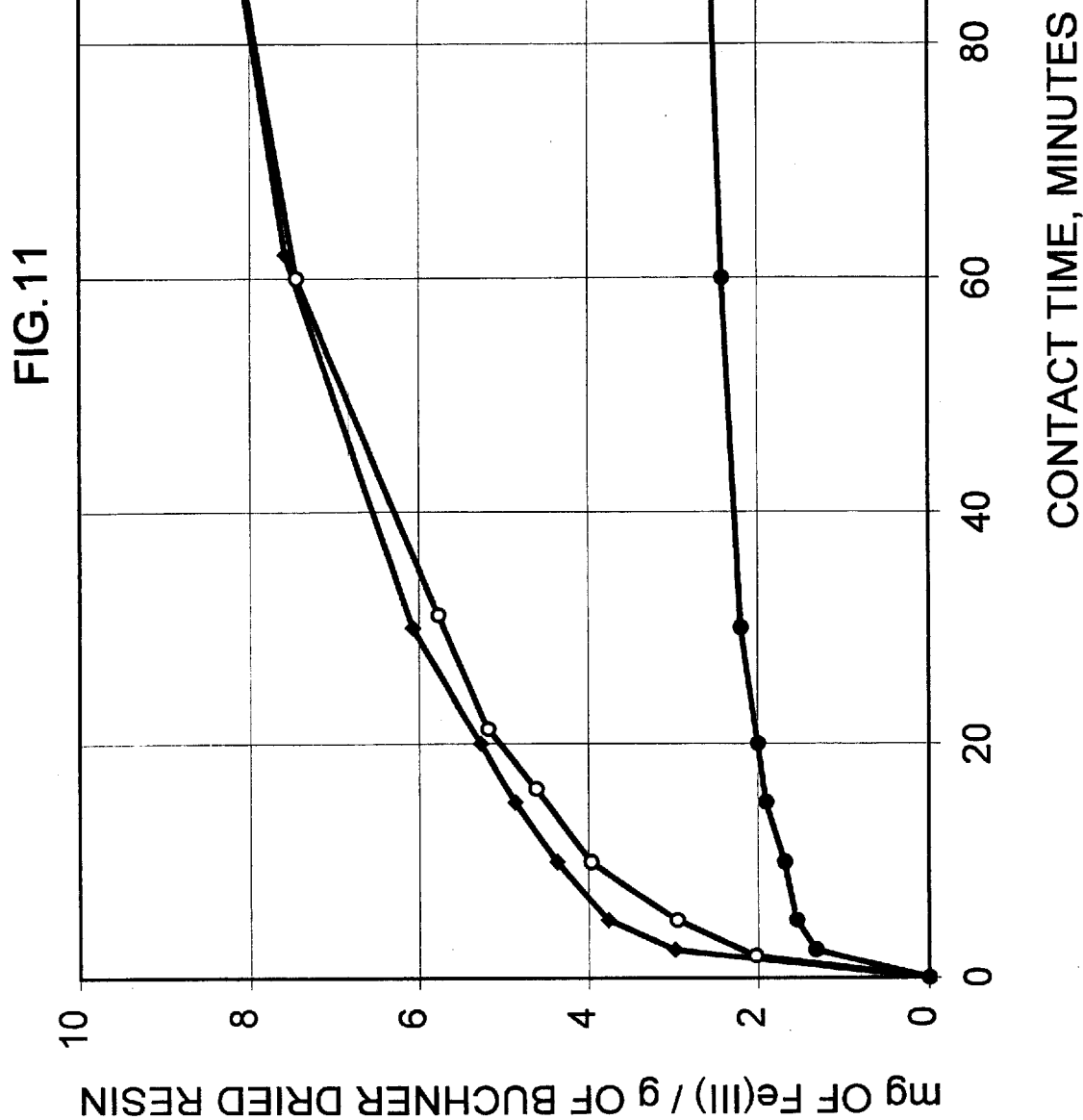
FIG. 11 a graph of the uptake of iron(III) in mg/g of funnel-dried resin over time from a 1 g/L iron(III) in a 3 N $H_2SO_4$ solution by each of three ion exchange resins: DIPHONIX® (#072697; closed diamonds), a contemplated monophosphonic/sulfonic acid resin (JW-44–143B; open circles) and a precursor monophosphonic acid resin (JW-44–143A; closed circles).

B. Uptake of iron from sulfuric acid solution:

FIGS. 9, 10 and 11 compare the uptake rate of Fe(III) for monophosphonic acid resin (JW-44–143A), monophosphonic/sulfonic acid resin (JW-44–143B), and DIPHONIX® resin (#072697) from 3 N $H_2SO_4$ and 1000 ppm Fe(III) solution. FIGS. 9, 10 and 11 show that the performance of the monophosphonic/sulfonic acid resin and DIPHONIX® resin are similar for iron uptake from 3 N sulfuric acid solution. The iron uptake reaction proceeds rapidly in the first 10 minutes (FIG. 9). The distribution ratio is about 27 mL/g (FIG. 10) and loading capacity is 7.5 mg of iron for one gram of Buchner dried resin after 60 minutes contact with the loading solution (FIG. 11).

Figure 12:
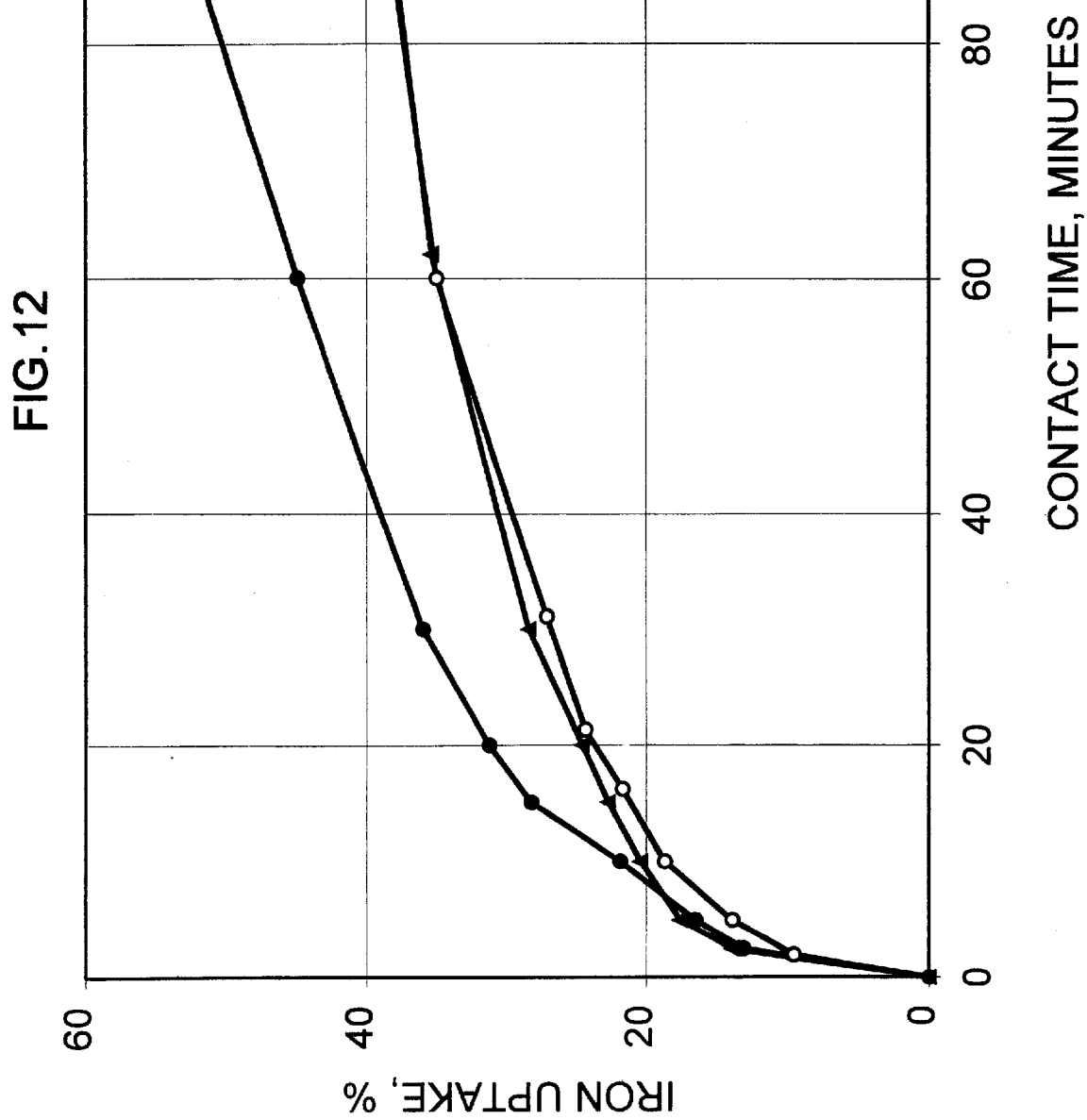
FIG. 12 is a graph showing the percentage of iron(III) cations taken up over time from a 1 g/L iron(III) in a 3 N $H_2SO_4$ solution by each of three ion exchange resins: DIPHONIX® (#072697; closed triangles), a contemplated monophosphonic/sulfonic acid resin (JW-44–143B; open circles) and a sulfonated monophosphonic acid resin (JW-44–148B; closed circles).
Figure 13:
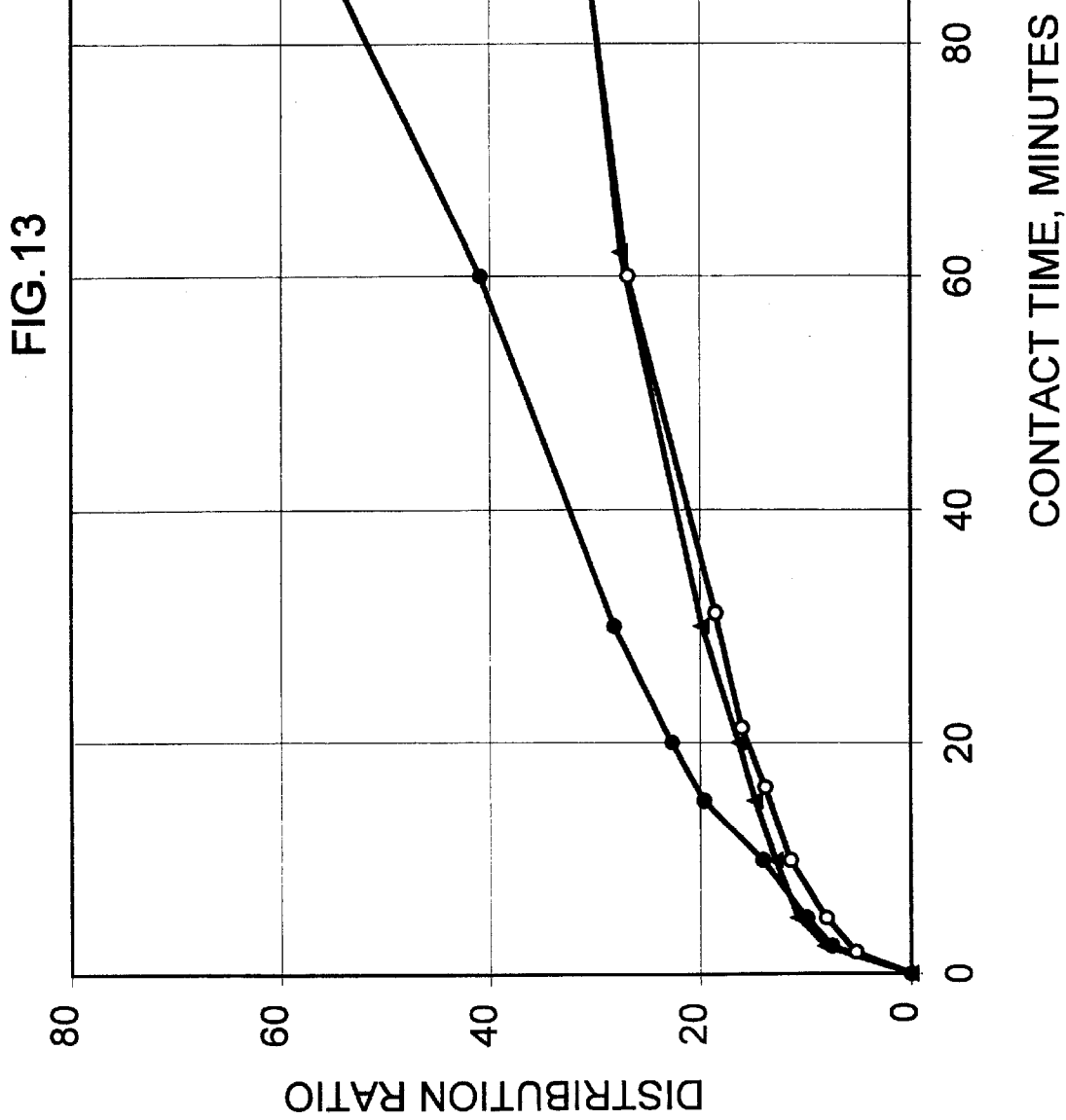
FIG. 13 is a graph of the distribution ratio over time from a 1 g/L iron(III) in a 3 N $H_2SO_4$ solution by each of three ion exchange resins: DIPHONIX® (#072697; closed triangles), a contemplated monophosphonic/sulfonic acid resin (JW-44–143B; open circles) and a second contemplated monophosphonic/sulfonic acid resin (JW-44–148B; closed circles).
Figure 14:
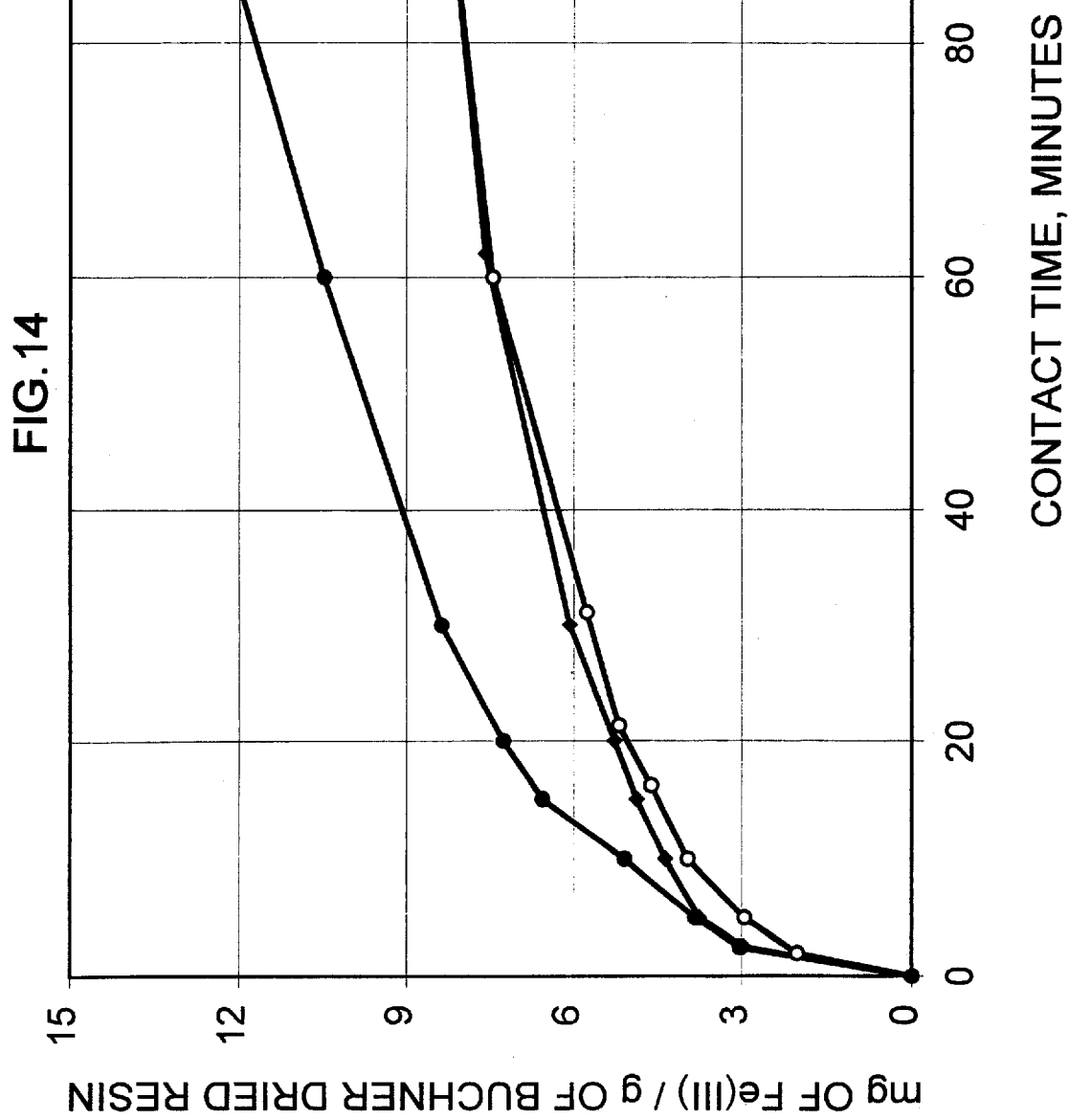
FIG. 14 is a graph of the uptake of iron(III) in mg/g of funnel-dried resin over time from a 1 g/L iron(III) in a 3 N $H_2SO_4$ solution by each of three ion exchange resins: DIPHONIX® (#072697; closed diamonds), a contemplated monophosphonic/sulfonic acid resin (JW-44–143B; open circles) and a second contemplated monophosphonic/sulfonic acid resin (JW-44–148B; closed circles).

C. Iron uptake comparison of sulfonated phosphonic acid resins:

FIGS. 12, 13 and 14 compare the uptake rate of Fe(III) for monophosphonic/sulfonic acid resins (JW-44–143B and JW-44–148B) and DIPHONIX® resin (#072697) from 3 N $H_2SO_4$ and 1000 ppm Fe solution. From FIGS. 12, 13 and 14, it can be seen that monophosphonic/sulfonic acid resin (JW-44–148B) has faster reaction rate and higher loading capacity than monophosphonic/sulfonic acid resin (JW-44–143B) and DIPHONIX® resin.

A microscope was used to examine the resins before and after iron uptake. The sulfonated monophosphonic acid resin (JW-44–148B) with support material (#8618) was opaque before and after iron loading. Some cracked beads were observed before and after iron loading on sulfonated monophosphonic acid resin (JW-44–143B) with support material (#9661).

EXAMPLE 10

Iron Uptake From Simulated SX-EW Solutions

Resins

DIPHONIX® resin (SB-120396) available from Eichrom Industries, Inc., of Darien, Ill. that contained 1.31 meq/g of phosphorus and 6.25 mmol/g acid was used here. Two monophosphonic/sulfonic acid resins [JW-44–148B (Example 9) and JW-44–158B] were also prepared by Eichrom using chloromethlylated polystyrene copolymers [lot #8616 (5–6 mmol/g chloromethyl groups)] provided by Sybron Chemicals Inc. Resin JW-44–158B contained 3.43 meq/g P and had 8.43 mmol/g acid.

Assay Procedure

A. Loading:

A portion of the resin was packed into a glass column (20 mL in volume and 13 mm inner diameter). The resin was washed with 5 bed volumes of 30, 60, 100, 150 g/L sulfuric acid solution at 3 mL/min. The simulated SX-EW solution contained 40 g/L copper as $CuSO_4.5H_2O$, 1 g/L ferric ion as $Fe_2(SO_4)_3.5H_2O$, and 150 g/L $H_2SO_4$ and was passed through the resin at about 12 bed volumes per hour (12 BV/hr) using a peristaltic pump. The resin volume shrank over the loading time by about 10%.

The effluent was collected at every bed volume. The samples were measured by graduated cylinder for volume and analyzed by AA for iron. At the end of the loading, the resin was washed with 5 bed volumes 150 g/L $H_2SO_4$ at the same flow rate as the loading.

B. Stripping:

Two stripping methods were evaluated. The first method involved sulfurous acid stripping and the second involved hydrochloric acid stripping. For sulfurous acid stripping, the iron-loaded resin was eluted with 2 M $H_2SO_4$, 5 g/L Cu, and 0.44 M $H_2SO_3$ solution at 85° C. For hydrochloric acid stripping, a 6 M HCl solution was used to remove iron from the loaded resin at room temperature.

The flow rate was 12 bed volumes per hour. The effluent was collected at every bed volume. The samples were measured by graduated cylinder for volume and analyzed by AA for iron.

Results

Figure 15:
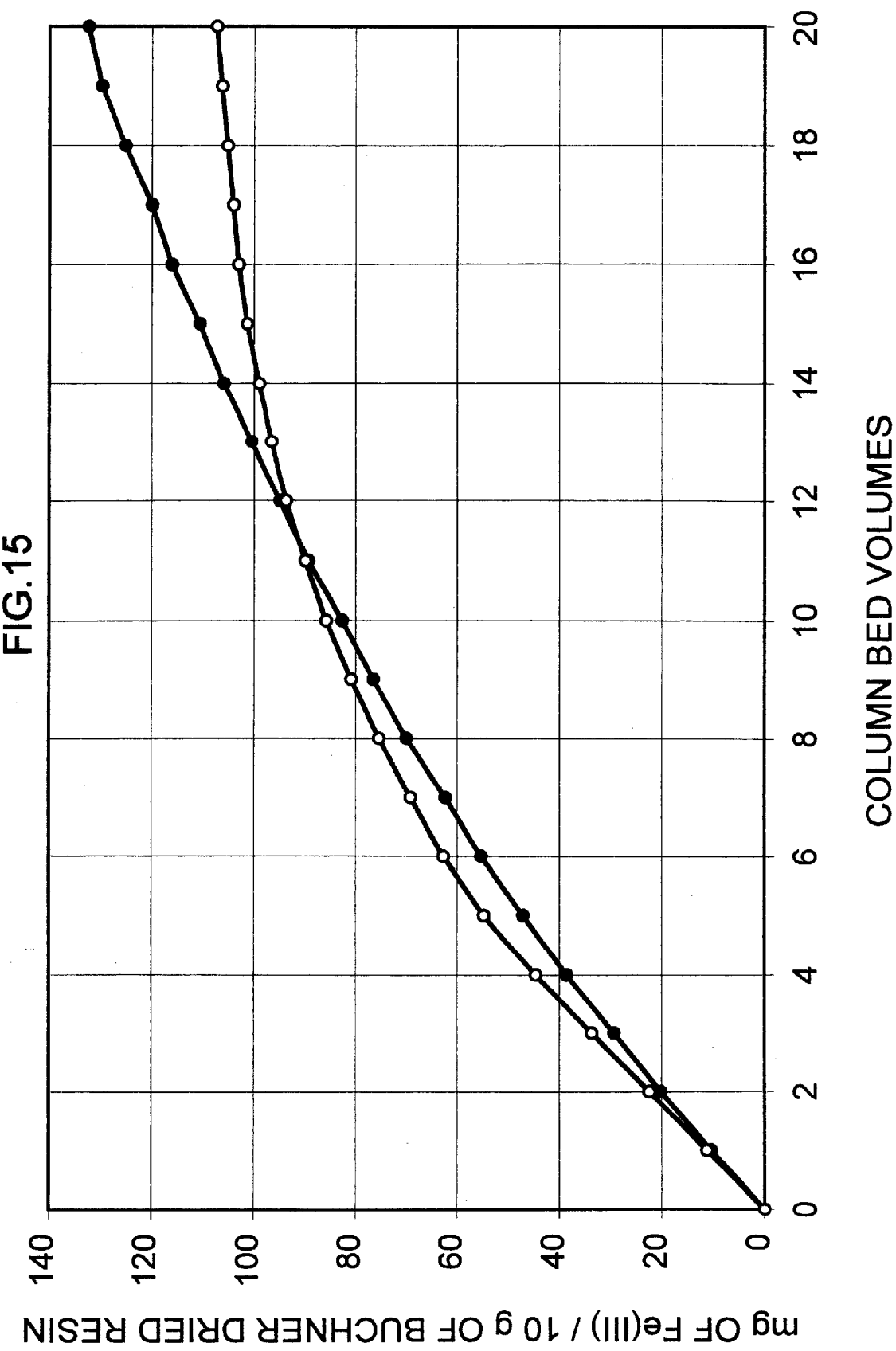
FIG. 15 is a graph of the loading of iron(III) per 10 g of each of two funnel-dried resins from a loading solution containing 40 g/L copper(II), 1 g/L iron(III) and 3 N $H_2SO_4$ versus bed volumes used to pass through the resins, in which the resins were: DIPHONIX® (SB-120396; open circles) and a contemplated monophosphonic/sulfonic acid resin (JW-44–148B; closed circles).
Figure 16:
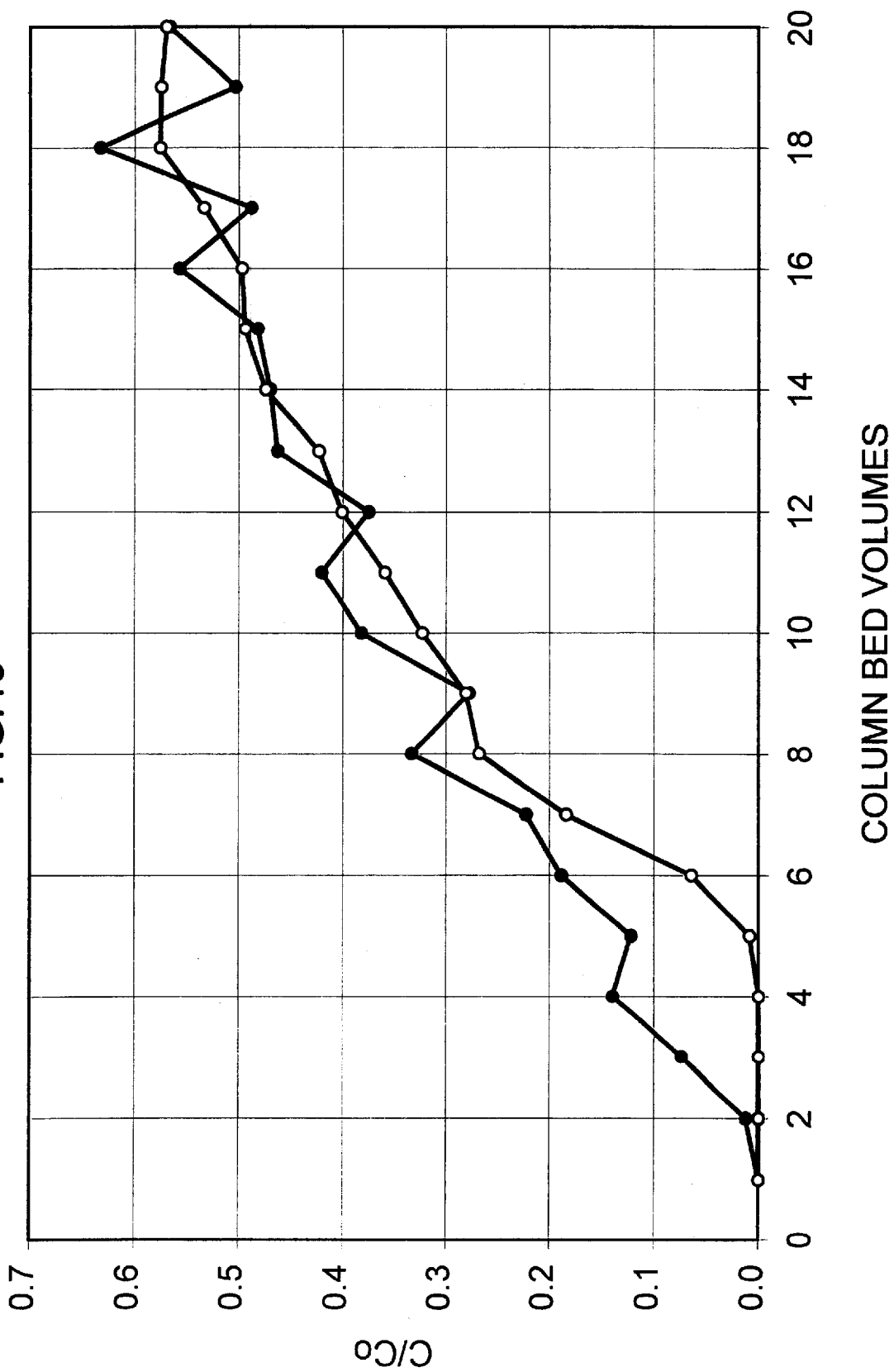
FIG. 16 is a graph showing the ratio of loaded iron(III) to iron(III) present ($C/C_O$) from a loading solution containing 40 g/L copper(II), 1 g/L iron(III) and 3 N $H_2SO_4$ versus bed volumes used to pass through the resins, in which the resins were: DIPHONIX® (SB-120396; open circles) and a contemplated monophosphonic/sulfonic acid resin (JW-44–148B; closed circles).
Figure 17:
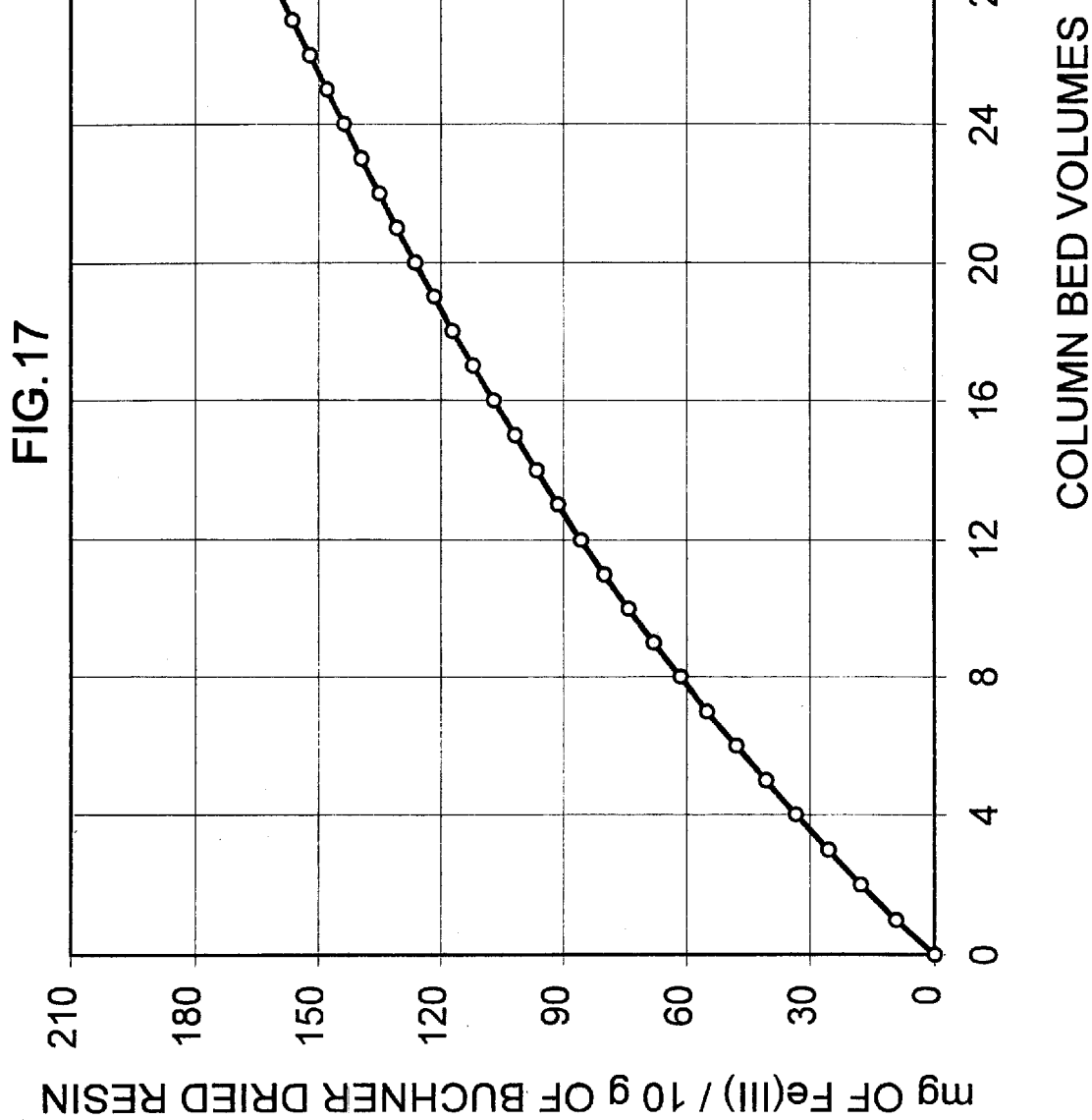
FIG. 17 is a graph showing the amount of iron(III) in mg loaded on to 10 g of funnel-dried resin from a loading solution containing 40 g/L copper(II), 0.7 g/L iron(III) and 3 N $H_2SO_4$ versus bed volumes used to pass through the resin, in which the resin was a contemplated monophosphonic/sulfonic acid resin (JW-44–158B; open circles)
Figure 18:
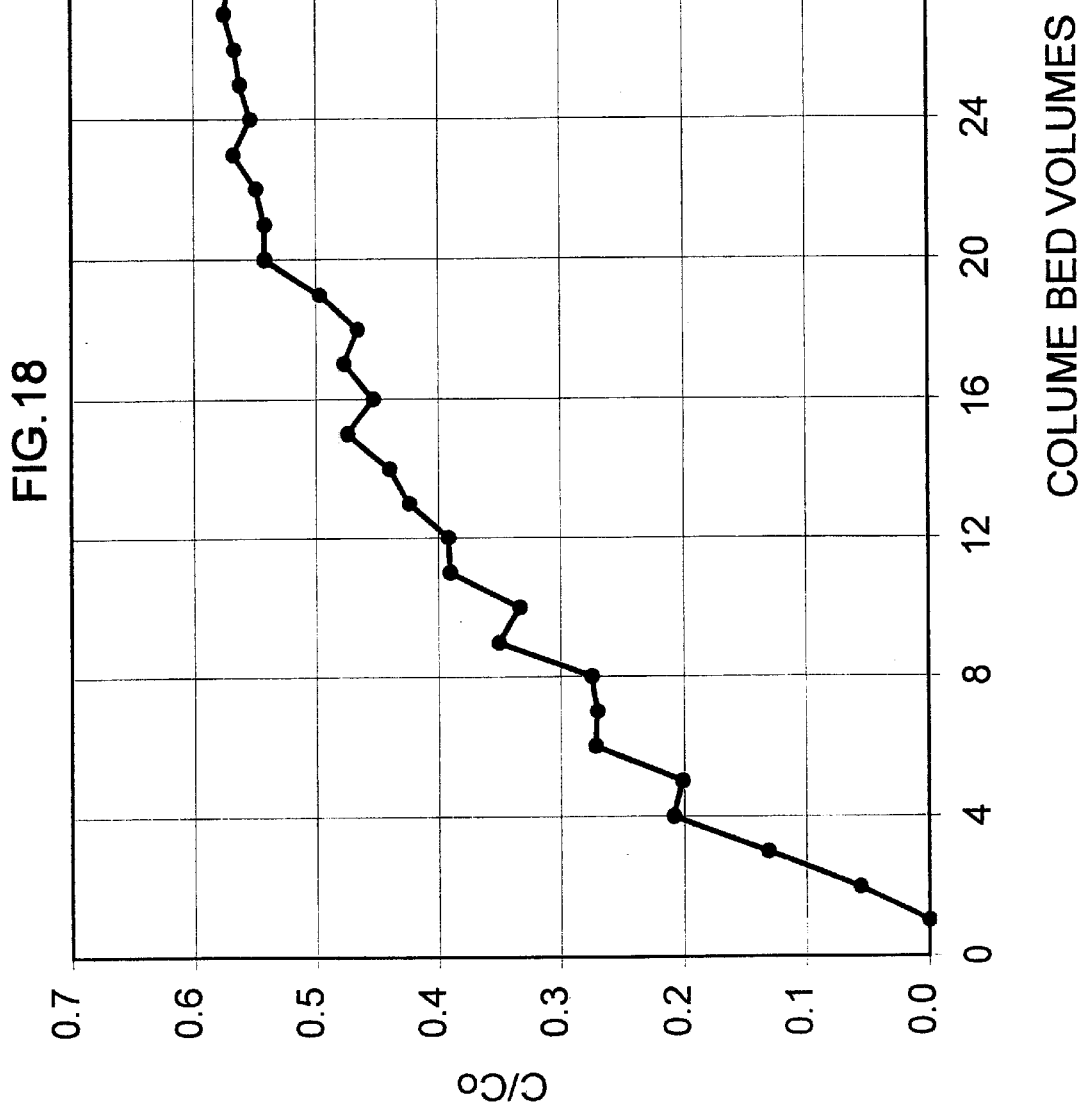
FIG. 18 is a graph showing the ratio of loaded iron(III) to iron(III) present ($C/C_O$) from a loading solution containing 40 g/L copper(II), 0.7 g/L iron(III) and 3 N $H_2SO_4$ versus bed volumes used to pass through the resin, in which the resin was a contemplated monophosphonic/sulfonic acid resin (JW-44–158B; closed circles).

A. Uptake of iron:

FIGS. 15, 16, 17 and 18 show the uptake rate of Fe(III) for monophosphonic/sulfonic acid resin and DIPHONIX® resin from the acidic polyvalent metal cation-containing aqueous medium. FIGS. 15 and 16 show that the performance of the monophosphonic/sulfonic acid resin and DIPHONIX® resin is similar with respect to iron uptake. However, the DIPHONIX® resin tended to reach equilibrium after contacting with 20 bed volumes of solution (FIGS. 15 and 16), whereas the monophosphonic/sulfonic acid resin had not reached equilibrium after contacting with 40 bed volumes solution (FIGS. 17 and 18).

Every gram of Buchner dried DIPHONIX® resin can sorb about 11 mg of Fe(III) after contacting with 20 bed volumes of solution (FIG. 15), whereas every gram of Buchner dried monophosphonic/sulfonic acid resin can sorb 20 mg of Fe(III) after contacting with 40 bed volumes solution (FIG. 17). Therefore, the monophosphonic/sulfonic acid resin has higher loading capacity than DIPHONIX® resin.

B. Iron stripping:

1. Sulfurous reductive stripping

Figure 19:
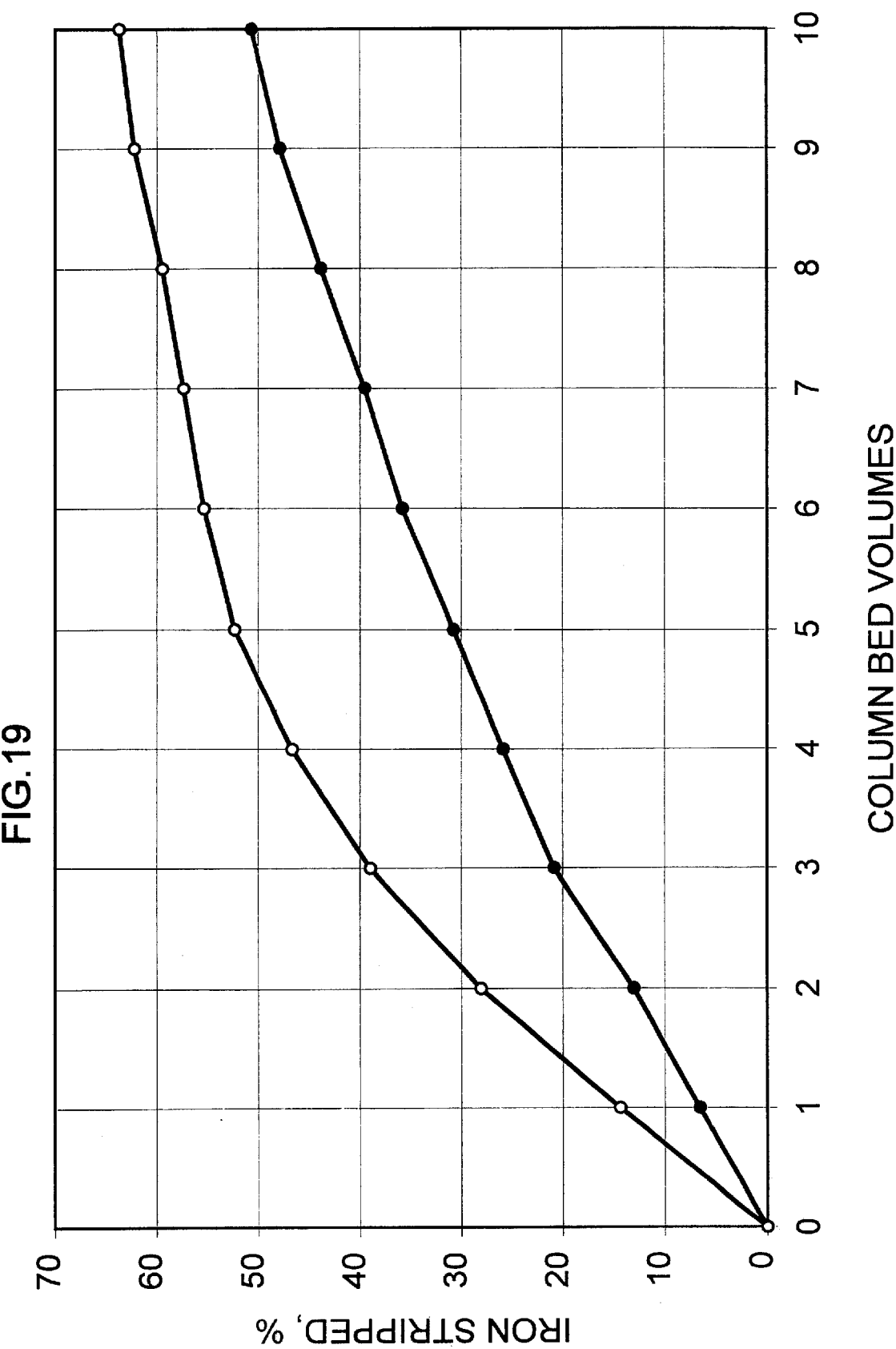
FIG. 19 is a graph showing the percentage of iron stripped from each of two iron-loaded resins using a stripping solution containing 4 N $H_2SO_4$, 5 g/L copper and 0.44 M $H_2SO_3$ at a temperature of 85° C. versus bed volumes used to pass through the resins, in which the resins were: DIPHONIX® (SB-120396; open circles) and a contemplated monophosphonic/sulfonic acid resin (JW-44–148B; closed circles).
Figure 20:
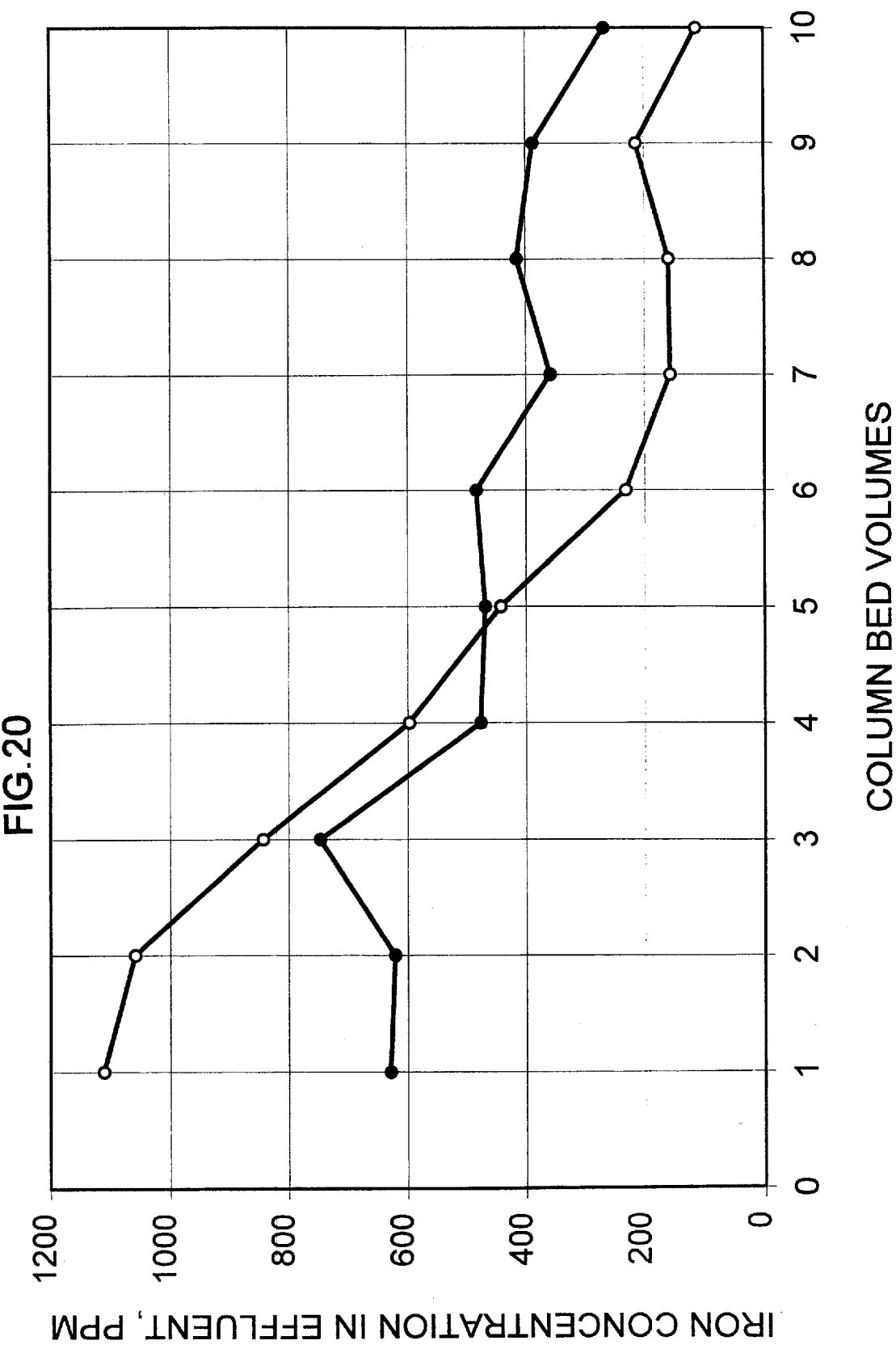
FIG. 20 is a graph showing the iron concentration in parts/million (ppm) stripped from each of two iron-loaded resins using a stripping solution containing 4 $NH_2SO_4$, 5 g/L copper and 0.44 M $H_2SO_3$ at a temperature of 85° C. versus bed volumes used to pass through the resins, in which the resins were: DIPHONIX® (SB-120396; open circles) and a contemplated monophosphonic/sulfonic acid resin (JW-44–148B; closed circles).

FIGS. 19 and 20 illustrate the iron stripping rate from monophosphonic/sulfonic acid resin and DIPHONIX® resin. About 51% and 64% of iron can be stripped from monophosphonic/sulfonic acid resin and DIPHONIX® resin, respectively, after 10 bed volumes stripping (FIG. 19). Therefore, sulfurous reductive stripping works well for both resins, although, it is easier to strip iron from DIPHONIX® resin than from the monophosphonic/sulfonic acid resin.

2. Hydrochloric acid stripping

Figure 21:
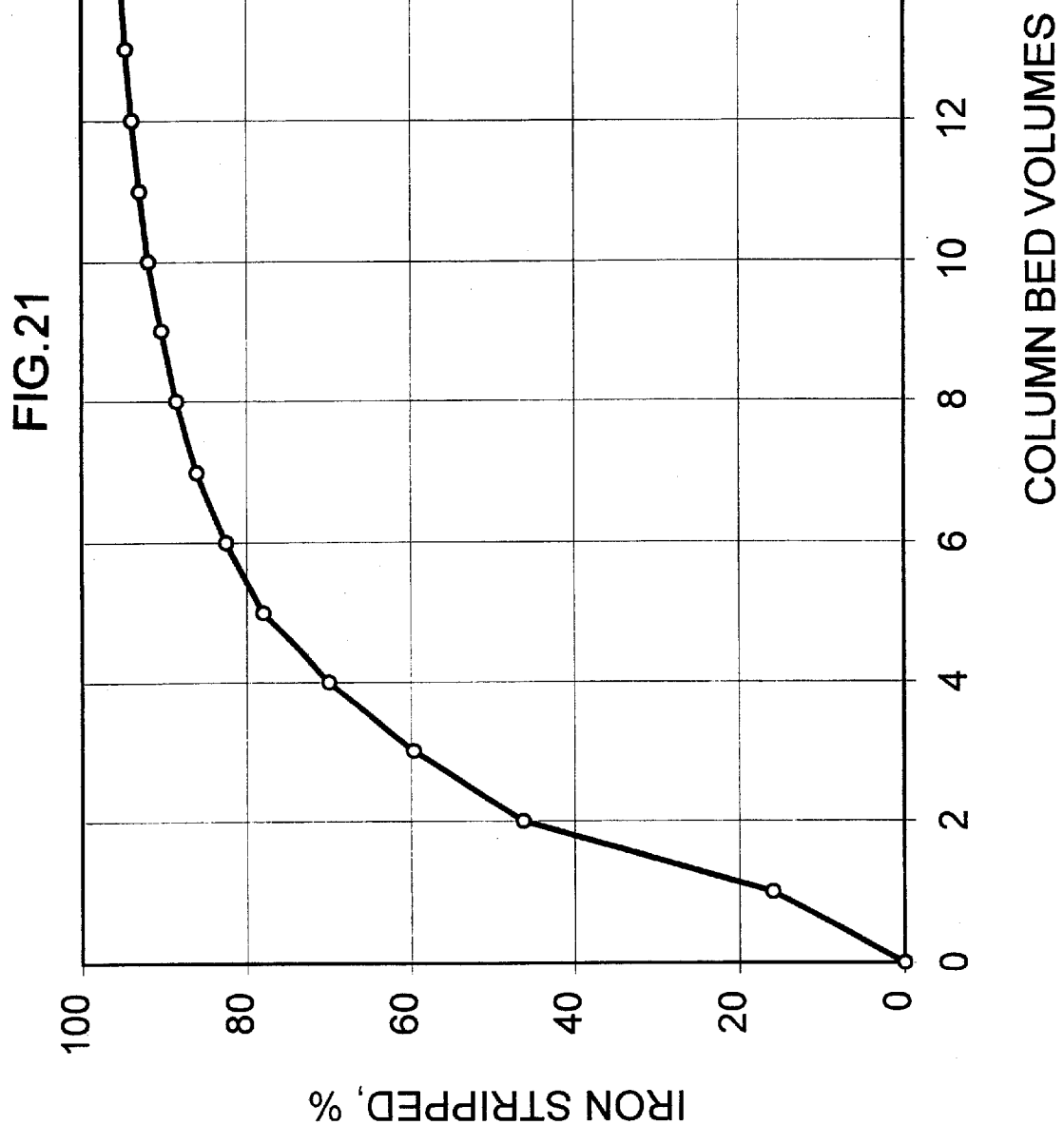
FIG. 21 is a graph showing iron stripped from an iron-loaded contemplated monophosphonic/sulfonic acid resin [JW-44–158B (lot 2); open circles] using 6 N HCl at room temperature versus bed volumes used to pass through the resin.
Figure 22:
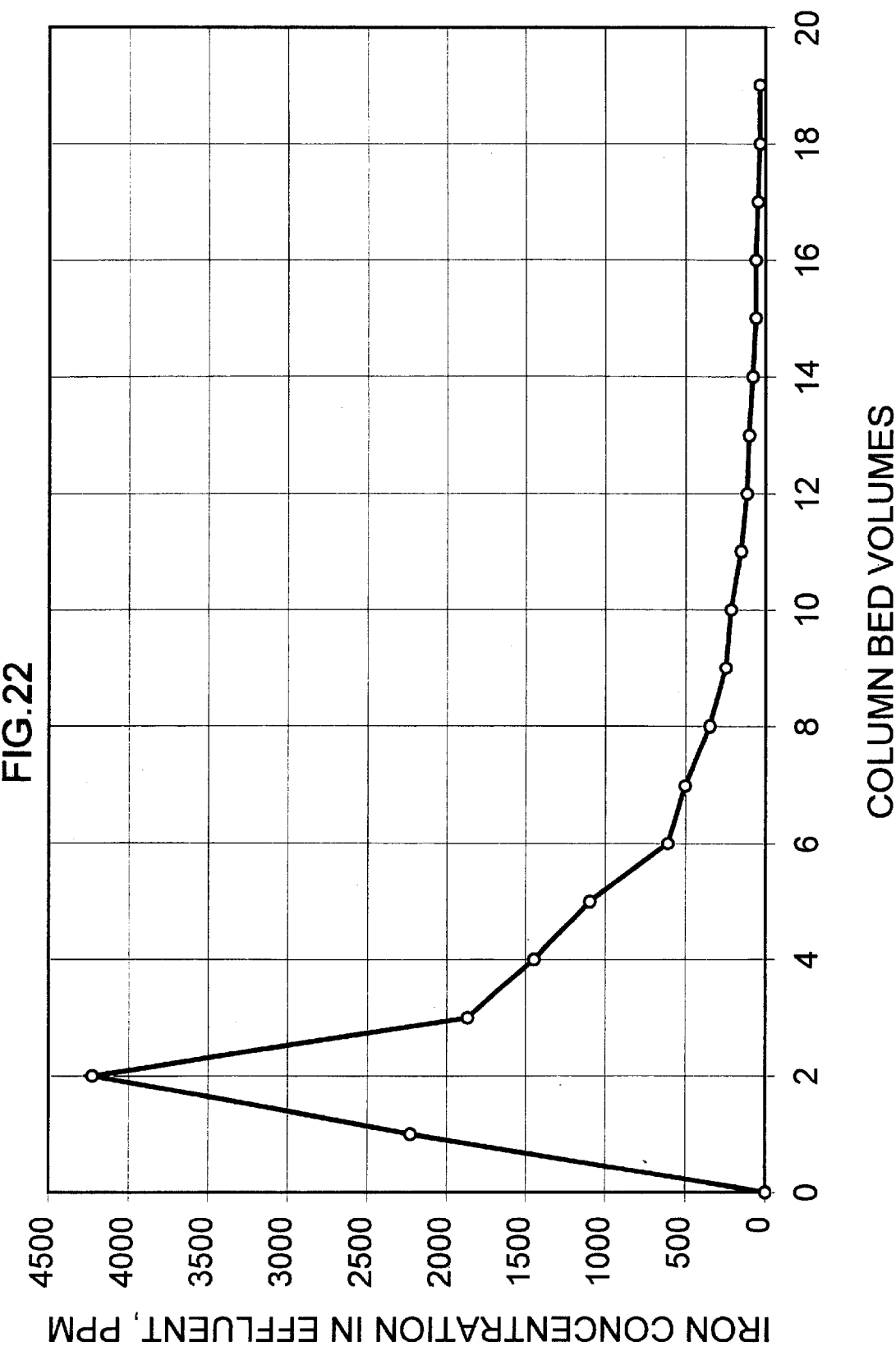
FIG. 22 is a graph showing iron in ppm stripped from an iron-loaded contemplated monophosphonic/sulfonic acid resin [JW-44–158B (lot 2); open circles] using 6 N HCl at room temperature versus bed volumes used to pass through the resin.

FIGS. 21 and 22 summarize the results of iron stripping from monophosphonic/sulfonic acid resin using 6 M HCl. The stripping reaction went very rapidly. As can be seen, about 70% of the iron was stripped after passage of 4 bed volumes, and over 90% of the iron was stripped by 10 bed volumes.

EXAMPLE 11

Comparative Iron(III)

Loading And Regeneration

Three ion exchange resins separately contained in columns were used in this study. Those materials were DIPHONIX® resin (exchange capacity of an average of 8–12 g Fe/L), DUOLITE® C-467 [a polystyrene divinylbenzene copolymer with aminophosphonic (—NH—$CH_2$—$PO_3H_2$) functional groups; 14 g $Ca^{2+}$/L resin, having an acid content of 1.80 meq/g and a phosphorous content of 2.81 meq/g available from Rohm and Haas Co.], and a monophosphonic/sulfonic acid resin denominated CS3–104 prepared by Dr. Spiro Alexandratos and co-workers at the University of Tennessee, Knoxville, Tenn. (9.60/9.71 meq/g acid and 3.34/3.50 meq/g P) were loaded with ferric ion. The ferric ion was eluted with a circulating stream of copper sulfate in aqueous sulfuric acid solution that was continuously passed through a column of copper wire pieces. The elution was carried out at 84° C. in order to promote the formation of copper(I) ion.

Figure 23:
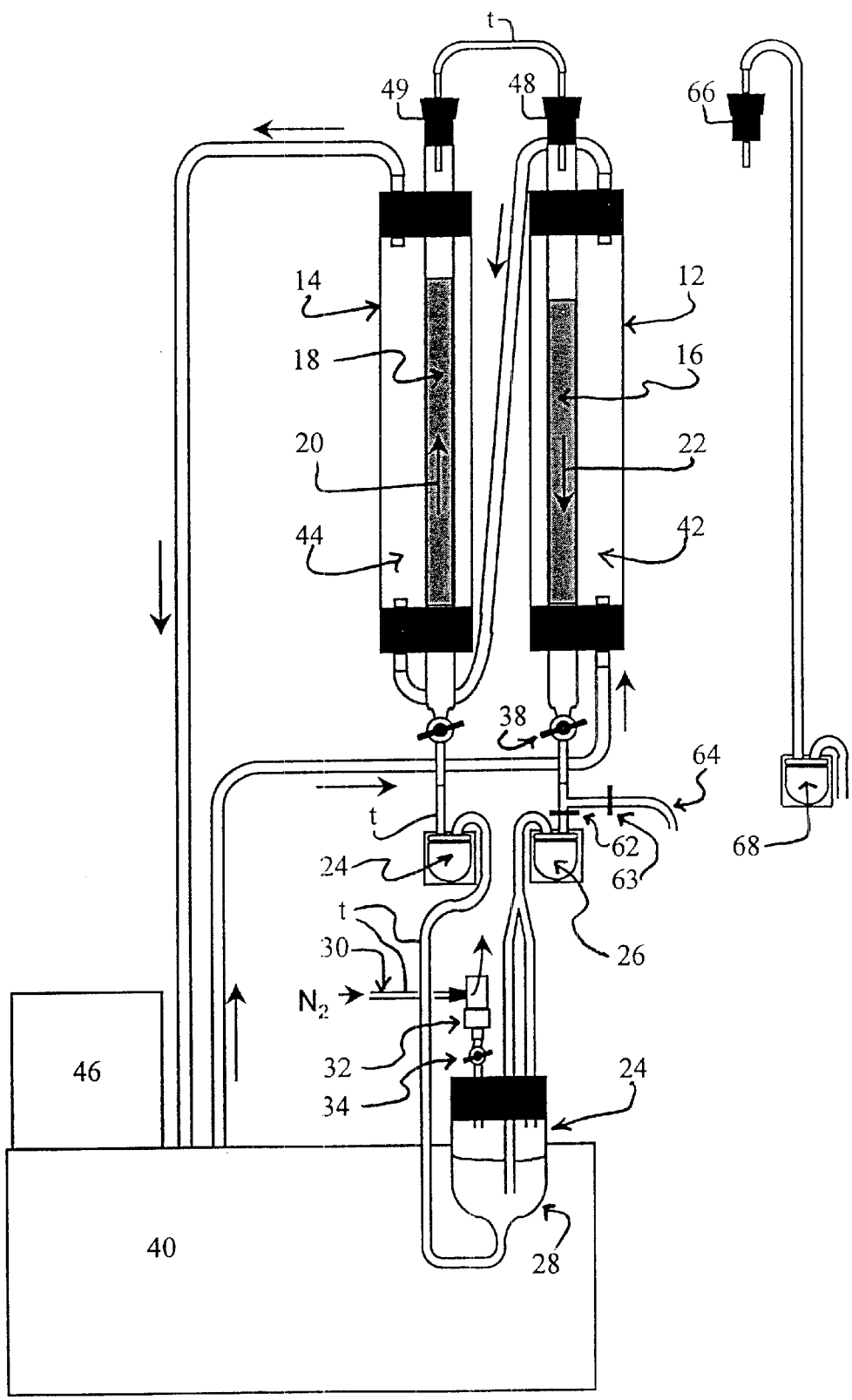
FIG. 23 is an illustration of the equipment arrangement utilized to carry out the studies discussed in Example 12 and also in allowed application Ser. No. 09/019,677 filed Feb. 6, 1998, whose disclosures are incorporated herein by reference.

An illustration of the equipment arrangement 10 used for this study is illustrated in FIG. 23, and is also shown and discussed in allowed application Ser. No. 09/019,677, filed on Feb. 6, 1998. The arrangement included two columns, an ion exchange column 12 and a copper column 14. Column 12 contained a burette 16 filled with ion exchange resin and the other column 14 contained a burette 18 filled with copper wire pieces. The eluant stream was passed upwardly, as indicated by the arrow at 20, through the copper wire-containing column 14 The passage of acidic copper(II) containing solution, such as the eluant through the copper column 14 generates copper(I) ions. The copper(I)-containing solution was then passed down through the column 12 containing iron(III)-bound ion exchange particles as indicated by the arrow at 22.

The solution exiting the ion exchange burette 16 flowed into a small vessel 24 that served as a reservoir to permit sampling. The solution was then transferred by a pump 24 from the bottom 28 of the reservoir 24 and up through the copper burette 18 again.

Elution was conducted in a closed system to minimize loss of copper(I) ions due to oxidation by air. The reservoir 24 receiving the eluate from the ion exchange column 12 was accessed under a nitrogen flow as indicated at 30.

As shown in FIG. 23, the two columns 12, 14 were arranged side by side. Eluant flow was down through the ion exchange column 12 and into the reservoir 24. The eluant was then transferred by pump 24 from the base 28 of the reservoir 24 up through the copper wire column 14. Exiting the copper column 14, the elution solution again re-entered the ion exchange column 12. Access to the well 24 was through a septum 32 atop a plastic stopcock 34. A stiff piece of tubing (Tefzel®, not shown) was pushed through the septum 32 and the stopcock 34 into the solution. Samples were drawn up into plastic syringes.

During sampling, a rapid flow of nitrogen was passed over the top of the septum 32 via tubing t. After sampling, the stopcock 34 was closed and the tubing on top the septum 32 was stoppered and kept under positive pressure of nitrogen. The stopcock 38 at the bottom of the ion exchange burette 16 was sealed with silicone sealant to minimize air ingress. Heating water from a water bath 40 was passed first up through the jacket 42 around the ion exchange column 16, then up through the jacket 44 around copper wire-containing burette 18. A thermocouple thermometer 46 was used to measure the temperature of the water re-entering the circulating water bath. The water jackets 42, 44 were wrapped with heating tape (not shown) and insulated with glass wool (not shown) to maintain the apparatus at the appropriate temperature. The temperature of the water was 84–85° C.

Prior to loading and elution, the ion exchange resin was conditioned by immersing the ion exchange resin (50–100 mesh) in 250 g/L sulfuric acid overnight (about 16 hours). The ion exchange resin was then packed into the burette 16. The initial ion exchange column bed volume was 47 mL.

The loading solution consisted of about 2 g/L iron as $Fe_2(SO_4)_3 \cdot 5H_2O$ (97 percent), about 40 g/L copper as $CuSO_4 \cdot 5H_2O$, 0.1 g/L cobalt as $CoSO_4 \cdot 7H_2O$, and 160 g/L $H_2SO_4$. The iron and copper concentrations of the solutions loaded onto each column are shown below in Table 7. The column and the loading solution reservoir were heated to 40° C. during loading.

TABLE 7

Column Loading.

| | DIPHONIX ® | DUOLITE ® C-467 | CS3-104 |
|---|---|---|---|
| $[Fe^{+3}]$ Load Solution | 1.951 g/L $Fe^{3+}$ | 1.886 g/L $Fe^{3+}$ | 1.957 g/L $Fe^{3+}$ |
| $[Cu^{2+}]$ Load Solution | 39.94 g/L $Cu^{2+}$ | 39.60 g/L $Cu^{2+}$ | 39.77 g/L $Cu^{2+}$ |

A known volume of the loading solution (at least 40 bed volumes) was passed through each column 16 at a flow rate of about 10 bed volumes per hour, based on the starting column volume. The initial bed volumes of the three columns are shown below in Table 9. The total amount of iron passed onto each column is shown in Table 9, below.

The effluent was collected in portions for analysis. The iron concentration of the load effluents for the three columns are shown below in Table 8. The total amount of iron contained in the load effluents is shown below in Table 9. After loading, the ion exchange column bed volume had decreased. The final column volume for each column is shown in Table 9.

Next, the ion exchange resin in column 12 was washed with about three bed volumes of the eluant solution at room temperature (about 8.3 mL/minute). The solution contained the same components as the loading solution, but with no added iron. The solution contained about 40 g/L copper(II) ions, 0.1 g/L cobalt(II) ions, and 160 g/L $H_2SO_4$. The wash solution was collected for analysis. The amount of iron in the wash solution is shown in Table 9.

The mass of iron loaded was calculated by difference of the total iron pumped onto the ion exchange column 12 less the total iron in the effluent and wash. The final column volume after loading was used with the mass of iron loaded to calculate the concentration of iron on the ion exchange resin, shown in Table 9, which is the resin $Fe^{3+}$ capacity.

TABLE 8

Iron Concentrations During Loading (g/L Fe)

| Bed Volumes | DIPHONIX ® | DUOLITE ® C-467 | CS3-104 |
|---|---|---|---|
| 2 | 0.0000 | 0.0550 | 0.0040 |
| 4 | 0.0042 | 1.3361 | 0.0076 |
| 6 | 0.0786 | 1.7566 | 0.1234 |
| 8 | 0.7157 | 1.8167 | 0.4754 |
| 10 | 1.3710 | 1.8285 | 0.7729 |
| 15 | 1.7550 | 1.8449 | 1.1006 |
| 20 | 1.9620 | 1.8520 | 1.3400 |
| 25 | 1.9140 | 1.8750 | 1.5113 |
| 30 | 1.9300 | 1.8682 | 1.5965 |
| 35 | 1.9380 | 1.8367 | 1.6619 |
| 40 | 1.9350 | 1.8182 | 1.6994 |
| 50 | | | 1.7457 |
| 60 | | | 1.8334 |
| 70 | | | 1.8422 |

TABLE 9

Iron Capacity of Columns

| | DIPHONIX ® | DUOLITE ® C-467 | CS3-104 |
|---|---|---|---|
| initial column bed volume | 40.4 mL | 39.0 mL | 7.0 mL |
| final column bed volume | 37.3 mL | 38.4 mL | 6.7 mL |
| Total Fe passed onto column | 3.1727 g | 3.1008 g | 0.9706 g |
| Total Fe in load effluent | 2.5195 g | 2.8479 g | 0.7123 g |
| Total Fe in load wash | 0.1796 g | 0.0881 g | 0.0499 g |
| Total Fe bound to column | 0.47359 g | 0.16487 g | 0.20833 g |
| Resin $Fe^{3+}$ capacity | 12.70 g $Fe^{3+}$ per L resin | 4.29 g $Fe^{3+}$ per L resin | 31.09 g $Fe^{3+}$ per L resin |

Regeneration of each column was as described in the following paragraphs. Eluant solution was made, containing about 35 g/L copper(II) ions, 0.1 g/L cobalt(II) ions, and 160 g/L $H_2SO_4$, like the wash solution above.

Eluant solution was poured into the reservoir 24 and pumped up through the copper column 14. The copper and ion exchange burettes 16, 18 were connected by a short length of about ⅛ inch i.d. Viton® tubing t. Connections between the reservoir 24 and burettes 16, 18 were made with the same tubing t. The rubber stoppers 48, 49 atop the burettes 12, 14 (respectively) were wrapped with PVC tape to minimize air ingress at these points. The precise volume of eluant was determined later.

Once all the eluant was added, the system was closed and heating water circulation was begun. With each 5° C. rise in temperature, the stopcock 34 attached to the reservoir 24 was opened briefly to vent excess pressure. Once the desired temperature was reached (75° C.), the system was thereafter accessed only under a nitrogen gas flow. The eluant solution was pumped around at about 7.5 mL/minute.

Samples were taken at 0.5 hour, then at one hour intervals as shown in Table 10, below. The samples were subjected to preliminary analysis by atomic absorption spectroscopy. By the two hour time point, the constant iron concentration shown below in Table 10 indicates that a steady state had been achieved. Roughly 3 mL samples were taken. The weight of each sample taken was noted. From the measured density at room temperature (1.2044 g/mL), the volume was calculated. After cooling to room temperature, a 2.00 mL portion was treated with a small amount of 30 percent hydrogen peroxide solution to oxidize any iron(II) ions to iron(III) ions, and then was diluted in a volumetric flask for analysis. All sample volumes are referenced to room temperature.

At the termination of the eluant recirculation, the aqueous phase from the ion exchange column 12 was collected and the ion exchange resin in the column 12 was then washed with about 3 bed volumes of fresh eluant solution. The combined effluent plus washings were treated with 30 percent hydrogen peroxide and diluted in a volumetric flask for analysis.

Iron analysis was by atomic absorption spectroscopy. Samples and atomic absorption standard solutions were treated to contain similar levels of $CuSO_4 \cdot 5H_2O$ (about 730 parts per million copper), $H_2SO_4$ (3.2 g/L) and one percent by weight of $HNO_3$, so that reliable analyses for iron could be obtained.

TABLE 10

Recirculating Eluant Iron Amounts (g Fe)

| | DIPHONIX ® | DUOLITE ® C-467 | CS3-104 |
|---|---|---|---|
| 0.5 hours | 0.0038 | 0.00202 | 0.00450 |
| 1 hour | 0.00591 | 0.00423 | 0.00797 |
| 2 hours | 0.01019 | 0.00448 | 0.00886 |
| 3 hours | 0.00909 | 0.00451 | 0.00877 |
| 4 hours | 0.01191 | 0.00476 | |
| 5 hours | 0.01212 | | |

A sample of the recirculating eluant was taken at the last time point and initially for copper analysis for each column. In all cases, the copper concentration was essentially the same at the end of the regeneration as the initial copper concentration.

The final circulating eluant volume (at room temperature as shown in Table 11 for the three columns) was calculated from the total mass of iron in the final recovered solutions from the ion exchange and copper columns, 12, 14, divided by the steady state average iron concentration.

The total mass of iron eluted (Table 11) is the sum of the masses in the recovered circulating eluant solutions plus the mass of iron from the recirculating eluant time point samples. Iron recovery for each column was calculated as the ratio of total iron in the circulating eluant (Table 11) divided by the total iron bound to the column (Table 9). The results indicate quantitative recovery of the bound iron.

TABLE 11

Column Regeneration

| | DIPHONIX ® | DUOLITE ® C-467 | CS3-104 |
|---|---|---|---|
| Steady State [Fe] | 3.741 g/L Fe | 1.418 g/L Fe | 2.712 g/L Fe |

TABLE 11-continued

Column Regeneration

| | DIPHONIX ® | DUOLITE ® C-467 | CS3-104 |
|---|---|---|---|
| Final circulating eluant volume | 118.6 mL | 97.8 mL | 59.9 mL |
| Total iron in final circulating eluant | 0.49646 g | 0.15870 g | 0.19254 g |
| Iron Recovery | 104.8% | 96.1% | 108.2% |

Resin JW-44-158B, which contains 3.43 meq/g P and 8.43 mmol/g acid, when used under similar process conditions, provided results generally similar to those obtained herein with resin CS3-104, and resulted in an iron loading of 21.1 g/L of resin.

EXAMPLE 12

Preparation of Sulfonated Poly(styrene phosphate)

4-Acetoxy styrene (Aldrich Chemical Co., Milwaukee, Wis.) was polymerized with 2 mole percent divinyl benzene as discussed in Example 1. Ten grams of the resulting polymer beads were reacted with 100 mL of 3N sodium hydroxide. The resulting produce was placed in a chromatography column and eluted with 100 mL of 1N hydrochloric acid followed by a water wash until the eluate was neutral. The resulting poly(hydroxystyrene) was then dried.

The dried poly(hydroxystyrene) (4.45 g) was swelled in 60 mL of THF and 16 mL of triethylamine to form a slurry. To that slurry were added a solution containing 30 mL of THF and 19.75 g of diethyl chlorophosphate. The resulting reaction mixture was stirred at room temperature for 24 hours to prepare the corresponding poly(diethyl styrenephosphate). The resulting poly(diethyl styrenephosphate) was rinsed with further THF and dried. Sulfonation as described in Example 1 with chlorosulfonic acid in EDC provides the sulfonated poly(stryrene phosphate).

The foregoing description and the examples are intended as illustrative and are not to be taken as limiting. Still other variations within the spirit and scope of this invention are possible and will readily present themselves to those skilled in the art.

What is claimed:

1. An ion exchange and regeneration process for the separation and removal of iron(III) ions from an aqueous sulfuric acid solution containing ions of at least one additional metal having a valence of less than +3 that comprises the steps of:

(a) contacting an aqueous sulfuric acid metal ion-containing solution that contains iron(III) ions as well as ions of at least one additional metal having a valence of +2 with a solid ion exchange medium that binds said iron(III) ions in preference to the additional metal ions present to form a first solid/liquid phase admixture, said solid ion exchange medium comprising a cross-linked water-insoluble polymer that is a monophosphorus/sulfonic acid resin having a plurality of monophosphorus acid functional group ligands and also having a plurality of sulfonic acid ligands, said monophosphorus acid ligands being present at about 2 to about 5 millimoles of phosphorus per gram (mmol/g) of polymer and having a ratio of mmol/g of phosphorus to mmol/g of sulfur of about 4:1 to about 1:2;

(b) maintaining said contact with said solid ion exchange medium for a time period sufficient to form solid phase-bound iron(III) ions and an aqueous liquid phase containing sulfuric acid and said additional metal ions;

(c) separating the solid and liquid phases;

(d) contacting said separated solid phase-bound iron(III) ions with an aqueous stripping solution, thereby forming a second solid/liquid phase admixture;

(e) maintaining said second solid/liquid phase admixture at a temperature of about room temperature to about 95° C. for a time period sufficient to form an aqueous liquid phase containing iron cations and regenerated solid phase ion exchange medium; and (f) separating the iron cation-containing liquid phase from the regenerated solid phase ion exchange medium.

2. The process according to claim 1 wherein said ion exchange medium contains polymerized styryl monomers.

3. The process according to claim 2 wherein the monophosphorus acid ligands of said ion exchange medium are linked to the phenyl rings of said polymerized styryl monomers.

4. The process according to claim 3 wherein the monophosphorus acid ligands are directly linked to the phenyl rings of styryl monomers.

5. The process according to claim 4 wherein the styryl-linked monophosphorus acid ligands are phosphonic acid ligands, phosphinic acid ligands or a mixture of both phosphonic acid and phosphinic acid ligands.

6. The process according to claim 3 wherein the monophosphorus acid ligands are indirectly linked to the phenyl rings of styryl monomers.

7. The process according to claim 6 wherein the monophosphorus acid ligands are phosphonic acid ligands indirectly linked to the phenyl rings of said styryl monomers via a methylene group.

8. The process according to claim 6 wherein the monophosphorus acid ligands are phosphate monoester ligands indirectly linked to the phenyl rings of said styryl monomers via an oxygen atom of the phosphate.

9. The process according to claim 1 wherein the monophosphorus acid ligands of said ion exchange medium are linked to the polymer backbone.

10. The process according to claim 2 wherein the sulfonic acid ligands of said ion exchange medium are linked to the phenyl rings of said styryl monomers.

11. The process according to claim 1 wherein the concentration of sulfuric acid in said aqueous sulfuric acid metal ion-containing solution is about 1 to about 3 molar.

12. The process according to claim 1 wherein said additional metal ions of said aqueous sulfuric acid metal ion-containing solution are selected from the group consisting of manganese(II), copper(II) and cobalt(II) ions.

13. The process according to claim 1 wherein said stripping solution contains about 4 to about 10 molar hydrochloric acid.

14. The process according to claim 1 wherein said stripping solution is an aqueous reducing solution that contains a reducing agent that reduces the solid phase-bound iron(III) ions to iron(II) ions.

15. The process according to claim 14 wherein said reducing agent of said aqueous reducing solution is (i) a $SO_2$-free reducing solution of copper(I) ions or (ii) a solution containing a catalytic amount of copper(I) ions and sulfurous acid at a concentration of about 0.3 to about 1.0 molar as $SO_2$.

16. The process according to claim 15 wherein said copper(I) ions are present in said $SO_2$-free reducing solution in an amount of about 0.005 to about 0.05 molar.

17. The process according to claim 15 wherein said copper(I) ions are present in said sulfurous acid-containing aqueous reducing solution in an amount of 0.5 to about 7 grams/liter.

18. The process according to claim 1 wherein said aqueous sulfuric acid metal ion-containing solution also contains iron(II) ions.

19. The process according to claim 1 wherein said ion exchange medium is in the form of particles.

20. An ion exchange and regeneration process for the separation and removal of iron(III) ions from an aqueous sulfuric acid metal ion-containing solution that comprises the steps of:

(a) contacting an aqueous sulfuric acid metal ion-containing solution that contains iron(III) ions as well as ions of at least one additional metal having a valance of +2 with a solid ion exchange ion exchange medium that binds said iron(III) ions in preference to the additional metal ions present to form a first solid/liquid phase admixture, said ion exchange medium comprising a cross-linked water-insoluble monophosphonic/sulfonic acid resin that contains: (i) polymerized phenyl ring-containing monomers, (ii) about 2 to about 5 millimoles per gram (mmol/g) of phosphorus as phosphonic acid ligands linked to said phenyl rings as methylenephosphonic acid ligands, and (iii) a sufficient amount of a sulfonic acid ligand such that the ratio of mmol/g of phosphonic acid to mmol/g sulfonic acid is up to 3:1;

(b) maintaining said contact with said solid ion exchange medium for a time period sufficient to form solid phase-bound iron (III) ions and an aqueous liquid phase containing sulfuric acid and said additional metal ions;

(c) separating the solid and liquid phases;

(d) contacting said separated solid phase-bound iron(III) ions with an aqueous stripping solution, thereby forming a second solid/liquid phase admixture;

(e) maintaining said second solid/liquid phase admixture at a temperature of about room temperature to about 95° C. for a time period sufficient to form an aqueous liquid phase containing iron cations and regenerated solid phase ion exchange medium; and (f) separating the iron cation-containing liquid phase from the regenerated solid phase ion exchange medium.

21. The process according to claim 20 wherein the concentration of sulfuric acid in said aqueous sulfuric acid metal ion-containing solution is about 1 to about 3 molar.

22. The process according to claim 20 wherein said additional metal ions of said aqueous sulfuric acid metal ion-containing solution are selected from the group consisting of manganese(II), copper(II) and cobalt(II) ions.

23. The process according to claim 20 wherein said stripping solution contains about 4 to about 10 molar hydrochloric acid.

24. The process according to claim 20 wherein said stripping solution is an aqueous reducing solution that contains a reducing agent that reduces the solid phase-bound iron(III) ions to iron(II) ions.

25. The process according to claim 24 wherein said reducing agent of said aqueous reducing solution is (i) a $SO_2$-free reducing solution of copper(I) ions or (ii) a solution containing a catalytic amount of copper(I) ions and sulfurous acid at a concentration of about 0.3 to about 1.0 molar as $SO_2$.

26. The process according to claim 25 wherein said copper(I) ions are present in said $SO_2$-free reducing solution in an amount of about 0.005 to about 0.05 molar.

27. The process according to claim 25 wherein said copper(I) ions are present in said sulfurous acid-containing aqueous reducing solution in an amount of 0.5 to about 7 grams/liter.

28. The process according to claim 20 wherein said aqueous sulfuric acid metal ion-containing solution also contains iron(II) ions.

29. The process according to claim 20 wherein said ion exchange medium is in the form of particles.

30. An ion exchange and regeneration process for the separation and removal of iron(III) ions from an aqueous sulfuric acid metal ion-containing solution that comprises the steps of:

(a) contacting an aqueous sulfuric acid metal ion-containing solution that contains about 1 to about 3 molar sulfuric acid, iron(III) ions and additional metal ions that include one or more of iron(II), manganese (II), copper(II) and cobalt(II) cations with solid ion exchange medium particles that bind to said iron(III) ions in preference to said additional metal ions to form a solid/liquid phase admixture, said ion exchange medium comprising a cross-linked water-insoluble monophosphonic/sulfonic acid resin comprised of polymerized phenyl ring containing monomers having phosphonic acid ligands linked to said phenyl rings via methylene groups to provide said resin with about 3 to about 4 millimoles per gram (mmol/g) of phosphorus, and a sufficient amount of the polymerized phenyl ring-containing monomers having said methylene-linked phosphonic acid ligand also having a sulfonic acid ligand linked to the same phenyl ring such that the ratio of mmol/g of phosphonic acid to mmol/g sulfonic acid is 3:1 to about 1:2;

(b) maintaining said contact with a sufficient amount of said solid ion exchange particles for a time period sufficient to form solid phase-bound iron(III) ions and an aqueous liquid phase containing sulfuric acid and said additional metal ions;

(c) separating the solid and liquid phases;

(d) contacting said separated solid phase-bound iron(III) ions with an aqueous reducing solution that contains a reducing agent that reduces the solid phase-bound iron(III) ions to iron(II) ions to form a second solid/liquid phase admixture;

(e) maintaining said second solid/liquid phase admixture at a temperature of about 65° C. to about 95° C. for a time period sufficient to form an aqueous sulfuric acid liquid phase containing iron(II) ions and regenerated solid phase ion exchange particles; and (f) separating the iron(II)-containing liquid phase from the regenerated solid phase ion exchange particles.

31. The process according to claim 30 wherein said reducing agent of said aqueous reducing solution is (i) a $SO_2$-free reducing solution of copper(I) ions or (ii) a solution containing at least a catalytic amount of copper(I) ions and sulfurous acid at a concentration of about 0.3 to about 1.0 molar as $SO_2$.

32. The process according to claim 30 wherein the copper (I) ions of the aqueous reducing solution are provided by passing an aqueous solution of sulfuric acid and copper(II) ions over copper metal prior to said contacting.

33. The process according to claim 30 wherein copper(I) ions are present in said aqueous reducing solution in an amount of about 0.3 to about 3 grams/liter.

34. The process according to claim 30 wherein said maintenance step (e) is carried out at a temperature of about 65° C. to about 75° C.

35. The process according to claim 30 wherein said aqueous sulfuric acid metal ion-containing solution contains about 1 to about 10 grams/liter iron as iron(III) ions or a mixture of iron(II) and iron(III) ions, about 30 to about 50 grams/liter copper(II) ions and about 0.05 to about 0.2 grams/liter cobalt(II) ions.

36. The process according to claim 30 wherein said sulfurous acid is present in said aqueous reducing solution in an amount of about 0.3 to about 1.0 molar as $SO_2$.

37. The process according to claim 30 wherein said ion exchange particles are contained in a column and each step of contacting and maintaining contact with said ion exchange particles is carried out within said column.

38. The process according to claim 37 wherein each separation of solid and liquid phases from a solid/liquid phase admixture is carried out by elution of the liquid phase from the column.

* * * * *